US010011664B2

(12) United States Patent
Obrecht et al.

(10) Patent No.: US 10,011,664 B2
(45) Date of Patent: Jul. 3, 2018

(54) FUNCTIONALIZED NITRILE RUBBERS AND THE PRODUCTION THEREOF

(75) Inventors: Werner Obrecht, Moers (DE); Julia Maria Jeschko, Gilgenberg (AT); Oskar Nuyken, Munich (DE); Martin Schneider, Cologne (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 1088 days.

(21) Appl. No.: 13/982,520

(22) PCT Filed: Jan. 25, 2012

(86) PCT No.: PCT/EP2012/051158

§ 371 (c)(1), (2), (4) Date: Aug. 20, 2014

(87) PCT Pub. No.: WO2012/104183

PCT Pub. Date: Aug. 9, 2012

(65) Prior Publication Data

US 2017/0190806 A1 Jul. 6, 2017

(30) Foreign Application Priority Data

Feb. 4, 2011 (EP) .................................... 11153437

(51) Int. Cl.

| | |
|---|---|
| ***C08C 19/28*** | (2006.01) |
| ***B29C 45/00*** | (2006.01) |
| ***B01J 31/22*** | (2006.01) |
| ***B01J 31/18*** | (2006.01) |
| ***C08C 19/00*** | (2006.01) |
| ***B01J 31/24*** | (2006.01) |
| *B29K 55/00* | (2006.01) |

(52) U.S. Cl.

CPC ........... *C08C 19/28* (2013.01); *B01J 31/1805* (2013.01); *B01J 31/2208* (2013.01); *B01J 31/2273* (2013.01); *B01J 31/2291* (2013.01); *B01J 31/2404* (2013.01); *B29C 45/0001* (2013.01); *C08C 19/00* (2013.01); *B01J 2231/546* (2013.01); *B01J 2531/64* (2013.01); *B01J 2531/821* (2013.01); *B29K 2055/00* (2013.01); *C08C 2019/09* (2013.01)

(58) Field of Classification Search

None

See application file for complete search history.

(56) References Cited

U.S. PATENT DOCUMENTS

| | | | |
|---|---|---|---|
| 3,433,392 | A | 3/1969 | Roerig |
| 3,700,637 | A | 10/1972 | Finch, Jr. |
| 4,464,515 | A | 8/1984 | Rempel et al. |
| 4,503,196 | A | 3/1985 | Rempel et al. |
| 4,581,417 | A | 4/1986 | Buding et al. |
| 4,631,315 | A | 12/1986 | Buding et al. |
| 4,746,707 | A | 5/1988 | Fiedler et al. |
| 4,795,788 | A | 1/1989 | Himmler et al. |
| 4,816,525 | A | 3/1989 | Rempel et al. |
| 4,826,721 | A | 5/1989 | Obrecht et al. |
| 4,857,571 | A | 8/1989 | Reiter et al. |
| 4,978,771 | A | 12/1990 | Fiedler et al. |
| 5,247,023 | A | 9/1993 | Chung et al. |
| 5,880,231 | A | 3/1999 | Grubbs et al. |
| 6,683,136 | B2 | 1/2004 | Guo et al. |
| 6,838,489 | B2 | 1/2005 | Bell et al. |
| 6,867,303 | B2 | 3/2005 | Grela |
| 7,598,330 | B2 | 10/2009 | Grubbs et al. |
| 7,745,539 | B2 | 6/2010 | Guerin et al. |
| 7,915,375 | B2 | 3/2011 | Pawlow et al. |
| 7,919,563 | B2 | 4/2011 | Guerin et al. |
| 7,951,875 | B2 | 5/2011 | Guerin et al. |
| 7,956,132 | B2 | 6/2011 | Arriola et al. |
| 8,058,351 | B2 | 11/2011 | Pawlow et al. |
| 8,283,423 | B2 | 10/2012 | Swager et al. |
| 8,507,398 | B2 | 8/2013 | Meca et al. |
| 8,604,141 | B2 | 12/2013 | Grubbs et al. |
| 2002/0107138 | A1 | 8/2002 | Hoveyda et al. |
| 2004/0132891 | A1 | 7/2004 | Ong et al. |
| 2005/0026774 | A1 | 2/2005 | Nolan |
| 2007/0049699 | A1 | 3/2007 | Nasreddine et al. |
| 2007/0049700 | A1 | 3/2007 | Obrecht et al. |
| 2008/0076881 | A1 | 3/2008 | Obrecht et al. |
| 2009/0054597 | A1 | 2/2009 | Ong et al. |
| 2009/0069516 | A1 | 3/2009 | Obrecht et al. |
| 2009/0105423 | A1 | 4/2009 | Pawlow et al. |

(Continued)

FOREIGN PATENT DOCUMENTS

| | | | |
|---|---|---|---|
| DE | 2539132 | A1 | 3/1977 |
| EP | 0471250 | A1 | 2/1992 |
| EP | 2145681 | A1 | 1/2010 |
| EP | 1401950 | B2 | 12/2010 |
| WO | 199701597 | A1 | 1/1997 |
| WO | 03076537 | A1 | 9/2003 |
| WO | 2004011536 | A1 | 2/2004 |
| WO | 09009158 | A2 | 1/2009 |

OTHER PUBLICATIONS

Grela, K., "A Highly Efficient Ruthenium Catalyst for Metathesis Reactions", Angew. Chem. Int. Ed. 2002, 41, No. 21, p. 4038-4040.

(Continued)

*Primary Examiner* — Catherine S Branch

(57) ABSTRACT

Provided are new functionalized nitrile rubbers, which may optionally also be in partially or wholly hydrogenated form, and also a process for preparing them by metathesis of nitrile rubbers in the presence of a metathesis catalyst and at least one functionalized allyl compound. The new functionalized nitrile rubbers are suitable for producing vulcanizable mixtures and allow the production of vulcanizates having very stable networks. Also made possible, in particular, is the synthesis of block copolymers.

17 Claims, No Drawings

(56) References Cited

U.S. PATENT DOCUMENTS

| | | | |
|---|---|---|---|
| 2010/0093944 | A1 | 4/2010 | Muller et al. |
| 2011/0077360 | A1 | 3/2011 | Obrecht et al. |
| 2012/0022221 | A1 | 1/2012 | Hidalgo et al. |
| 2013/0261269 | A1 | 10/2013 | Mueller et al. |
| 2014/0066575 | A1 | 3/2014 | Obrecht et al. |
| 2014/0094612 | A1 | 4/2014 | Grubbs et al. |

OTHER PUBLICATIONS

Schrock, R. "Molybdenum and Tungsten Imido Alkylidene Complexes as Efficient Olefin-Metathesis Catalysts", Angew. Chem. Int. Ed. 2003, 42 p. 4592-4633.

Krause, J. "Synthesis and Reactivity of Homogeneous and Heterogeneous Ruthenium-Based Metathesis Catalysts Containing Electron-Withdrawing Ligands", Chem. Eur. J. 2004, 10 p. 777-784.

Grela, K. "A Good Bargain: An Inexpensive, Air-Stable Ruthenium Metathesis Catalyst Derived from a-Asarone" Eur. J. Org. Chem. 2003, p. 963-966.

Bujok, R. "Ortho-and Para-Substituted Hoveyda-Grubbs Carbenes. An Improved Synthesis of Highly Efficient Metathesis Initiators", J. Org. Chem. 2004, 69, p. 6894-6896.

Hummel, K. "Detection of C-C Cross-links in 1,4-Polybutadiene by Metathesis Degradation", Makromol.Chem. Rapid Commun. 4, (1983) p. 429-433.

Hummel, K. "Determination of carbon black fillers in vulcanizates of natural rubber by metathesis degradation", Angew. Makromol. Chem. 1993, 207, p. 137-143, (Nr. 3592).

Hummel, K. Metathesis degradation of poly(butadiene-alt-propene), Makromol.Chem. 188, p. 1075-1084 (1987).

Stellman, J."TIN Tetraalkyl", Enclyclopedia of Occupational Health and Safety, 4th Ed., vol. 3, Part IX: p. 63.41.

Sanford, M.S., "A Versatile Precursor for the Synthesis of New Ruthenium Olefin Metathesis Catalysts", Organometallics 2001, 20, p. 5314-5318.

Ast Hummel, W. and K., "Gas Chromatographic Analysis After Polymer Degradation of Metathesis"Institute of Technical Chemistry of the Technical University of Munich, , Aug. 27, 1970, p. 1.

Kautsch. Gummi Kunstst., 1995, 48, 88-93, English Translation, "Analysis Rubber Vulcanisate Micro Structure Metathesis", p. 1-4.

Dragutan, V. and I., "Ruthenium Complexes Bearing N-Heterocyclic Carbene (NHC) Ligands", Platinum Metals Rev., 2005, 49, (3), p. 123-137.

Hummel, K., "Degradation of Unsaturated Plymers by Olefin Metathesis", Journal of Macromolecular Science, Pure Appl. Chem., A30(9 & 10), 1993, pp. 621-632.

European Search Report from co-pending Application EP 11153437 dated Jul. 26, 2011, 2 pages.

FUNCTIONALIZED NITRILE RUBBERS AND THE PRODUCTION THEREOF

The present invention relates to functionalized nitrile rubbers, to a process for preparing them by metathesis in the presence of functionalized terminal and internal alkenes, and to their use.

Metathesis reactions are used extensively as part of chemical syntheses, for example in ring-closing metatheses (RCM), cross-metatheses (CM), ring-opening metatheses (ROM), ring-opening metathesis polymerizations (ROMP), acyclic diene metathesis polymerizations (ADMET), self-metathesis, reaction of alkenes with alkynes (enyne reactions), polymerization of alkynes, and olefinization of carbonyls (WO-A-97/06185 and Platinum Metals Rev., 2005, 49(3), 123-137).

Metathesis reactions find application, for example, for olefin synthesis, for the ring-opening polymerization of norbornene derivatives, for the depolymerization of unsaturated polymers, such as nitrile rubbers, and for the synthesis of telechelics.

The metathetical degradation of polybutadiene is used in particular for analytical investigations. For these purposes, the polymer is degraded, in the presence of an excess of low molecular mass olefin, to an extent such that the resulting fragments can be analysed by means of gas chromatography and/or mass spectroscopy (Naturwissenschaften 1970, 11, 545; J. Macromol. Sci. Part A, Pure Appl. Chem. 1993, 30, 621-632; Kautsch. Gummi Kunstst, 1995, 48, 88-93). This allows determination of the degree of crosslinking of vulcanized polybutadiene (Makromol. Chem, Rapid Commun. 1983, 4, 429-433) and also of the filler content (Angew. Makromol. Chem. 1993, 207, 137-143). Statements about the sequence lengths of copolymers formed from a diene and an olefin are possible as well by means of metathesis (Macromol. Chem. 1987, 188, 1075-1084). On the basis of these publications it is not possible to derive any teaching relating to the preparation of functionalized nitrile rubbers by metathetical degradation.

DD 146053 describes the preparation of ester-group-terminated polyolefins by metathetical degradation of double-bond-containing polymers in the presence of unsaturated dicarboxylic esters or diesters of unsaturated dialcohols as regulators. Catalysts used are transition metal compounds from transition groups 5. to 7. It is of essential importance to use them in combination with co-catalysts, these being organyls of silicon, germanium, tin or lead. Preference is given to using tin tetraalkyls. Using co-catalysts of this kind is considered disadvantageous on account of their environmental objectionability (Encyclopedia of Occupational Health and Safety, 4th edition, (1998) Vol. III, ed. Jeanne Mager Stellman "tin tetraalkyl"). Accordingly, no conclusions can be drawn from DD 146053 concerning the metathetical degradation of nitrile rubbers. In the context of the present specification it is shown that nitrile rubber cannot be degraded metathetically using molybdenum-based metathesis catalysts with additions of 1-hexene.

DD 146052 describes the synthesis of ester-group-terminated polyalkenamers by ring-opening polymerization of cycloolefins in the presence of unsaturated organic diesters. Catalysts used are transition metal compounds from transition groups 5. to 7. In this synthesis as well it is critical to use the catalysts in combination with halides from main group IV, such as the tetrahalides of silicon, germanium, tin and lead. No conclusions at all, accordingly, with regard to the metathetical degradation of nitrile rubbers can be drawn from DD 146052. Furthermore, the use of germanium, tin and lead halides is problematical, for the reasons already stated for DD 146053.

WO-A-08/027269 describes a two-stage process for preparing functionalized polymers by preparing, in step 1., telechelics having terminal double bonds, through subjecting copolymers of ethylene and a conjugated diene or alkyne and also, optionally, $C_3$-$C_{20}$ α-olefins to metathetical degradation in the presence of a cyclic olefin or polyolefin, an acyclic olefin, preferably ethylene, and/or a regulator. In step 2., functional groups (hydroxyl groups, carboxyl groups and amino groups) are introduced via the terminal double bonds of the telechelics by means of reductive hydroformylation, oxidative hydroformylation or reductive amination, respectively. The functionalized telechelics obtained in this procedure are used for various applications such as the preparation of polyurethanes and of unsaturated polyester resins. WO-A-2008/027269 provides no teaching as to how, and using which functionalized olefins, a metathetical degradation and a functionalization of nitrile rubbers can be accomplished simultaneously.

WO-A-2008/042289 describes a further method for preparing polymers having functional groups. For this purpose, either the functional group is introduced by means of metathesis into a low molecular weight compound which contains double bonds, and which is subsequently polymerized, or the functional group is introduced by means of a polymer-analogous metathesis reaction onto a polymer containing double bonds. Suitable metathesis reactions for introducing the functional groups are cross-metathesis, ring-closing metathesis or ring-opening metathesis. In the case of the functionalization of the polymers that is described in WO-A-2008/042289, there is no simultaneous metathetical degradation of the polymer. Consequently, WO 2008/042289 provides no starting points at all for how to prepare functionalized nitrile rubbers with reduced molecular weight in a single step.

WO-A-2007/100891 describes compositions based on aromatic polyesters such as PET and PBT and further comprising unsaturated polymers having at least one terminal functional group. These functionalized unsaturated polymers are obtained by metathesis polymerization. Hydroxyl, carboxyl and ester groups are cited as preferred functional groups. The unsaturated polymers are obtained for example by ring-opening metathesis polymerization (ROMP) or acyclic diene metathesis (ADMET). Examples of monomers contemplated include cycloolefins or α,ω-dienes. Alternatively it is also possible to obtain suitable unsaturated polymers by metathetic molecular weight reduction from unsaturated polymers of higher molecular weight. For the functionalization, an olefin having one or more functional groups is used. In examples 1 and 2, cyclopentene or cyclooctene and 1,5-cyclooctadiene are polymerized in the presence of 1,4-diacetoxy-2-butene; in example 3, a polyoctenamer is subjected to a metathetic degradation and to functionalization in the presence of 1,5-cyclooctadiene and 1,4-diacetoxy-2-butene. No conclusions can be drawn from WO-A-2007/100891 concerning the selection of the catalysts and of the functional monomers for the preparation of functionalized nitrile rubbers by metathetic degradation.

U.S. Pat. No. 5,880,231 describes the preparation of telechelic polymers by metathesis polymerization in the presence of what is called the Grubbs (I) catalyst. Use is made of the acyclic diene metathesis (ADMET) of corresponding acyclic α,ω-dienes in the presence of α,ω-bifunctional olefins, the ring-opening metathesis polymerization (ROMP) of functionalized cyclooctenes such as 5-acetoxycyclooctene, and the depolymerization of unsaturated polymers such as polyheptene with ethylene. U.S. Pat. No. 5,880,231 provides neither pointers that the activity of the Grubbs (I) catalyst is unaffected by nitrile groups, nor indications that by metathetic degradation of nitrile rubber in the presence of suitable functional olefins it is possible to prepare functionalized nitrile rubbers of low molecular weight.

WO-A-2009/009158 describes the preparation of functionalized polymers by metathesis, though in fact without reduction in molecular weight. This is done by reacting unsaturated polymers which are "immune" to a metathesis reaction and are degraded by not more than 5% with double-bond-containing and functionalized, cyclic or acyclic compounds in the presence of suitable catalysts. The unsaturated polymer has no double bonds in the main chain, but instead has double bonds pendant from the main chain. Examples given of double-bond-containing, functionalized cyclic or acyclic compounds include ($C_{1-4}$ alkyl) acrylate, ($C_{1-4}$ alkyl) methacrylate, di($C_{1-4}$ alkyl) fumarate, vinyl chloride, vinylidene chloride, vinyl acetate, vinyl butyrate, vinyl n-butyl ether, N-vinyl carbazole, allyl ethyl ether, vinyl-($C_{1-4}$ alkyl) alcohol, vinyl-($C_{1-4}$ alkyl) methyl ethyl ketone, vinyl-($C_{1-4}$ alkyl) acetate, allyl methyl sulphide, allyl(chloro)dimethylsilane, allyl isocyanate, allyldiphenylphosphine, allylurea, allylsilane, allyl-$C_{1-4}$ alkylsilane, allyldi($C_{1-4}$ alkyl) silane, allyltri($C_{1-4}$ alkyl) silane or maleic anhydride. WO-A-2009/009158 provides no pointers at all for functionalizing unsaturated polymers containing nitrile groups where the functionalization is accompanied at the same time by a significant reduction (markedly >5%) in the molar mass.

WO-A-2006/127483 describes the metathetic degradation of polybutadiene for preparing functionalized polybutadiene having molar masses of 7500 to 100 000 g/mol in the presence of a functionalized acyclic diene. For this purpose, prior to the metathetic degradation, polybutadiene is partially hydrogenated, leaving less than 0.5 mol %, preferably less than 0.25 mol %, of vinylic double bonds in the polymer. The acyclic diene used for the metathetic degradation has one or two functional groups, more particularly alkoxy silane groups, and is used in amounts of 0.0001 to 1 mol % per mole of double bonds. The teaching of WO 2006/127483 does not reveal the measures to be taken in order to carry out functionalization of double-bond-containing and nitrile-containing polymers with metathetic degradation.

U.S. Pat. No. 5,247,023 describes the preparation of hydrocarbon polymers with borane groups at the chain end or on the main chain. The borane groups are introduced by cross-metathesis of double-bond-containing hydrocarbon polymers with double-bond-containing boranes. Double-bond-containing hydrocarbon polymers used are 1,4-polybutadiene, 1,4-polyisoprenes, polypentenamer, polyoctenamer, polynorbornene and corresponding copolymers. The boranes used for the metathesis derive from dienes or trienes such as 1,4-pentadiene, 1,5-hexadiene and 1,7-octadiene, which are monohydroborinated using dialkylboranes, monoalkylboranes or diboranes. The borane-containing hydrocarbon polymers obtained after the metathesis can be reacted by means of polymer-analogous reactions, the borane group being converted into different functional groups such as hydroxyl groups. According to the teaching of U.S. Pat. No. 5,247,023, no double-bond-containing hydrocarbon polymers containing functional groups such as the nitrile groups present in nitrile rubber are used for the metathesis. Furthermore, the synthesis of the boranes used for the metathesis is costly and inconvenient, necessitating operations in the absence of air and moisture. Also, when carrying out the metathesis with industrially available polymers, side-reactions of water with the boranes are likely, since industrial polymers frequently have low residual moisture contents. Furthermore, the preparation of polymers having the desired functional groups is costly and inconvenient, since after the metathesis it is also necessary to carry out a polymer modification in order to convert the functional groups introduced initially into the desired functional groups.

The metathetic degradation of nitrile rubbers, and also fully and partially hydrogenated nitrile rubbers obtained from such degradation, is already known in principle.

The metathetic degradation of nitrile rubber is disclosed for example in WO-A-02/100905, WO-A-02/100941 and WO-A-03/002613. The metathesis reaction is carried out usefully in the same solvent as the subsequent hydrogenation reaction, so that after the end of the degradation reaction the degraded nitrile rubber does not have to be isolated from the solvent before it is subjected to the subsequent hydrogenation. Catalysis of the metathetic degradation reaction takes place using metathesis catalysts which are tolerant towards polar groups, more particularly towards nitrile groups.

WO-A-02/100905 and WO-A-02/100941 describe processes which encompass the degradation of nitrile rubber starting polymers by olefin metathesis and the subsequent hydrogenation to HNBR with a low Mooney viscosity. Here, a nitrile rubber is reacted in a first step in the presence of a co-olefin and of specific, osmium-, ruthenium-, molybdenum- or tungsten-based complex catalysts, and in a second step is hydrogenated. Obtainable in this way are hydrogenated nitrite rubbers having a weight-average molecular weight ($M_w$) in the range from 30 000 to 250 000, a Mooney viscosity (ML 1+4 at 100° C.) in the range from 3 to 50 and a polydispersity index PDI of less than 2.5. Nitrile rubber can be metathesized using, for example, the Grubbs (I) catalyst. The metathesis is carried out in the presence of a co-olefin. According to the teaching of WO-A-02/100905, the olefin is a straight-chain or a branched $C_2$-$C_{16}$ olefin such as ethylene, isobutene, styrene or 1-hexene. Furthermore, it is said generally that the olefin can also be functionalized, and is not to inactivate the metathesis or have other adverse effects. However, there is an absence of any specific indications of functionalized olefins which possess these qualities. According to the teachings of WO 02/100941 and WO 03/002613, the olefin is a straight-chain or a branched $C_2$-$C_{16}$ olefin such as ethylene, isobutene, styrene or 1-hexene. Functionalized olefins are not specified in WO 02/100941 and in WO 03/002613.

For the purpose of boosting the activity of the catalysts used in the metathetic degradation of nitrite rubber in the presence of 1-olefins, a very wide variety of different additions are known: EP-A-1 825 913, EP-A-1 894 946, EP-A-2 027 919, EP-A-2 145 681 and EP-A-2145680 describe various additions which lead to an increase in the activity of metathesis catalysts. In these cases, the metathesis of nitrile rubber is carried out preferably in the presence of a co-olefin, which is more particularly a straight-chain or branched $C_2$-$C_{16}$ olefin such as ethylene, propylene, isobutene, styrene, 1-hexene and 1-octene, preferably 1-hexene or 1-octene. There is no description of how nitrile-containing functionalized rubbers with reduced molecular weight can be prepared.

Ruthenium-based and osmium-based catalysts highly suitable for the metathetic degradation of nitrite rubber are described in EP-A-1 760 093, EP-A-1 826 220, EP-A-2 028 194 and in EP-A-2 027 920.

From EP-A-1 760 093 it is known to implement the metathetic degradation of nitrile rubber in the presence of catalysts having a carbene ligand and carrying a phosphonium radical. Here again, the metathesis is carried out in the presence of a co-olefin, which is preferably a straight-chain or branched $C_2$-$C_{16}$ olefin such as ethylene, propylene, isobutene, styrene, 1-hexene and 1-octene, preferably 1-hexene or 1-octene. EP-A-1 760 093 does not reveal which olefins can be used to prepare functionalized nitrile rubbers of reduced molecular weight.

According to the teaching of EP-A-1 826 220, an efficient metathetic degradation of nitrile rubbers is accomplished simply by using small amounts of catalysts having the general formula (I), with the definitions indicated for that formula for the substituents, groups and ligands specified therein.

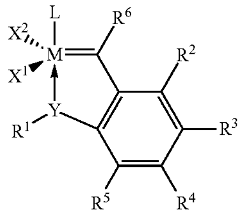

(I)

This metathesis as well can be carried out in the presence of a co-olefin, which is preferably a straight-chain or branched $C_2$-$C_{16}$ olefin such as ethylene, propylene, isobutene, styrene, 1-hexene and 1-octene. EP-A-1 826 220 does not reveal which olefins can be used for successfully preparing nitrile-containing functionalized rubbers of reduced molecular weight.

According to the teaching of EP-A-2 028 194, catalysts of the general formulae (I)-(III), shown below, are likewise suitable for the metathetic degradation of NBR. The metathesis can likewise be carried out in the presence of low molecular weight olefins such as, for example, linear or branched $C_2$-$C_{16}$ olefins, preferably ethylene, propylene, isobutene, styrene, 1-hexene and 1-octene, with 1-hexene and 1-octene being particularly preferred. EP-A-2 028 194 does not reveal how nitrile-containing functionalized rubbers of reduced molecular weight can be prepared.

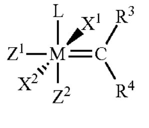

(I)

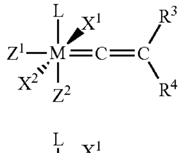

(II)

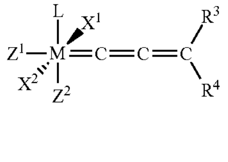

(III)

The Ru-based or Os-based catalysts described in EP-A-2 027 920 and of the general formulae shown below, with fluorenylidene-containing carbenes as ligands, permit particularly efficient degradation of nitrile rubber in the presence of 1-olefins.

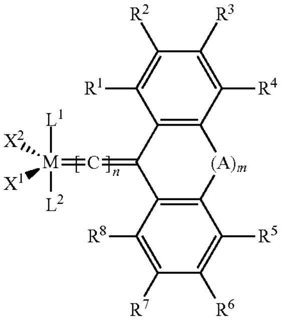

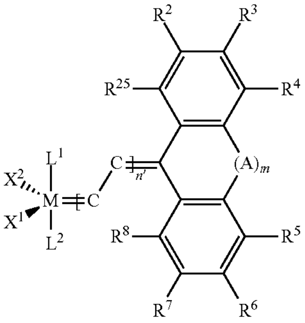

Common to all of the aforementioned processes for the metathetic degradation of nitrile rubber is the treatment of unhydrogenated nitrile rubber using 1-olefins that contain no functional groups with metathesis catalysts, with the molecular weight of the nitrile rubber being lowered and the breadth of the molar mass distribution becoming narrower, i.e. the polydispersity index PDI ($M_w/M_n$, where Mw represents the weight-average and Mn the number-average molecular weight) falling. The hydrogenated nitrile rubbers obtained starting from these nitrile rubbers have improved processing properties, such as improved mould filling on injection moulding, for example, in rubber mixtures, as compared with unmetathesized hydrogenated nitrile rubbers. Peroxidic crosslinking of these rubber mixtures produces vulcanizates having a relatively low Shore A hardness, relatively low modulus at different levels of strain, and relatively low tensile strengths.

WO-A-00/71554 discloses, furthermore, a group of catalysts which are referred to in the art as "Grubbs (II) catalysts". When a "Grubbs (II) catalyst" of this kind, such as the catalyst depicted below, for example, 1,3-bis(2,4,6-trimethylphenyl)-2-imidazolidenylidene)(tricyclohexylphosphine)ruthenium (phenylmethylene)dichloride, is used for NBR metathesis (US-A-2004/0132891), the metathesis is very successful without use of a co-olefin.

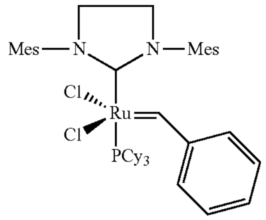

Grubbs (II) catalyst

After the subsequent hydrogenation, which is carried out preferably in the same solvent, the hydrogenated nitrile rubber has lower molecular weights and a narrower molecular weight distribution (PDI) than when using catalysts of the Grubbs (I) type. The hydrogenated nitrile rubbers obtained according to the teaching of US-A-2004/0132891 have reduced mixture viscosities and improved processing properties. Nevertheless, the vulcanizates produced by peroxidic crosslinking have a reduced level of modulus and lower tensile strengths than vulcanizates based on hydrogenated nitrile rubbers of higher molecular weight. The teaching of US-A-2004/0132891 does not reveal how functionalized nitrile-containing rubbers can be prepared.

No measures have been disclosed to date that allow the preparation of functionalized nitrile rubbers by means of metathesis.

It was an object of the present invention, therefore, to provide a process that allows the preparation of functionalized nitrile rubbers that at the same time have a reduced molecular weight $M_w$ relative to the initial nitrile rubber.

This object is achieved by subjecting nitrile rubbers to a molecular weight reduction in the presence of a metathesis catalyst and of at least one functionalized olefin of specific structure. The nitrile rubbers used here may be unhydrogenated or else partially hydrogenated. The nitrile rubbers obtained in this way (again unhydrogenated or partially hydrogenated) are notable for the presence of corresponding functional groups and for a molecular weight $M_w$ that is reduced relative to the initial nitrile rubber.

References below to "nitrile rubber" encompass not only unhydrogenated but also partially hydrogenated nitrile rubbers.

Therefore, the invention provides a process for preparing functionalized nitrile rubbers by contacting a nitrile rubber with a metathesis catalyst which is a complex catalyst based on a metal from transition group 6 or 8 of the Periodic Table which has at least one ligand attached carbenically to the metal, in the presence of at least one compound of the general formula (I) or (II), $$H_2C{=}CH{-}CH_2{-}X \quad (I)$$

$$Y{-}CH_2{-}CH{=}CH{-}CH_2{-}Z \quad (II)$$

where

X is $OR^1$, in which $R^1$ is H, $C_1$-$C_{18}$ alkyl, $C_7$-$C_{24}$ aralkyl, phenyl, naphthyl or fluorenyl, $O-(CH_2-CH_2-O)_n-R^2$, in which $R^2$ is H, $C_1$-$C_{18}$ alkyl, $C_7$-$C_{24}$ aralkyl, phenyl, naphthyl or fluorenyl and n is 1 to 20, $O-(CH_2-CH(CH_3)-O)_n-R^3$, in which $R^3$ is H, $C_1$-$C_{18}$ alkyl, $C_7$-$C_{24}$ aralkyl, phenyl, naphthyl or fluorenyl and n is 1 to 20, $O-C(=O)-R^4$, in which $R^4$ is H, $C_1$-$C_{18}$ alkyl, $C_7$-$C_{24}$ aralkyl, phenyl, naphthyl or fluorenyl, $C_6$-$C_{18}$ aryl, which is substituted by at least one radical $OR^5$, in which $R^5$ is H, $C_1$-$C_{18}$ alkyl, $C_7$-$C_{24}$ aralkyl, phenyl, naphthyl or fluorenyl, or $NH-C(=O)-OR^6$, in which $R^6$ is H, $C_1$-$C_{18}$ alkyl, $C_7$-$C_{24}$ aralkyl, phenyl, naphthyl or fluorenyl, and Y and Z are identical or different and $OR^7$, in which $R^7$ is H, $C_1$-$C_{18}$ alkyl, $C_7$-$C_{24}$ aralkyl, phenyl, naphthyl or fluorenyl, $O-(CH_2-CH_2-O)_n-R^8$, in which $R^8$ is H, $C_1$-$C_{18}$ alkyl, $C_7$-$C_{24}$ aralkyl, phenyl, naphthyl or fluorenyl and n is 1 to 20, $O-(CH_2-CH(CH_3)-O)_n-R^9$, in which $R^9$ is H, $C_1$-$C_{18}$ alkyl, $C_7$-$C_{24}$ aralkyl, phenyl, naphthyl or fluorenyl and n is 1 to 20, $O-C(=O)-R^{10}$, in which $R^{10}$ is H, $C_1$-$C_{18}$ alkyl, $C_7$-$C_{24}$ aralkyl, phenyl, naphthyl or fluorenyl, $C_6$-$C_{18}$ aryl, which is substituted by at least one radical $OR^{11}$, in which $R^{11}$ is H, $C_1$-$C_{18}$ alkyl, $C_7$-$C_{24}$ aralkyl, phenyl, naphthyl or fluorenyl, or $NH-C(=O)-OR^{12}$, in which $R^{12}$ is H, $C_1$-$C_{18}$ alkyl, $C_7$-$C_{24}$ aralkyl, phenyl, naphthyl or fluorenyl.

The process of the invention allows the preparation of functionalized nitrile rubbers which have the corresponding end groups X or else Y and Z. As a result of the simultaneous metathesis and functionalization of the nitrile rubbers, the functionalized nitrile rubbers possess reduced molecular weight. It is possible to prepare functionalized nitrile rubbers which possess a ratio of (Mw(i)/Mw(0)) of <55%, where Mw(i) is the weight-average molecular weight of the functionalized nitrile rubber after implementation of the process of the invention, and Mw(0) is the weight-average molecular weight of the nitrile rubber used before the process of the invention is commenced.

Functionalized Olefins of the General Formulae (I) and (II)

In the process of the invention it is preferred to use at least one compound of the general formula (I) or (II) as functionalized olefin, in which X is $OR^1$, in which $R^1$ is H, $C_1$-$C_{12}$ alkyl, $C_7$-$C_{18}$ aralkyl, phenyl, naphthyl or fluorenyl and more preferably is H, $C_1$-$C_6$ alkyl, $C_7$-$C_{12}$ aralkyl or phenyl, $O-(CH_2-CH_2-O)_n-R^2$, in which $R^2$ is H, $C_1$-$C_{12}$ alkyl, $C_7$-$C_{18}$ aralkyl, phenyl, naphthyl or fluorenyl and more preferably is H, $C_1$-$C_6$ alkyl, $C_7$-$C_{12}$ aralkyl or phenyl, and n is 1 to 20 and more preferably 1 to 6, $O-(CH_2-CH(CH_3)-O)_n-R^3$, in which $R^3$ is H, $C_1$-$C_{12}$ alkyl, $C_7$-$C_{18}$ aralkyl, phenyl, naphthyl or fluorenyl and more preferably is H, $C_1$-$C_6$ alkyl, $C_7$-$C_{12}$ aralkyl or phenyl and n is 1 to 20 and more preferably 1 to 6, $O-C(=O)-R^4$, in which $R^4$ is H, $C_1$-$C_{12}$ alkyl, $C_7$-$C_{18}$ aralkyl, phenyl, naphthyl or fluorenyl and more preferably is H, $C_1$-$C_6$ alkyl, $C_7$-$C_{12}$ aralkyl or phenyl, $C_6$-$C_{12}$ aryl, which is substituted by at least one radical $OR^5$, in which $R^5$ is H, $C_1$-$C_{12}$ alkyl, $C_7$-$C_{18}$ aralkyl, phenyl, naphthyl or fluorenyl and more preferably is H, $C_1$-$C_6$ alkyl, $C_7$-$C_{12}$ aralkyl or phenyl, or $NH-C(=O)-OR^6$, in which $R^6$ is H, $C_1$-$C_{18}$ alkyl, $C_7$-$C_{24}$ aralkyl, phenyl, naphthyl or fluorenyl and more preferably is H, $C_1$-$C_6$ alkyl, $C_7$-$C_{12}$ aralkyl or phenyl, and Y and Z are identical or different and are $OR^7$, in which $R^7$ is H, $C_1$-$C_{12}$ alkyl, $C_7$-$C_{18}$ aralkyl, phenyl, naphthyl or fluorenyl and more preferably is H, $C_1$-$C_6$ alkyl, $C_7$-$C_{12}$ aralkyl or phenyl, $O-(CH_2-CH_2-O)_n-R^8$, in which $R^8$ is H, $C_1$-$C_{12}$ alkyl, $C_7$-$C_{18}$ aralkyl, phenyl, naphthyl or fluorenyl and more preferably is H, $C_1$-$C_6$ alkyl, $C_7$-$C_{12}$ aralkyl or phenyl and n is 1 to 20 and preferably 1 to 6, O—($CH_2$—$CH(CH_3)$—O)$_n$—$R^9$, in which $R^9$ is H, $C_1$-$C_{12}$ alkyl, $C_7$-$C_{18}$ aralkyl, phenyl, naphthyl or fluorenyl and more preferably is H, $C_1$-$C_6$ alkyl, $C_7$-$C_{12}$ aralkyl or phenyl and n is 1 to 20 and preferably 1 to 6, O—C(═O)—$R^{10}$, in which $R^{10}$ is H, $C_1$-$C_{12}$ alkyl, $C_7$-$C_{18}$ aralkyl, phenyl, naphthyl or fluorenyl and more preferably is H, $C_1$-$C_6$ alkyl, $C_7$-$C_{12}$ aralkyl or phenyl, $C_6$-$C_{12}$ aryl, which is substituted by at least one radical $OR^{11}$, in which $R^{11}$ is H, $C_1$-$C_{12}$ alkyl, $C_7$-$C_{18}$ aralkyl, phenyl, naphthyl or fluorenyl and more preferably is H, $C_1$-$C_6$ alkyl, $C_7$-$C_{12}$ aralkyl or phenyl, or NH—C(═O)—$OR^{12}$, in which $R^{12}$ is H, $C_1$-$C_{12}$ alkyl, $C_7$-$C_{18}$ aralkyl, phenyl, naphthyl or fluorenyl and more preferably is H, $C_1$-$C_6$ alkyl, $C_7$-$C_{12}$ aralkyl or phenyl.

Such compounds of the general formulae (I) and (II) are either available commercially or else may be prepared by processes of synthesis that are known to the skilled person.

More particularly, in accordance with the invention, the following functionalized olefins are used:

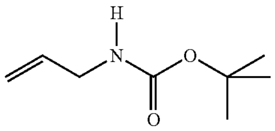

tert butyl N-allylcarbamate

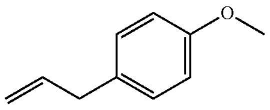

p-allylanisole

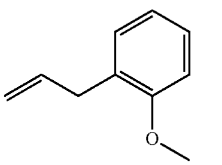

o-allylanisole

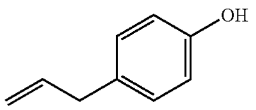

p-allylphenol

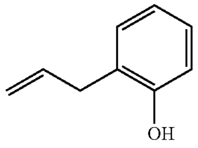

o-allylphenol

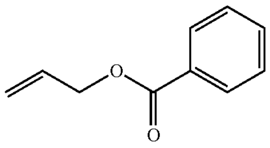

allyl benzoate

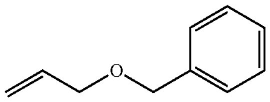

allyl benzyl ether

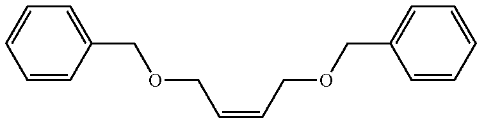

cis-1,4-bisbenzolyloxy-2-butene

-continued

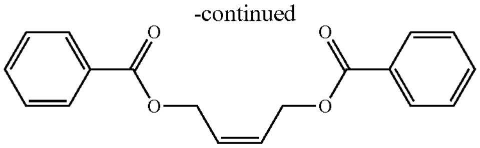

cis-2-butene-1,4-diyl dibenzoate

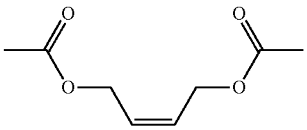

cis-2-butene-1,4-diyl diacetate

Metathesis Catalysts:

The metathesis catalysts for use in accordance with the invention are, in the established way, complex catalysts of transition group 6 or 8 of the Periodic Table, preferably based on molybdenum, osmium or ruthenium and more preferably on osmium or ruthenium. The common structural feature possessed by these complex catalysts is the at least one ligand attached carbenically to the metal. In one preferred embodiment the complex catalyst has two carbene ligands, i.e. two ligands attached carbenically to the central metal of the complex.

Use may be made, for example, of a catalyst of the general formula (A),

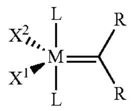

(A)

in which

M is osmium or ruthenium, $X^1$ and $X^2$ are identical or different and represent two ligands, preferably anionic ligands, L represents identical or different ligands, preferably neutral electron donors, R is identical or different at each occurrence and represents hydrogen, alkyl, preferably $C_1$-$C_{30}$ alkyl, cycloalkyl, preferably $C_3$-$C_{20}$ cycloalkyl, alkenyl, preferably $C_2$-$C_{20}$ alkenyl, alkynyl, preferably $C_2$-$C_{20}$ alkynyl, aryl, preferably $C_6$-$C_{24}$ aryl, carboxylate, preferably $C_1$-$C_{20}$ carboxylate, alkoxy, preferably $C_1$-$C_{20}$ alkoxy, alkenyloxy, preferably $C_2$-$C_{20}$ alkenyloxy, alkynyloxy, preferably $C_2$-$C_{20}$ alkynyloxy, aryloxy, preferably $C_6$-$C_{24}$ aryloxy, alkoxycarbonyl, preferably $C_2$-$C_{20}$ alkoxycarbonyl, alkylamino, preferably $C_1$-$C_{30}$ alkylamino, alkylthio, preferably $C_1$-$C_{30}$ alkylthio, arylthio, preferably $C_6$-$C_{24}$ arylthio, alkylsulphonyl, preferably $C_1$-$C_{20}$ alkylsulphonyl, or alkylsulphinyl, preferably $C_1$-$C_{20}$ alkylsulphinyl, it being possible for all of these radicals to be substituted in each case optionally by one or more alkyl, halogen, alkoxy, aryl or heteroaryl radicals, or alternatively both radicals R are bridged, with incorporation of the common C atom to which they are attached, to form a cyclic group, which may he aliphatic or aromatic in nature, is optionally substituted and may contain one or more heteroatoms.

In preferred catalysts of the general formula (A), one radical R is hydrogen and the other radical R is $C_1$-$C_{20}$-alkyl, $C_3$-$C_{10}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$- alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulphonyl or $C_1$-$C_{20}$-alkylsulphinyl, where these radicals may all in each case be substituted by one or more alkyl, halogen, alkoxy, aryl or heteroaryl radicals.

In the catalysts of the general formula (A), $X^1$ and $X^2$ are identical or different and are two ligands, preferably anionic ligands. $X^1$ and $X^2$ can be, for example, hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-aryithiol, $C_1$-$C_{20}$-alkylsulphonyl or $C_1$-$C_{20}$-alkylsulphinyl radicals.

The abovementioned radicals $X^1$ and $X^2$ can also be substituted by one or more further radicals, for example by halogen, preferably fluorine, $C_1$-$C_{10}$-alkyl, $C_1$-$C_{10}$-alkoxy or $C_6$-$C_{24}$-aryl, where these radicals, too, may once again be substituted by one or more substituents selected from the group consisting of halogen, preferably fluorine, $C_1$-$C_5$-alkyl, $C_1$-$C_5$-alkoxy and phenyl. In a preferred embodiment, $X^1$ and $X^2$ are identical or different and are each halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulphonate. In a particularly preferred embodiment, $X^1$ and $X^2$ are identical and are each halogen, in particular chlorine, $CF_3COO$, $CH_3COO$, $CFH_2COO$, $(CH_3)_3CO_3$ $(CF_3)_2(CH_3)CO$, $(CF_3)(CH_3)_2CO$, PhO (phenoxy), MeO (methoxy), EtO (ethoxy), tosylate ($p$-$CH_3$—$C_6H_4$—$SO_3$), mesylate ($CH_3$—$SO_3$) or $CF_3SO_3$ (trifluoromethanesulphonate).

In the general formula (A), the symbols L represent identical or different ligands and are preferably neutral electron donors.

The two ligands L can, for example, be, independently of one another, a phosphine, sulphonated phosphine, phosphate, phosphinite, phosphonite, arsine, stibine, ether, amine, amide, sulphoxide, carboxyl, nitrosyl, pyridine, thioether or imidazolidine ("Im") ligand.

Preference is given to the two ligands L each being, independently of one another, a $C_6$-$C_{24}$-arylphosphine, $C_1$-$C_{10}$-alkylphosphine or $C_3$-$C_{20}$-cycloalkylphosphine ligand, a sulphonated $C_6$-$C_{24}$-arylphosphine or sulphonated $C_1$-$C_{10}$-alkylphosphine ligand, a $C_6$-$C_{24}$-arylphosphinite or $C_1$-$C_{10}$-alkylphosphinite ligand, a $C_6$-$C_{24}$-arylphosphonite or $C_1$-$C_{10}$-alkylphosphonite ligand, a $C_6$-$C_{24}$-aryl phosphite or $C_1$-$C_{10}$-alkyl phosphite ligand, a $C_6$-$C_{24}$-arylarsine or $C_1$-$C_{10}$-alkylarsine ligand, a $C_6$-$C_{24}$-arylarnine or $C_1$-$C_{10}$-alkylamine ligand, a pyridine ligand, a $C_6$-$C_{24}$-aryl sulphoxide or $C_1$-$C_{10}$-alkyl sulphoxide ligand, a $C_6$-$C_{24}$-aryl ether or $C_1$-$C_{10}$-alkyl ether ligand or a $C_6$-$C_{24}$-arylamide or $C_1$-$C_{10}$-alkylamide ligand, each of which may be substituted by a phenyl group which is in turn optionally substituted by a halogen-, $C_1$-$C_5$-alkyl or $C_1$-$C_5$-alkoxy radical.

The term "phosphine" includes, for example, $PPh_3$, P(p-Tol)$_3$, P(o-Tol)$_3$, $PPh(CH_3)_2$, $P(CF_3)_3$, $P(p\text{-}FC_6H_4)_3$, $P(p\text{-}CF_3C_6H_4)_3$, $P(C_6H_4$—$SO_3Na)_3$, $P(CH_2C_6H_4$—$SO_3Na)_3$, P(isopropyl)$_3$, $P(CHCH_3(CH_2CH_3))_3$, P(cyclopentyl)$_3$, P(cyclohexyl)$_3$, P(neopentyl)$_3$ and P(neophenyl)$_3$.

The term "phosphinite" includes, for example, triphenylphosphinite, tricyclohexylphosphinite, tnisopropylphosphinite and methyldiphenylphosphinite.

The term "phosphite" includes, for example, triphenyl phosphite, tricyclohexyl phosphite, tri-tert-butyl phosphite, triisopropyl phosphite and methyl diphenyl phosphite.

The term "stibine" includes, for example, triphenylstibine, tricyclohexylstibine and trimethylstibine.

The term "sulphonate" includes, for example, trifluoromethanesulphonate, tosylate and mesylate.

The term "sulphoxide" includes, for example, $(CH_3)_2S(=O)$ and $(C_6H_5)_2S=O$.

The term "thioether" includes, for example, $CH_3SCH_3$, $C_6H_5SCH_3$, $CH_3OCH_2CH_2SCH_3$ and tetrahydrothiophene.

For the purposes of the present application, the term "pyridine" is used as a collective term for all nitrogen-containing ligands as are mentioned, for example, by Grubbs in WO-A-03/011455. Examples are: pyridine, picolines (α-, β- and γ-picoline), lutidines (2,3-, 2,4-, 2,5-, 2,6-, 3,4- and 3,5-lutidine), collidine (2,4,6-trimethylpyridine), trifluoromethylpyridine, phenylpyridine, 4-(dimethylamino)pyridine, chloropyridines, bromopyridines, nitropyridines, quinoline, pyrimidine, pyrrole, imidazole and phenylimidazole.

If one or both of the ligands L is an imidazolidine radical (Im), this radical usually has a structure corresponding to the general formulae (IIa) or (IIb),

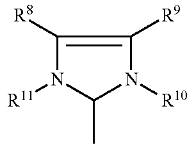

(IIa)

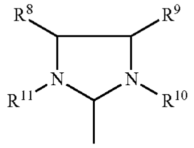

(IIb)

in which $R^8$, $R^9$, $R^{10}$, $R^{11}$ are identical or different and are hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, $C_1$-$C_{20}$-alkylsulphonyl, $C_1$-$C_{20}$-alkylsulphonate, $C_6$-$C_{20}$-arylsulphonate or $C_1$-$C_{20}$-alkylsulphinyl.

Optionally, one or more of the radicals $R^8$, $R^9$, $R^{10}$, $R^{11}$ are independently of one another substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, where these abovementioned substituents may in turn be substituted by one or more radicals, preferably radicals selected from the group consisting of halogen, in particular chlorine or bromine, $C_1$-$C_5$-alkyl, $C_1$-$C_5$-alkoxy and phenyl.

Merely in the interest of clarity, it may be added that the structures of the imidazolidine radical depicted in the general formulae (IIa) and (IIb) in the present specification are equivalent to the structures (IIa') and (IIb') which are frequently also found in the literature for this imidazolidine radical (Im) and emphasize the carbene character of the imidazolidine radical. This applies analogously to the associated preferred structures (IIIa)-(IIIf) depicted below.

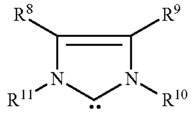

(IIa')

-continued

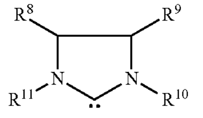
(IIb')

In a preferred embodiment of the catalysts of the general formula (A), $R^8$ and $R^9$ are each, independently of one another, hydrogen, $C_6$-$C_{24}$-aryl, particularly preferably phenyl, straight-chain or branched $C_1$-$C_{10}$-alkyl, particularly preferably propyl or butyl, or together with the carbon atoms to which they are bound form a cycloalkyl or aryl radical, where all the abovementioned radicals may in turn be substituted by one or more further radicals selected from the group consisting of straight-chain or branched $C_1$-$C_{10}$-alkyl, $C_1$-$C_{10}$-alkoxy, $C_6$-$C_{24}$-aryl and a functional group selected from the group consisting of hydroxyl, thiol, thioether, ketone, aldehyde, ester, ether, amine, imine, amide, nitro, carboxylic acid, disulphide, carbonate, isocyanate, carbodiimide, carboalkoxy, carbamate and halogen.

In a preferred embodiment of the catalysts of the general formula (A), the radicals $R^{10}$ and $R^{11}$ are also identical or different and are each straight-chain or branched $C_1$-$C_{10}$-alkyl, particularly preferably isopropyl or neopentyl, $C_3$-$C_{10}$-cycloalkyl, preferably adamantly, $C_6$-$C_{24}$-aryl, particularly preferably phenyl, $C_1$-$C_{10}$-alkylsulphonate, particularly preferably methanesulphonate, $C_6$-$C_{10}$-arylsulphonate, particularly preferably p-toluenesulphonate.

The abovementioned radicals as meanings of $R^{10}$ and $R^{11}$ are optionally substituted by one or more further radicals selected from the group consisting of straight-chain or branched $C_1$-$C_5$-alkyl, in particular methyl, $C_1$-$C_5$-alkoxy, aryl and a functional group selected from the group consisting of hydroxyl, thiol, thioether, ketone, aldehyde, ester, ether, amine, imine, amide, nitro, carboxylic acid, disulphide, carbonate, isocyanate, carbodiimide, carboalkoxy, carbamate and halogen.

In particular, the radicals $R^{10}$ and $R^{11}$ can be identical or different and are each isopropyl, neopentyl, adamantyl, mesityl or 2,6-diisopropylphenyl.

Particularly preferred imidazolidine radicals (Im) have the following structures (IIIa) to (IIIf), where Ph is in each case a phenyl radical, Bu is a butyl radical and Mes is in each case a 2,4,6-trimethylphenyl radical or Mes is alternatively in all cases 2,6-diisopropylphenyl.

(IIIa)

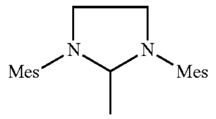

(IIIb)

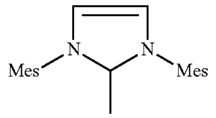

(IIIc)

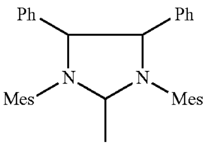

-continued (IIId)

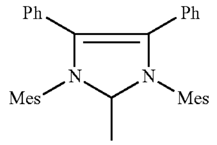

(IIIe)

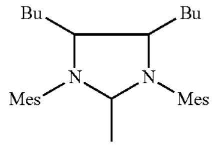

(IIIf)

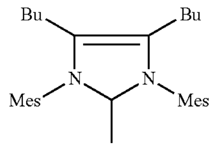

A wide variety of representatives of the catalysts of the formula (A) are known in principle, e.g. from WO-A-96/04289 and WO-A-97/06185.

As an alternative to the preferred Im radicals, one or both ligands L in the general formula (A) are also preferably identical or different trialkylphosphine ligands in which at least one of the alkyl groups is a secondary alkyl group or a cycloalkyl group, preferably isopropyl, isobutyl, sec-butyl, neopentyl, cyclopentyl or cyclohexyl.

Particular preference is given to one or both ligands L in the general formula (A) being a trialkylphosphine ligand in which at least one of the alkyl groups is a secondary alkyl group or a cycloalkyl group, preferably isopropyl, isobutyl, sec-butyl, neopentyl, cyclopentyl or cyclohexyl.

Particular preference is given to catalysts which come under the general formula (A) and have the structures (IV) (Grubbs (I) catalyst) and (V) (Grubbs (II) catalyst), where Cy is cyclohexyl.

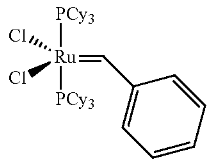
(IV)

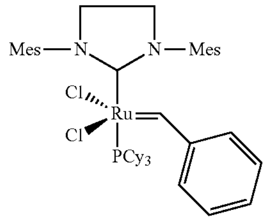
(V)

In a further embodiment, use is made of a catalyst of the general formula (A1)

(A1)

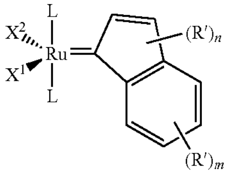

in which $X^1$, $X^2$ and L can have the same general, preferred and particularly preferred meanings as in the general formula (A), n is 0, 1 or 2, m is 0, 1, 2, 3 or 4 and the radicals R' are identical or different and are alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radicals which may all in each case be substituted by one or more alkyl, halogen, alkoxy, aryl or heteroaryl radicals.

As preferred catalyst coming under the general formula (A1), it is possible to use the catalyst of the formula (VI) below, where Mes in each case is 2,4,6-trimethylphenyl and Ph is phenyl.

(VI)

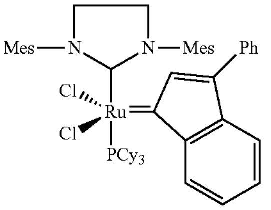

This catalyst, which is also referred to in the literature as “Nolan catalyst”, is known, for example, from WO-A-2004/112951.

Also established is the use of a catalyst of the general formula (B), (B)

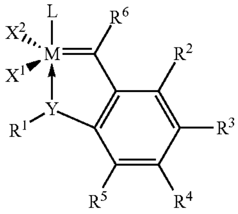

in which

M is ruthenium or osmium, $X^1$ and $X^2$ are identical or different ligands, preferably anionic ligands, Y is oxygen (O), sulphur (S), an N—$R^1$ radical or a P—$R^1$ radical, where $R^1$ is as defined below, $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may all in each case optionally be substituted by one or more alkyl, halogen, alkoxy, aryl or heteroaryl radicals, $R^2$, $R^3$, $R^4$ and $R^5$ are identical or different and are each hydrogen or an organic or inorganic radical, $R^6$ is hydrogen or an alkyl, alkenyl, alkynyl or aryl radical and L is a ligand which has the same meanings as for formula (A).

The catalysts of the general formula (B) are known in principle. Representatives of this class of compounds are the catalysts described by Hoveyda et al. in US 2002/0107138 A1 and Angew. Chem. Int. Ed. 2003, 42, 4592, and the catalysts described by Grela in WO-A-2004/035596, Eur. J. Org. Chem 2003, 963-966 and Angew. Chem. Int. Ed. 2002, 41, 4038 and also in J. Org. Chem. 2004, 69, 6894-96 and Chem. Eur. J 2004, 10, 777-784. The catalysts are commercially available or can be prepared as described in the literature references cited.

In the catalysts of the general formula (B), L is a ligand which usually possesses an electron donor function and can have the same general, preferred and particularly preferred meanings as L in the general formula (A).

Furthermore, L in the general formula (B) is preferably a $P(R^7)_3$ radical, where the radicals $R^7$ are each, independently of one another, $C_1$-$C_6$-alkyl, $C_3$-$C_8$-cycloalkyl or aryl, or else is a substituted or unsubstituted imidazolidine radical (“Im”).

$C_1$-$C_6$-Alkyl is, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl and n-hexyl.

$C_3$-$C_8$-Cycloalkyl encompasses cyclopropyl, cyclobutyl, cyclopentyl, cyclohexyl, cycloheptyl and cyclooctyl.

Aryl is an aromatic radical having from 6 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

The imidazolidine radical (Im) has a structure of the general formula (IIa) or (IIb), (IIa)

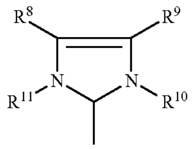

(IIb)

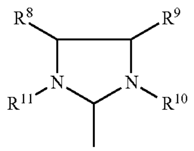

in which $R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, $C_1$-$C_{20}$-alkylsulphonyl, $C_1$-$C_{20}$-alkylsulphonate, $C_6$-$C_{20}$-arylsulphonate or $C_1$-$C_{20}$-alkylsulphinyl.

If appropriate, one or more of the radicals $R^8$-$R^{11}$ may, independently of one another, be substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, where these abovementioned substituents may in turn be substituted by one or more radicals, preferably radicals selected from the group consisting of halogen, in particular chlorine or bromine, $C_1$-$C_5$-alkyl, $C_1$-$C_5$-alkoxy and phenyl.

It is established in particular to use catalysts of the general formula (B) in which $R^8$ and $R^9$ are each, independently of one another, hydrogen, $C_6$-$C_{24}$-aryl, particularly preferably phenyl, straight-chain or branched $C_1$-$C_{10}$-alkyl, particularly preferably propyl or butyl, or together with the carbon atoms to which they are bound form a cycloalkyl or aryl radical, where all the abovementioned radicals may optionally in turn be substituted by one or more further radicals selected from the group consisting of straight-chain or branched $C_1$-$C_{10}$-alkyl, $C_1$-$C_{10}$-alkoxy, $C_6$-$C_{24}$-aryl and a functional group selected from the group consisting of hydroxyl, thiol, thioether, ketone, aldehyde, ester, ether, amine, imine, amide, nitro, carboxylic acid, disulphide, carbonate, isocyanate, carbodiimide, carboalkoxy, carbamate and halogen.

In a further preferred embodiment, use is made of a catalyst of the general formula (B) in which the radicals $R^{10}$ and $R^{11}$ are identical or different and are each straight-chain or branched $C_1$-$C_{10}$-alkyl, particularly preferably i-propyl or neopentyl, $C_3$-$C_{10}$-cycloalkyl, preferably adamantyl, $C_6$-$C_{24}$-aryl, particularly preferably phenyl, $C_1$-$C_{10}$-alkylsulphonate, particularly preferably methanesulphonate, or $C_6$-$C_{10}$-arylsulphonate, particularly preferably p-toluenesulphonate.

The abovementioned radicals as meanings of $R^{10}$ and $R^{11}$ are optionally substituted by one or more further radicals selected from the group consisting of straight-chain or branched $C_1$-$C_5$-alkyl, in particular methyl, $C_1$-$C_5$-alkoxy, aryl and a functional group selected from the group consisting of hydroxyl, thiol, thioether, ketone, aldehyde, ester, ether, amine, imine, amide, nitro, carboxylic acid, disulphide, carbonate, isocyanate, carbodiimide, carboalkoxy, carbamate and halogen.

In particular, the radicals $R^{10}$ and $R^{11}$ can be identical or different and are isopropyl, neopentyl, adamantyl or mesityl.

Particularly preferred imidazolidine radicals (Im) have the structures (IIIa-IIIf) already mentioned above, where Mes is in each case 2,4,6-trimethylphenyl.

In the catalysts of the general formula (B), $X^1$ and $X^2$ are identical or different and can be, for example, hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphinyl.

The abovementioned radicals $X^1$ and $X^2$ can also be substituted by one or more further radicals, for example by halogen, preferably fluorine, $C_1$-$C_{10}$-alkyl, $C_1$-$C_{10}$-alkoxy or $C_6$-$C_{24}$-aryl radicals, where the latter radicals may in turn also be substituted by one or more substituents selected from the group consisting of halogen, preferably fluorine, $C_1$-$C_5$-alkyl, $C_1$-$C_5$-alkoxy and phenyl.

In a preferred embodiment, $X^1$ and $X^2$ are identical or different and are each halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulphonate.

In a particularly preferred embodiment, $X^1$ and $X^2$ are identical and are halogen, in particular chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate ($CH_3$—$SO_3$) or $CF_3SO_3$ (trifluoromethanesulphonate).

In the general formula (B), the radical $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may all in each case optionally be substituted by one or more alkyl, halogen, alkoxy, aryl or heteroaryl radicals.

The radical $R^1$ is usually a $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl radical which may all in each case optionally be substituted by one or more alkyl, halogen, alkoxy, aryl or heteroaryl radicals.

$R^1$ is preferably a $C_3$-$C_{20}$-cycloalkyl radical, a $C_6$-$C_{24}$-aryl radical or a straight-chain or branched $C_1$-$C_{30}$-alkyl radical, with the latter being able, if appropriate, to be interrupted by one or more double or triple bonds or also one or more heteroatoms, preferably oxygen or nitrogen. $R^1$ is particularly preferably a straight-chain or branched $C_1$-$C_{12}$-alkyl radical.

The $C_3$-$C_{20}$-cycloalkyl radical encompasses, for example, cyclopropyl, cyclobutyl, cyclopentyl, cyclohexyl, cycloheptyl and cyclooctyl.

The $C_1$-$C_{12}$-alkyl radical can be, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, n-heptyl, n-octyl, n-decyl or n-dodecyl. In particular, $R^1$ is methyl or isopropyl.

The $C_6$-$C_{24}$-aryl radical is an aromatic radical having from 6 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

In the general formula (B), the radicals $R^2$, $R^3$, $R^4$ and $R^5$ are identical or different and can be hydrogen or organic or inorganic radicals.

In an appropriate embodiment, $R^2$, $R^3$, $R^4$, $R^5$ are identical or different and are each hydrogen, halogen, nitro, $CF_3$, alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radicals which may all be in each case optionally substituted by one or more alkyl, alkoxy, halogen, aryl or heteroaryl radicals.

$R^2$, $R^3$, $R^4$, $R^5$ are usually identical or different and are hydrogen, halogen, preferably chlorine or bromine, nitro, $CF_3$, $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl radicals which may all in each case optionally be substituted by one or more $C_1$-$C_{30}$-alkyl, $C_1$-$C_{20}$-alkoxy, halogen, $C_6$-$C_{24}$-aryl or heteroaryl radicals.

In a particularly established embodiment, $R^2$, $R^3$, $R^4$, $R^5$ are identical or different and are each nitro, straight-chain or branched $C_1$-$C_{30}$-alkyl, $C_5$-$C_{20}$-cycloalkyl, straight-chain or branched $C_1$-$C_{20}$-alkoxy or $C_6$-$C_{24}$-aryl radicals, preferably phenyl or naphthyl. The $C_1$-$C_{30}$-alkyl radicals and $C_1$-$C_{20}$-alkoxy radicals may optionally be interrupted by one or more double or triple bonds or also one or more heteroatoms, preferably oxygen or nitrogen.

Furthermore, two or more of the radicals $R^2$, $R^3$, $R^4$ or $R^5$ can also be bridged via aliphatic or aromatic structures. For example, $R^3$ and $R^4$ together with the carbon atoms to which they are bound in the phenyl ring of the formula (B) can form a fused-on phenyl ring so that, overall, a naphthyl structure results.

In the general formula (B), the radical $R^6$ is hydrogen or an alkyl, alkenyl, alkynyl or aryl radical. $R^6$ is preferably hydrogen, a $C_1$-$C_{30}$-alkyl radical, a $C_2$-$C_{20}$-alkenyl radical, a $C_2$-$C_{20}$-alkynyl radical or a $C_6$-$C_{24}$-aryl radical. $R^6$ is particularly preferably hydrogen.

Further suitable are catalysts of the general formula (B1), (B1)

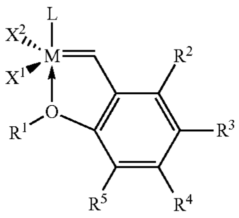

in which

M, L, $X^1$, $X^2$, $R^1$, $R^2$, $R^3$, $R^4$ and $R^5$ can have the general, preferred and particularly preferred meanings mentioned for the general formula (B).

The catalysts of the general formula (B1) are known in principle from, for example, US 2002/0107138 A1 (Hoveyda et al.) and can be obtained by preparative methods indicated there.

Particular preference is given to catalysts of the general formula (B1) in which M is ruthenium, $X^1$ and $X^2$ are both halogen, in particular both chlorine, $R^1$ is a straight-chain or branched $C_1$-$C_{12}$-alkyl radical, especially isopropyl, $R^2$, $R^3$, $R^4$, $R^5$ have the general and preferred meanings mentioned for the general formula (B) and more particularly are all hydrogen, and L has the general and preferred meanings mentioned for the general formula (B) and more particularly is a substituted or unsubstituted imidazolidine radical of the formula (IIa) or (IIb), (IIa)

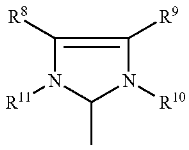

(IIb)

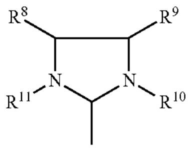

in which $R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl. $C_1$-$C_{20}$-alkylthio, $C_6$-$C_{24}$-arylthio, $C_1$-$C_{20}$-alkylsulphonyl, $C_1$-$C_{20}$-alkylsulphonate, $C_6$-$C_{24}$-arylsulphonate or $C_1$-$C_{20}$-alkylsulphinyl, where the abovementioned radicals may in each case be substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, and these abovementioned substituents may also in turn be substituted by one or more radicals, preferably radicals selected from the group consisting of halogen, in particular chlorine or bromine, $C_1$-$C_5$-alkyl, $C_1$-$C_5$-alkoxy and phenyl.

Very particular preference is given to a catalyst which comes under the general structural formula (B1) and has the formula (VII), where Mes is in each case 2,4,6-trimethylphenyl.

(VII)

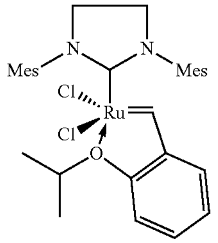

This catalyst (VII) is also referred to as "Hoveyda catalyst" in the literature.

Further suitable catalysts are those which come under the general structural formula (B1) and have one of the formulae (VIII), (IX), (X), (XI), (XII), (XIII), (XIV) and (XV) below, where Mes is in each case 2,4,6-trimethylphenyl.

(VIII)

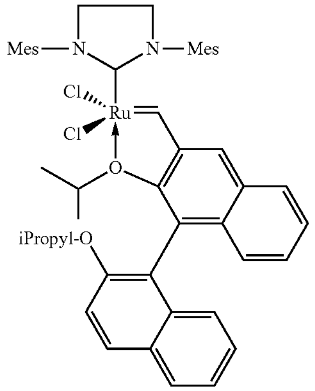

(IX)

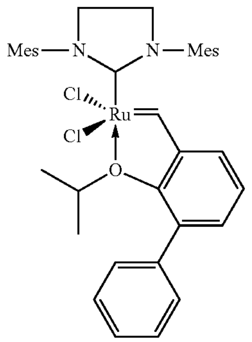

-continued (X)

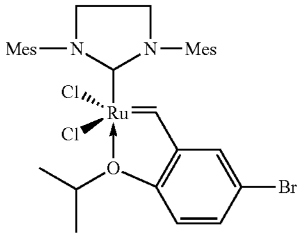

(XI)

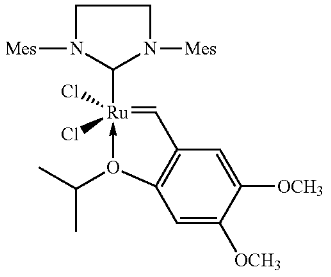

(XII)

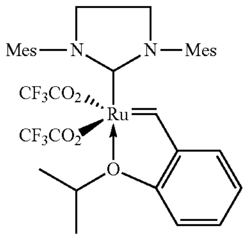

(XIII)

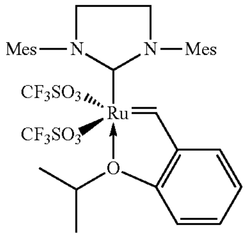

(XIV)

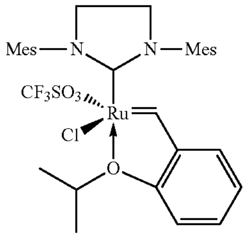

(XV)

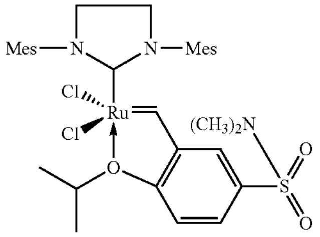

A further suitable catalyst has the general formula (B2), (B2)

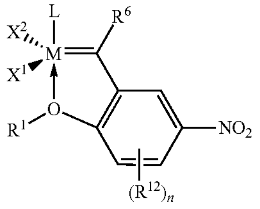

in which

M, L, $X^1$, $X^2$, $R^1$ and $R^6$ have the general and preferred meanings mentioned for the formula (B), the radicals $R^{12}$ are identical or different and have the general and preferred meanings, with the exception of hydrogen, mentioned for the radicals $R^2$, $R^3$, $R^4$ and $R^5$ in the formula (B) and n is 0, 1, 2 or 3.

The catalysts of the general formula (B2) are known in principle from, for example, WO-A-2004/035596 (Grela) and can be obtained by preparative methods indicated there.

Particular preference is given to catalysts of the general formula (B2) in which M is ruthenium, $X^1$ and $X^2$ are both halogen, in particular both chlorine, $R^1$ is a straight-chain or branched $C_1$-$C_{12}$-alkyl radical, especially isopropyl, $R^{12}$ has the meanings mentioned for the general formula (B2), n is 0, 1, 2 or 3, and especially 0, $R^6$ is hydrogen and L has the meanings mentioned for the general formula (B) and especially is a substituted or unsubstituted imidazolidine radical of the formulae (IIa) or (IIb), where $R^8$, $R^9$, $R^{10}$, $R^{11}$ are identical or different and have the meanings mentioned for the very particularly preferred catalysts of the general formula (B1).

Particularly suitable is a catalyst of the structure (XVI) below (XVI)

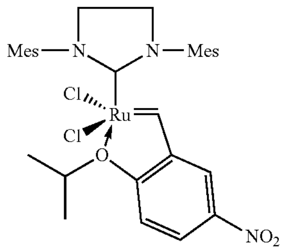

The catalyst (XVI) is also referred to as "Grela catalyst" in the literature.

A further suitable catalyst which comes under the general formula (B2) has the following structure (XVII), where Mes is in each case 2,4,6-trimethylphenyl.

(XVII)

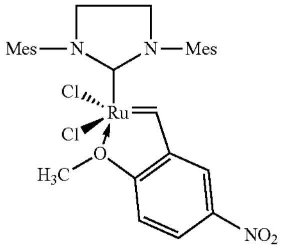

An alternative option also is to use a catalyst of the general formula (B3) having a dendritic structure, (B3)

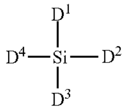

in which $D^1$, $D^2$, $D^3$ and $D^4$ each have a structure of the general formula (XVIII) shown below which is attached via the methylene group shown on the right to the silicon of the formula (B3), (XVIII)

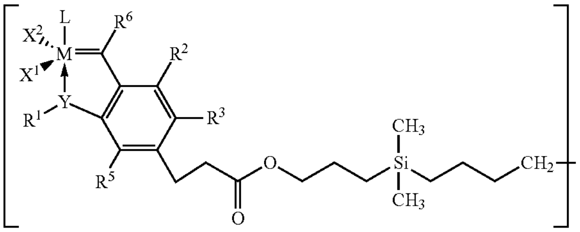

and in which

M, L, $X^1$, $X^2$, $R^1$, $R^2$, $R^3$, $R^5$ and $R^6$ can have the general and preferred meanings mentioned for the general formula (B).

The catalysts of the general formula (B3) are known from US 2002/0107138 A1 and can be prepared as described there.

A further alternative embodiment provides a catalyst of the formula (B4), (B4)

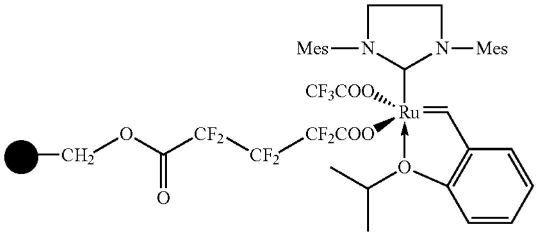

where the symbol ● stands for a support.

The support is preferably a poly(styrene-divinylbenzene) copolymer (PS-DVB).

The catalysts of formula (B4) are known in principle from Chem. Eur. J. 2004 10, 777-784 and can be obtained by the preparative methods described there.

All the abovementioned catalysts of type (B) can either be used as such or else can be applied to and immobilized on a solid support. Suitable solid phases or supports are materials which firstly are inert towards the reaction mixture of the metathesis and secondly do not adversely affect the activity of the catalyst. To immobilize the catalyst, it is possible to use, for example, metals, glass, polymers, ceramic, organic polymer beads or inorganic sol-gels, carbon black, silica, silicates, calcium carbonate and barium sulphate.

A further embodiment provides a catalyst of the general formula (C), (C)

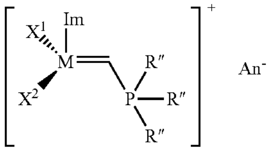

in which

M is ruthenium or osmium, $X^1$ and $X^2$ are identical or different and are anionic ligands, R" are identical or different and are organic radicals, Im is a substituted or unsubstituted imidazolidine radical and An is an anion.

The catalysts of the general formula (C) are known in principle (see, for example, Angew. Chem. Int. Ed. 2004, 43, 6161-6165).

$X^1$ and $X^2$ in the general formula (C) can have the same general, preferred and particularly preferred meanings as in the formulae (A) and (B).

The imidazolidine radical (Im) usually has a structure of the general formulae (IIa) or (IIb) which have been mentioned above for the catalyst type of the formulae (A) and (B) and can have all the structures mentioned there as preferred, in particular those of the formulae (IIIa)-(IIIf).

The radicals R" in the general formula (C) are identical or different and are each a straight-chain or branched $C_1$-$C_{30}$-alkyl, $C_5$-$C_{30}$-cycloalkyl or aryl radical, where the $C_1$-$C_{30}$-alkyl radicals may be interrupted by one or more double or triple bonds or one or more heteroatoms, preferably oxygen or nitrogen.

Aryl is an aromatic radical having from 6 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

Preference is given to the radicals R" in the general formula (C) being identical and each being phenyl, cyclohexyl, cyclopentyl, isopropyl, o-tolyl, o-xylyl or mesityl.

A further alternative option is to use a catalyst of the general formula (D)

(D)

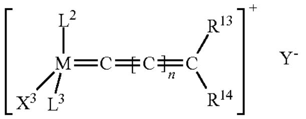

in which

M is ruthenium or osmium, $R^{13}$ and $R^{14}$ are each, independently of one another, hydrogen, $C_1$-$C_{20}$-alkyl, $C_2$-$C_{20}$-alkenyl, $C_2$-$C_{20}$ alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_1$-$C_{20}$-alkylsulphonyl or $C_1$-$C_{20}$ alkylsulphinyl, $X^3$ is an anionic ligand, $L^2$ is a neutral π-bonded ligand, irrespective of whether it is monocyclic or polycyclic, $L^3$ is a ligand selected from the group consisting of phosphines, sulphonated phosphines, fluorinated phosphines, functionalized phosphines having up to three aminoalkyl, ammonioalkyl, alkoxyalkyl, alkoxycarbonylalkyl, hydrocarbonylalkyl, hydroxyalkyl or ketoalkyl groups, phosphites, phosphinites, phosphonites, phosphinamines, arsines, stibines, ethers, amines, amides, imines, sulphoxides, thioethers and pyridines, Y is a non-coordinating anion and n is 0, 1, 2, 3, 4 or 5.

A further embodiment entails using a catalyst of the general formula (E), (E)

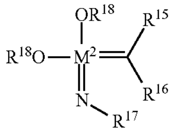

in which $M^2$ is molybdenum, $R^{15}$ and $R^{16}$ are identical or different and are each hydrogen, $C_1$-$C_{20}$-alkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_1$-$C_{20}$-alkylsulphonyl or $C_1$-$C_{20}$-alkylsulphinyl, $R^{17}$ and $R^{18}$ are identical or different and are each a substituted or halogen-substituted $C_1$-$C_{20}$-alkyl, $C_6$-$C_{24}$-aryl, $C_6$-$C_{30}$-aralkyl radical or silicone-containing analogues thereof.

A further alternative option is to use a catalyst of the general formula (F), (F)

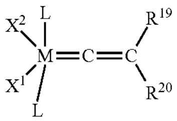

in which

M is ruthenium or osmium, $X^1$ and $X^2$ are identical or different and are anionic ligands which can have all meanings of $X^1$ and $X^2$ mentioned in the general formulae (A) and (B), the symbols L represent identical or different ligands which can have all meanings of L mentioned in the general formulae (A) and (B), $R^{19}$ and $R^{20}$ are identical or different and are each hydrogen or substituted or unsubstituted alkyl.

A further alternative option is to use a catalyst of the general formula (G), (H) or (K), (G)

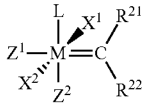

(H)

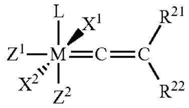

(K)

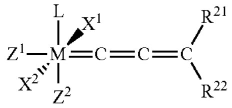

in which

M is osmium or ruthenium, $X^1$ and $X^2$ are identical or different and are two ligands, preferably anionic ligands, L is a ligand, preferably a neutral electron donor, $Z^1$ and $Z^2$ are identical or different and are neutral electron donors, $R^{21}$ and $R^{22}$ are each, independently of one another, hydrogen alkyl, cycloalkyl, alkenyl, alkynyl, aryl, carboxylate, alkoxy, alkenyloxy, alkynyloxy, aryloxy, alkoxycarbonyl, alkylamino, alkylthio, alkylsulphonyl or alkylsulphinyl which are in each case substituted by one or more radicals selected from among alkyl, halogen, alkoxy, aryl or heteroaryl.

The catalysts of the general formulae (G), (H) and (K) are known in principle, e.g. from WO 2003/011455 A1, WO 2003/087167 A2, Organometallics 2001, 20, 5314 and Angew. Chem. Int. Ed. 2002, 41, 4038. The catalysts are commercially available or can be synthesized by the preparative methods indicated in the abovementioned literature references.

In the catalysts which can be used according to the invention, of the general formulae (G), (H) and (K), $Z^1$ and $Z^2$ are identical or different and are neutral electron donors. These ligands are usually weakly coordinating. The ligands are typically optionally substituted heterocyclic groups. These can be five- or six-membered monocyclic groups having from 1 to 4, preferably from 1 to 3 and particularly preferably 1 or 2, heteroatoms or bicyclic or polycyclic structures made up of 2, 3, 4 or 5 five- or six-membered monocyclic groups of this type, where all the abovementioned groups may in each case optionally be substituted by one or more alkyl, preferably $C_1$-$C_{10}$-alkyl, cycloalkyl, preferably $C_3$-$C_8$-cycloalkyl, alkoxy, preferably $C_1$-$C_{10}$-alkoxy, halogen, preferably chlorine or bromine, aryl, preferably $C_6$-$C_{24}$-aryl, or heteroaryl, preferably $C_5$-$C_{23}$-heteroaryl, radicals which may in turn each be substituted by one or more groups, preferably groups selected from the group consisting of halogen, in particular chlorine or bromine, $C_1$-$C_5$-alkyl, $C_1$-$C_5$-alkoxy and phenyl.

Examples of $Z^1$ and $Z^2$ encompass nitrogen-containing heterocycles such as pyridines, pyridazines, bipyridines, pyrimidines, pyrazines, pyrazolidines, pyrrolidines, piperazines, indazoles, quinolines, purines, acridines, bisimidazoles, picolylimines, imidazolidines and pyrroles.

$Z^1$ and $Z^2$ can also be bridged to one another to form a cyclic structure. In this case, $Z^1$ and $Z^2$ form a single bidentate ligand.

In the catalysts of the general formulae (G), (H) and (K), L can adopt the same general, preferred and particularly preferred meanings as L in the general formulae (A) and (B).

In the catalysts of the general formulae (G), (H) and (K), $R^{21}$ and $R^{22}$ are identical or different and are each alkyl, preferably $C_1$-$C_{30}$-alkyl, particularly preferably $C_1$-$C_{20}$-alkyl, cycloalkyl, preferably $C_3$-$C_{20}$-cycloalkyl, particularly preferably $C_3$-$C_8$-cycloalkyl, alkenyl, preferably $C_2$-$C_{20}$-alkenyl, particularly preferably $C_2$-$C_{16}$-alkenyl, alkynyl, preferably $C_2$-$C_{20}$-alkynyl, particularly preferably $C_2$-$C_{16}$-alkynyl, aryl, preferably $C_6$-$C_{24}$-aryl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulphonyl, preferably $C_2$-$C_{20}$-alkylsulphonyl, or alkylsulphinyl, preferably $C_1$-$C_{20}$-alkylsulphinyl, where the abovementioned substituents may be substituted by one or more alkyl, halogen, alkoxy, aryl or heteroaryl radicals.

In the catalysts of the general formulae (G), (H) and (K), $X^1$ and $X^2$ are identical or different and can have the same general, preferred and particularly preferred meanings as indicated above for $X^1$ and $X^2$ in the general formula (A).

Preference is given to using catalysts of the general formulae (G), (H) and (K) in which M is ruthenium, $X^1$ and $X^2$ are both halogen, in particular chlorine, $R^1$ and $R^2$ are identical or different and are five- or six-membered monocyclic groups having from 1 to 4, preferably from 1 to 3 and particularly preferably 1 or 2, heteroatoms or bicyclic or polycyclic structures made up of 2, 3, 4 or 5 five- or six-membered monocyclic groups of this type, where all the abovementioned groups may in each case be substituted by one or more alkyl, preferably $C_1$-$C_{10}$-alkyl, cycloalkyl, preferably $C_3$-$C_8$-cycloalkyl, alkoxy, preferably $C_1$-$C_{10}$-alkoxy, halogen, preferably chlorine or bromine, aryl, preferably $C_6$-$C_{24}$-aryl, or heteroaryl, preferably $C_5$-$C_{23}$-heteroaryl, radicals, $R^{21}$ and $R^{22}$ are identical or different and are each $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulphonyl, $C_1$-$C_{20}$-alkylsulphinyl, and L has a structure of the above-described general formula (IIa) or (IIb), in particular of the formulae (IIIa) to (IIIf).

A particularly preferred catalyst which comes under the general formula (G) has the structure (XIX), (XIX)

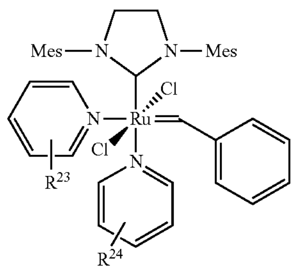

in which $R^{23}$ and $R^{24}$ are identical or different and are each halogen, straight-chain or branched $C_1$-$C_{20}$-alkyl, $C_1$-$C_{20}$-heteroalkyl, $C_1$-$C_{10}$-haloalkyl, $C_1$-$C_{10}$-alkoxy, $C_6$-$C_{24}$-aryl, preferably phenyl, formyl, nitro, nitrogen heterocycles, preferably pyridine, piperidine or pyrazine, carboxy, alkylcarbonyl, halocarbonyl, carbamoyl, thiocarbamoyl, carbamido, thioformyl, amino, dialkylamino, trialkylsilyl or trialkoxysilyl.

The abovementioned radicals $C_1$-$C_{20}$-alkyl, $C_1$-$C_{20}$-heteroalkyl, $C_1$-$C_{10}$-haloalkyl, $C_1$-$C_{10}$-alkoxy, $C_6$-$C_{24}$-aryl, preferably phenyl, formyl, nitro, nitrogen heterocycles, preferably pyridine, piperidine or pyrazine, carboxy, alkylcarbonyl, halocarbonyl, carbamoyl, thiocarbamoyl, carbamido, thioformyl, amino, trialkylsilyl and trialkoxysilyl may in turn each be substituted by one or more halogen, preferably fluorine, chlorine or bromine, $C_1$-$C_5$-alkyl, $C_1$-$C_5$-alkoxy or phenyl radicals.

Particularly preferred embodiments of the catalyst of the formula (XIX) have the structure (XIX a) or (XIX b), where $R^{23}$ and $R^{24}$ have the same meanings as indicated in the formula (XIX).

(XIXa)

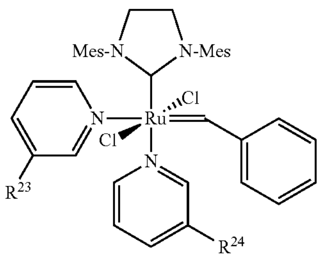

(XIXb)

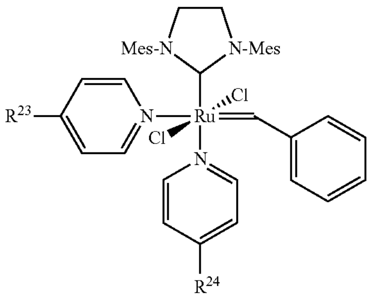

If $R^{23}$ and $R^{24}$ in formula (XIXa) are Br, the compound is also referred to in the literature as the Grubbs III catalyst.

Further suitable catalysts which come under the general formulae (G), (H) and (K) have the following structural forms (XX)-(XXXI), where Mes is in each case 2,4,6-trimethylphenyl and Ph is phenyl.

(XX)

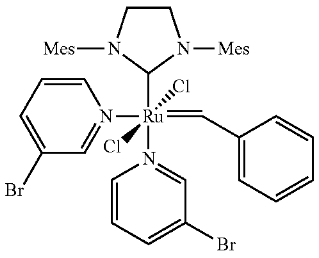

-continued
(XXI)
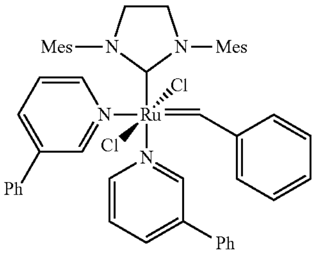
(XXII)
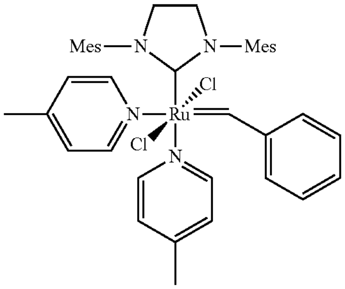
(XXIII)
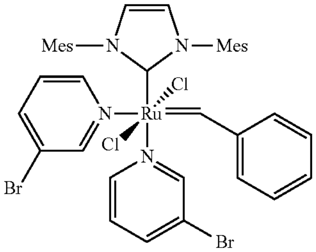
(XXIV)
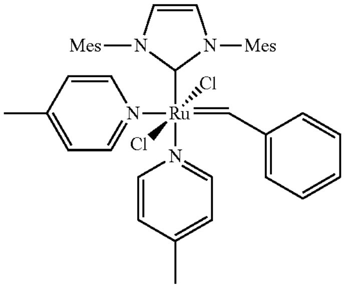
(XXV)
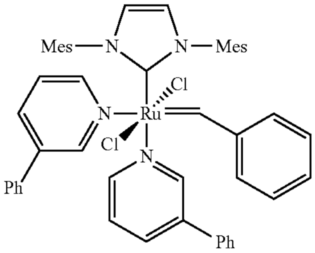
-continued
(XXVI)
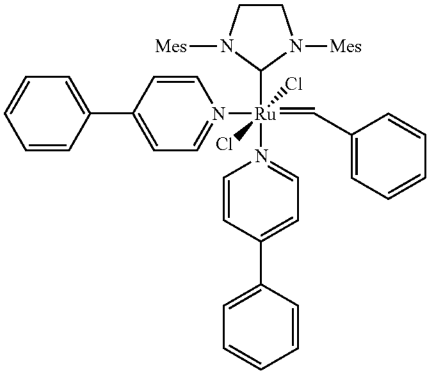
(XXVII)
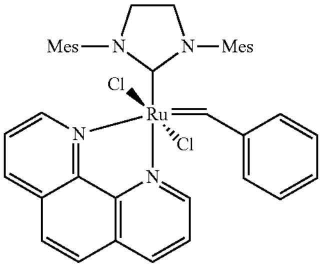
(XXVIII)
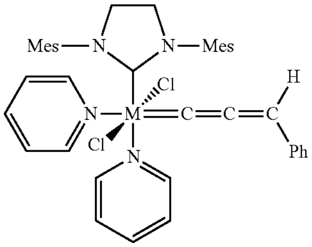
(XXIX)
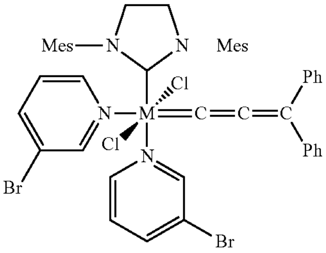
(XXX)
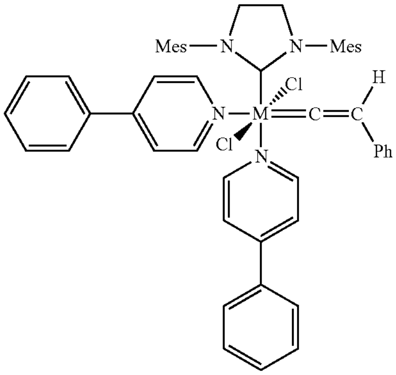

-continued (XXXI)

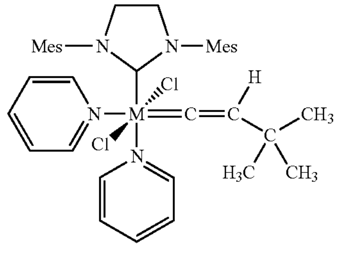

A further alternative is to use a catalyst (N) which has the general structural element (N1), where the carbon atom denoted by "*" is bound via one or more double bonds to the catalyst framework, (N1)

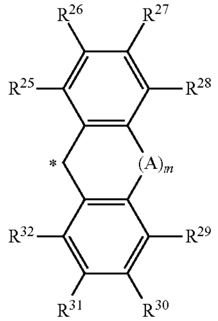

and in which $R^{25}$-$R^{32}$ are identical or different and are each hydrogen, halogen, hydroxyl, aldehyde, keto, thiol, $CF_3$, nitro, nitroso, cyano, thiocyano, isocyanato, carbodiimide, carbamate, thiocarbamate, dithiocarbamate, amino, amido, imino, silyl, sulphonate ($—SO_3^-$), $—OSO_3^-$, $—PO_3^-$ or $OPO_3^-$ or alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl, alkylsulphinyl, dialkylamino, alkylsilyl or alkoxysilyl, where these radicals can each optionally be substituted by one or more alkyl, halogen, alkoxy, aryl or heteroaryl radicals, or, as an alternative, two directly adjacent radicals from the group consisting of $R^{25}$-$R^{32}$ together with the ring carbons to which they are bound form a cyclic group, preferably an aromatic system, by bridging or, as an alternative, $R^8$ is optionally bridged to another ligand of the ruthenium- or osmium-carbene complex catalyst, m is 0 or 1 and A is oxygen, sulphur, $C(R^{33}R^{34})$, $N—R^{35}$, $—C(R^{36})=C(R^{37})—$, $—C(R^{36})(R^{38})—C(R^{37})(R^{39})—$, where $R^{33}$-$R^{39}$ are identical or different and can each have the same meanings as the radicals $R^{25}$-$R^{32}$.

The catalysts of the invention have the structural element of the general formula (N1), where the carbon atom denoted by "*" is bound via one or more double bonds to the catalyst framework. If the carbon atom denoted by "*" is bound via two or more double bonds to the catalyst framework, these double bonds can be cumulated or conjugated.

Such catalysts (N) have been described in EP-A-2 027 920, which is hereby incorporated by reference for the definition of the catalysts (N) and their preparation, insofar as this is permitted by the relevant jurisdictions.

The catalysts (N) having a structural element of the general formula (N1) include, for example, catalysts of the general formulae (N2a) and (N2b) below, (N2a)

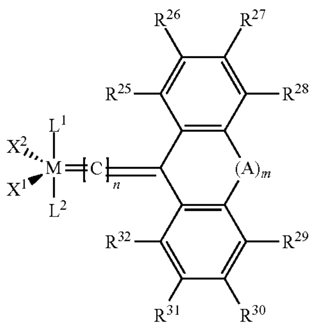

(N2b)

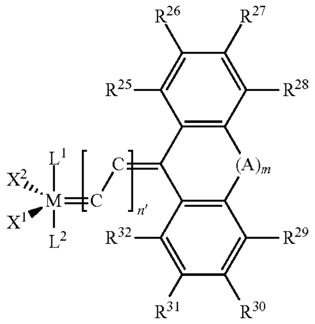

in which

M is ruthenium or osmium, $X^1$ and $X^2$ are identical or different and are two ligands, preferably anionic ligands, $L^1$ and $L^2$ are identical or different ligands, preferably neutral electron donors, where $L^2$ can alternatively also be bridged to the radical $R^8$, n is 0, 1, 2 or 3, preferably 0, 1 or 2, n' is 1 or 2, preferably 1, and $R^{25}$-$R^{32}$, m and A have the same meanings as in the general formula (N1).

In the catalysts of the general formula (N2a), the structural element of the general formula (N1) is bound via a double bond (n=0) or via 2, 3 or 4 cumulated double bonds (in the case of n=1, 2 or 3) to the central metal of the complex catalyst. In the catalysts according to the invention of the general formula (N2b), the structural element of the general formula (N1) is bound via conjugated double bonds to the metal of the complex catalyst. In both cases, the carbon atom denoted by "*" has a double bond in the direction of the central metal of the complex catalyst.

The catalysts of the general formulae (N2a) and (N2b) thus encompass catalysts in which the general structural elements (N3)-(N9)

(N3)

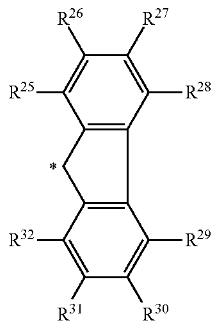

(N4)

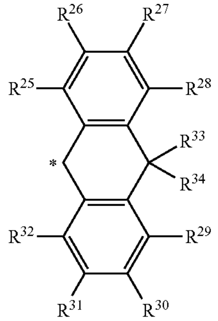

(N5)

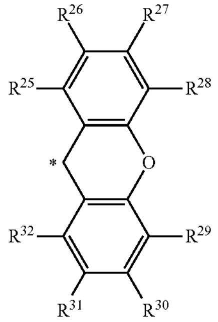

(N6)

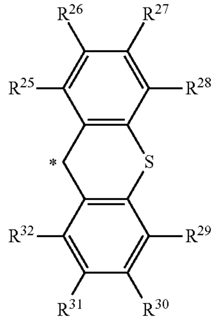

(N7)

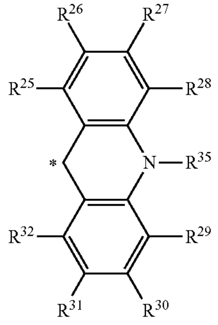

-continued (N8)

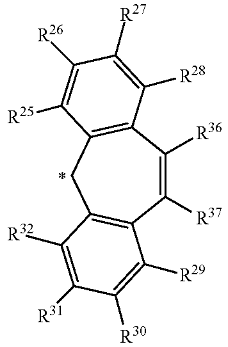

(N9)

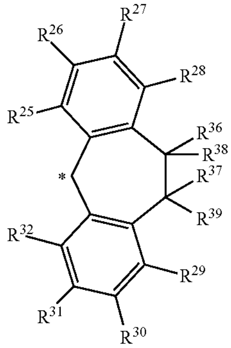

are bound via the carbon atom denoted by "*" via one or more double bonds to the catalyst framework of the general formula (N10a) or (N10b)

(N10a)

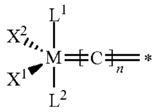

(N10b)

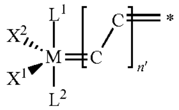

where $X^1$ and $X^2$, $L^1$ and $L^2$, n, n' and $R^{25}$-$R^{39}$ have the meanings given for the general formulae (N2a) and (N2b).

The ruthenium- or osmium-carbene catalysts of the invention typically have five-fold coordination.

In the structural element of the general formula (N1), $R^{15}$-$R^{32}$ are identical or different and are each hydrogen, halogen, hydroxyl, aldehyde, keto, thiol, $CF_3$, nitro, nitroso, cyano, thiocyano, isocyanato, carbodiimide, carbamate, thiocarbamate, dithiocarbamate, amino, amido, imino, silyl, sulphonate ($-SO_3^-$), $-OSO_3^-$, $-PO_3^-$ or $OPO_3^-$ or alkyl, preferably $C_1$-$C_{20}$-alkyl, in particular $C_1$-$C_6$-alkyl, cycloalkyl, preferably $C_3$-$C_{20}$-cycloalkyl, in particular $C_3$-$C_8$-cycloalkyl, alkenyl, preferably $C_2$-$C_{20}$-alkenyl, alkynyl, preferably $C_2$-$C_{20}$-alkynyl, aryl, preferably $C_6$-$C_{24}$-aryl, in particular phenyl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$- alkylamino, alkylthio, preferably $C_1$-$C_{30}$-alkylthio, arylthio, preferably $C_6$-$C_{24}$-arylthio, alkylsulphonyl, preferably $C_1$-$C_{20}$-alkylsulphonyl, alkylsulphinyl, preferably $C_1$-$C_{20}$-alkylsulphinyl, dialkylamino, preferably di($C_1$-$C_{20}$-alkyl)amino, alkylsilyl, preferably $C_1$-$C_{20}$-alkylsilyl, or alkoxysilyl, preferably $C_1$-$C_{20}$-alkoxysilyl, radicals, where these radicals can each be optionally substituted by one or more alkyl, halogen, alkoxy, aryl or heteroaryl radicals, or, as an alternative, in each case two directly adjacent radicals from the group consisting of $R^{25}$-$R^{32}$ together with the ring carbon atoms to which they are bound may also form a cyclic group, preferably an aromatic system, by bridging or, as an alternative, $R^8$ is optionally bridged to another ligand of the ruthenium- or osmium-carbene complex catalyst, m is 0 or 1 and A is oxygen, sulphur, $C(R^{33})(R^{34})$, N—$R^{35}$, —$C(R^{36})$=C$(R^{37})$— or —$C(R^{36})(R^{38})$—$C(R^{37})(R^{39})$—, where $R^{33}$-$R^{39}$ are identical or different and can each have the same preferred meanings as the radicals $R^1$-$R^8$.

$C_1$-$C_6$-Alkyl in the structural element of the general formula (N1) is, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl and n-hexyl.

$C_3$-$C_8$-Cydoalkyl in the structural element of the general formula (N1) is, for example, cyclopropyl, cyclobutyl, cyclopentyl, cyclohexyl, cycloheptyl and cyclooctyl.

$C_6$-$C_{24}$-Aryl in the structural element of the general formula (N1) comprises an aromatic radical having from 6 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

The radicals $X^1$ and $X^2$ in the structural element of the general formula (N1) have the same general, preferred and particularly preferred meanings indicated for catalysts of the general formula A.

In the general formulae (N2a) and (N2b) and analogously in the general formulae (N10a) and (N10b), the radicals $L^1$ and $L^2$ are identical or different ligands, preferably neutral electron donors, and can have the same general, preferred and particularly preferred meanings indicated for catalysts of the general formula A.

Preference is given to catalysts of the general formulae (N2a) or (N2b) having a general structural unit (N1) in which M is ruthenium, $X^1$ and $X^2$ are both halogen, n is 0, 1 or 2 in the general formula (N2a) or n' is 1 in the general formula (N2b)

$L^1$ and $L^2$ are identical or different and have the general or preferred meanings indicated for the general formulae (N2a) and (N2b), $R^{25}$-$R^{32}$ are identical or different and have the general or preferred meanings indicated for the general formulae (N2a) and (N2b), m is either 0 or 1, and, when m=1, A is oxygen, sulphur, $C(C_1$-$C_{10}$-alkyl$)_2$, —$C(C_1$-$C_{10}$-alkyl$)_2$-$C(C_1$-$C_{10}$-alkyl$)_2$-, —$C(C_1$-$C_{10}$-alkyl)=$C(C_1$-$C_{10}$-alkyl)- or —$N(C_1$-$C_{10}$-alkyl).

Very particular preference is given to catalysts of the formulae (N2a) or (N2b) having a general structural unit (N1) in which M is ruthenium, $X^1$ and $X^2$ are both chlorine, n is 0, 1 or 2 in the general formula (N2a) or n' is 1 in the general formula (N2b)

$L^1$ is an imidazolidine radical of the formulae (IIIa) to (IIIf), $L^2$ is a sulphonated phosphine, phosphate, phosphinite, phosphonite, arsine, stibine, ether, amine, amide, sulphoxide, carboxyl, nitrosyl, pyridine radical, an imidazolidine radical of the formulae (XIIa) to (XIIf) or a phosphine ligand, in particular $PPh_3$, P(p-Tol$)_3$, P(o-Tol$)_3$, $PPh(CH_3)_2$, $P(CF_3)_3$, P(p-$FC_6H_4)_3$, P(p-$CF_3C_6H_4)_3$, $P(C_6H_4$—$SO_3Na)_3$, $P(CH_2C_6H_4$—$SO_3Na)_3$, P(isopropyl$)_3$, $P(CHCH_3(CH_2CH_3))_3$, P(cyclopentyl$)_3$, P(cyclohexyl$)_3$, P(neopentyl$)_3$ and P(neophenyl$)_3$, $R^{25}$-$R^{32}$ have the general or preferred meanings indicated for the general formulae (N2a) and (N2b), m is either 0 or 1 and, when m=1,

A is oxygen, sulphur, $C(C_1$-$C_{10}$-alkyl$)_2$, —$C(C_1$-$C_{10}$-alkyl$)_2$-$C(C_1$-$C_{10}$-alkyl$)_2$-, —$C(C_1$-$C_{10}$-alkyl)=$C(C_1$-$C_{10}$-alkyl)- or —$N(C_1$-$C_{10}$-alkyl).

When the radical $R^{25}$ is bridged to another ligand of the catalyst of the formula N, this results, for example for the catalysts of the general formulae (N2a) and (N2b), in the following structures of the general formulae (N13a) and (N13b)

(N13a)

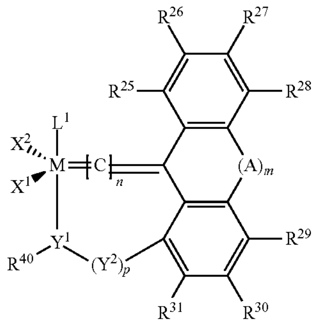

(N13b)

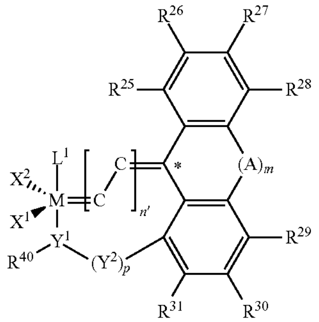

in which $Y^1$ is oxygen, sulphur, an N—$R^{41}$ radical or a P—$R^{41}$ radical, where $R^{41}$ has the meanings indicated below, $R^{40}$ and $R^{41}$ are identical or different and are each an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may all each be optionally substituted by one or more alkyl, halogen, alkoxy, aryl or heteroaryl radicals, p is 0 or 1 and $Y^2$ when p=1 is —$(CH_2)_r$— where r=1, 2 or 3, —C(=O)—$CH_2$—, —C(=O)—, —N=CH—, —N(H)—C(=O)— or, as an alternative, the entire structural unit "—$Y^1(R^{40})$—$(Y^2)_p$—" is (—$N(R^{40})$═CH—$CH_2$—), (—$N(R^{40}, R^{41})$═CH—$CH_2$—), and
where M, $X^1$, $X^2$, $L^1$, $R^{25}$-$R^{32}$, A, m and n have the same meanings as in the general formulae (IIa) and (IIb).
As examples of catalysts of the formula (N), mention may be made of the following structures:
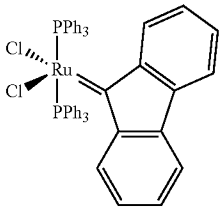
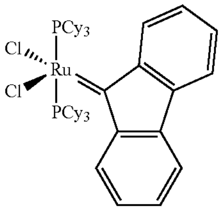
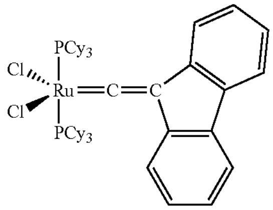
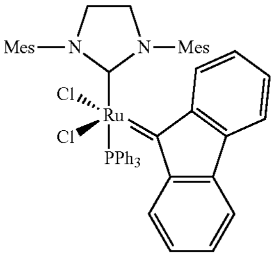
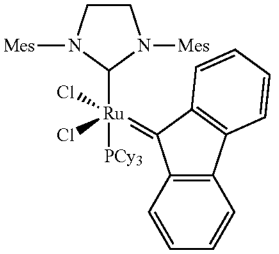
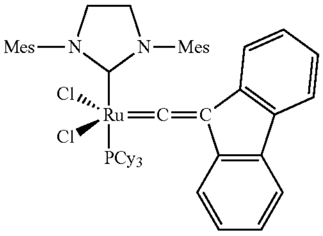
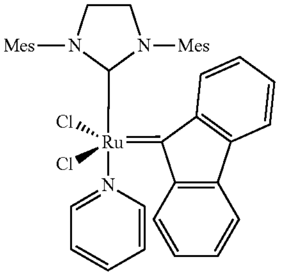
-continued
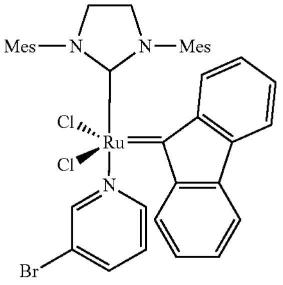
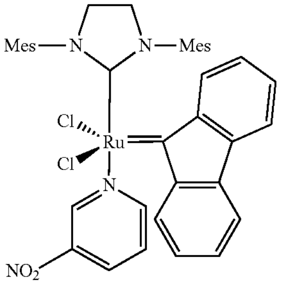
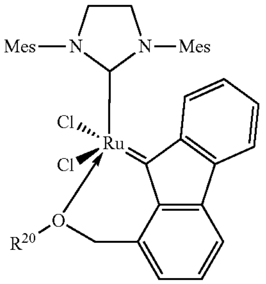
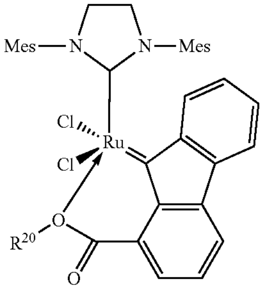
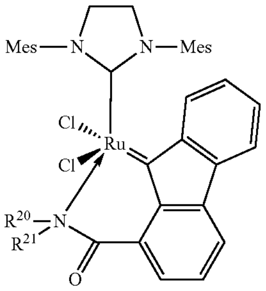
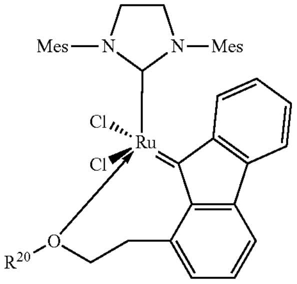

-continued

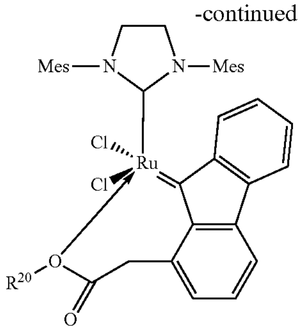

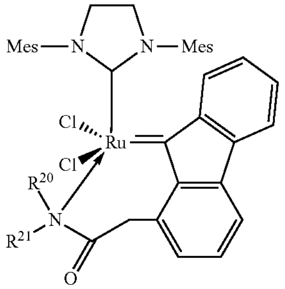

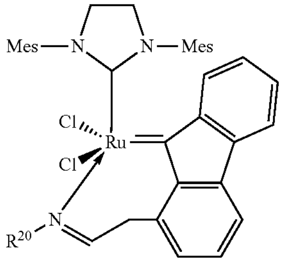

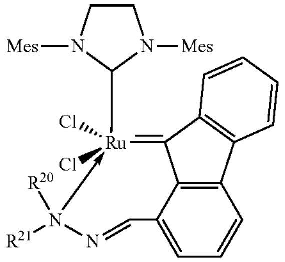

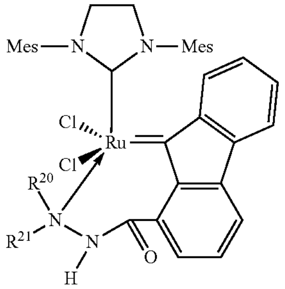

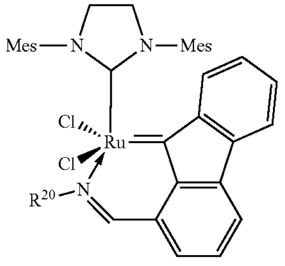

In the process of the invention it is preferred to use catalysts of the general formula (A), (B), (G) and (N), more preferably a catalyst of the general formula (A) and very preferably the Grubbs (II) catalyst in combination with a functionalized olefin selected from the group consisting of tert-butyl N-allylcarbamate, p-allylanisole, o-allylanisole, p-allylphenol, o-allylphenol, allyl benzoate, allyl benzyl ether, cis-1,4-bisbenzoyloxy-2-butene, cis-2-butene-1,4-diyl dibenzoate, cis-2-butene-1,4-diyl diacetate and mixtures thereof.

Implementation of the Metathesis Reaction:

In the process of the invention the compound of the general formula (I) or (II) is used usually in an amount of $8*10^{-6}$ mol to $8*10^{-3}$ mol, based on 1 g of nitrile rubber, preferably in an amount of $1*10^{-5}$s mol to $5*10^{-3}$ mol based on 1 g of nitrile rubber, and more preferably in an amount of $2*10^{-5}$ mol to $2*10^{-3}$ mol based on 1 g of nitrile rubber.

The metathesis catalyst is used in an amount of $4*10^{-8}$ mol to $4*10^{-5}$ mol, based on 1 g of nitrile rubber, preferably in an amount of $2*10^{-7}$ mol to $2*10^{-5}$ mol based on 1 g of nitrile rubber, more preferably in an amount of $5*10^{-7}$ mol to $7.5*10^{-6}$ mol based on 1 g of nitrile rubber.

Based on the functionalized olefin of the general formula (I) or (II) used, the metathesis catalyst is used in a molar ratio of ($5*10^{-6}$ to 5):1, preferably ($1*10^{-4}$ to $5*10^{-1}$):1, more preferably of ($2*10^{-3}$ to $1.5*10^{-2}$):1.

The process of the invention is typically carried out in the absence of compounds from main group IV of the Periodic Table; in particular, it has become established to carry out the process in the absence of organyls or halides of silicon, germanium, tin or lead, of the kind that must necessarily be used in certain processes of the prior art. This procedure is preferred when preparation is to be environmentally unobjectionable. The process of the invention can in particular be carried out in the absence of tin tetraalkyls.

The metathesis reaction can be conducted in a suitable solvent which does not deactivate the catalyst used and also does not adversely affect the reaction in any other way. Preferred solvents include, but are not limited to, dichloromethane, benzene, toluene, methyl ethyl ketone, acetone, tetrahydrofuran, tetrahydropyran, dioxane, cyclohexane and chlorobenzene. The particularly preferred solvent is chlorobenzene.

The concentration of the nitrile rubber used in the reaction mixture of the metathesis is not critical, although it must of course be ensured that the reaction is not adversely affected by an excessively high viscosity of the reaction mixture and by the mixing problems which this entails. The concentration of the nitrile rubber in the reaction mixture is preferably in the range from 1% to 25% by weight, more preferably in the range from 5% to 20% by weight, based on the overall reaction mixture.

The process of the invention is conducted at temperatures in the range from −20° C. to 120° C., preferably at 0° C. to 100° C., more preferably from 10° C. to 70° C.

The reaction time is dependent on a series of factors, examples being the type of NBR, the nature of the catalyst, the catalyst concentration used, and the reaction temperature. The reaction is typically at an end within five hours under standard conditions. The progress of the metathesis can be monitored by standard analysis, for example by GPC measurements or determination of the viscosity.

Optionally in the process of the invention, in addition to the compound of the general formula (I) or (II), it is additionally possible to use a straight-chain or branched $C_2$-$C_{16}$ olefin as well. Suitable examples include ethylene, propylene, isobutene, styrene, 1-hexene or 1-octene. Preference is given to using 1-hexene or 1-octene. Where the co-olefin is liquid (such as 1-hexene, for example), the amount of the co-olefin is situated preferably in a range of 0.2-20% by weight, based on the nitrile rubber used. When the co-olefin is a gas, such as ethylene, for example, the amount of the co-olefin is selected such that the pressure established in the reaction vessel at room temperature is in the range from $1\times10^5$ Pa-$1\times10^7$ Pa, preferably a pressure in the range from $5.2\times10^5$ Pa to $4\times10^6$ Pa.

Following the metathesis reaction, a hydrolysis may be carried out. In this way, the carbamate groups introduced by the metathesis are converted into amino groups, and/or the ether groups and ester groups are converted into hydroxyl groups. The telechelics prepared in this way can be cross-linked with polyfunctional isocyanates.

Nitrile Rubbers:

The functionalized nitrile rubbers of the invention are prepared using nitrile rubbers. The term "nitrile rubber" in the context of this specification encompasses not only unhydrogenated but also partially hydrogenated nitrile rubbers. These rubbers contain repeating units which derive from at least one conjugated diene and at least one α,β-unsaturated nitrile. The C═C double bonds from the copolymerized diene monomers, accordingly, may be in either unhydrogenated or partially hydrogenated form. In the case of partial hydrogenation, preferably at least 50% up to a maximum of 99%, more preferably 75% to 98.5%, very preferably 80% to 98%, and more particularly 85% to 96% of the C═C double bonds from the copolymerized diene monomers are hydrogenated.

For preparing the functionalized nitrile rubbers of the invention it is possible, furthermore, to use nitrile rubbers which contain repeating units which derive from at least one conjugated diene, at least one α,β-unsaturated nitrile and one or more other copolymerizable termonomers. Again, these nitrile rubbers, i.e. the C═C double bonds from the copolymerized diene monomers and also the further copolymerized termonomers, may be unhydrogenated or partially hydrogenated. In the case of partial hydrogenation, preferably at least 50% up to a maximum of 99%, more preferably 75%-98.5%, very preferably 80%-98% and more particularly 85%-96% of the C═C double bonds from the copolymerized diene monomers and also one or more further copolymerizable termonomers are hydrogenated.

The conjugated diene may be of any kind. It is preferred to use ($C_4$-$C_6$) conjugated dienes. Particularly preferred are 1,3-butadiene, isoprene, 2,3-dimethylbutadiene, piperylene or mixtures thereof. Especially preferred are 1,3-butadiene and isoprene or mixtures thereof. Very particularly preferred is 1,3-butadiene.

As α,β-unsaturated nitrile it is possible to use any known α,β-unsaturated nitrile, preference being given to ($C_3$-$C_5$) α,β-unsaturated nitriles such as acrylonitrile, methacrylonitrile, ethacrylonitrile or mixtures thereof. Acrylonitrile is particularly preferred.

As further copolymerizable termonomers it is possible to use, for example, aromatic vinyl monomers, preferably styrene, α-methylstyrene and vinylpyridine, fluorine-containing vinyl monomers, preferably fluoroethyl vinyl ether, fluoropropyl vinyl ether, o-fluoromethylstyrene, vinyl pentafluorobenzoate, difluoroethylene and tetrafluoroethylene, or else copolymerizable anti-ageing monomers, preferably N-(4-anilinophenyl)acrylamide, N-(4-anilinophenyl)methacryl-amide, N-(4-anilinophenyl)cinnamide, N-(4-anilinophenyl)crotonamide, N-phenyl-4-(3-vinyl-benzyloxy)aniline and N-phenyl-4-(4-vinylbenzyloxy)aniline, and also non-conjugated dienes, such as 4-cyanocyclohexene and 4-vinylcyclohexene, or else alkynes, such as 1- or 2-butyne.

As further copolymerizable termonomers it is also possible to use one or more copolymerizable termonomers that contain carboxyl groups, examples being α,β-unsaturated monocarboxylic acids, esters thereof, α,β-unsaturated dicarboxylic acids, their monoesters or diesters or their corresponding anhydrides or amides.

As α,β-unsaturated monocarboxylic acids it is possible with preference to use acrylic acid and methacrylic acid. Also suitable for use are esters of α,β-unsaturated monocarboxylic adds, preferably their alkyl esters, alkoxyalkyl or hydroxyalkyl esters.

Preferred are $C_1$-$C_{18}$ alkyl esters of α,β-unsaturated monocarboxylic acids, more preferably $C_1$-$C_{18}$ alkyl esters of acrylic or methacrylic acid, with particular preference methyl (meth)acrylate, ethyl (meth)acrylate, propyl (meth) acrylate, n-butyl (meth)acrylate, tert-butyl (meth)acrylate, hexyl (meth)acrylate, 2-ethylhexyl (meth)acrylate, octyl (meth)acrylate, n-dodecyl (meth)acrylate, 2-propylheptyl acrylate and lauryl (meth)acrylate. Use is made more particularly of n-butyl acrylate.

Also preferred are $C_2$-$C_{12}$ alkoxyalkyl esters of α,β-unsaturated monocarboxylic adds, more preferably $C_2$-$C_{12}$ alkoxyalkyl esters of acrylic or methacrylic acid, more particularly methoxymethyl (meth)acrylate, methoxyethyl (meth)acrylate, ethoxyethyl (meth)acrylate and ethoxymethyl (meth)acrylate. Methoxyethyl acrylate is used more particularly.

Preference is also given to $C_1$-$C_{12}$ hydroxyalkyl esters of α,β-unsaturated monocarboxylic acids, more preferably $C_1$-$C_{12}$ hydroxyalkyl esters of acrylic or methacrylic acid, more particularly 2-hydroxyethyl (meth)acrylate, 3-hydroxypropyl (meth)acrylate and hydroxybutyl (meth)acrylate.

Other esters of α,β-unsaturated monocarboxylic acids to be used are, furthermore, for example, polyethylene glycol (meth)acrylate, polypropylene glycol (meth)acrylate, glycidyl (meth)acrylate, epoxy (meth)acrylate, N-(2-hydroxyethyl)acrylamides, N-(2-hydroxymethyl)acrylamides and urethane (meth)acrylate.

It is also possible to use mixtures of alkyl esters, such as, for example, those specified above, with alkoxyalkyl esters, in the form, for example, of those specified above.

Also suitable for use are cyanoalkyl acrylates and cyanoalkyl methacrylates in which the number of C atoms in the cyanoalkyl group is 2-12, preferably α-cyanoethyl acrylate, β-cyanoethyl acrylate and cyanobutyl methacrylate.

Also suitable for use are fluorine-substituted, benzyl-containing acrylates or methacrylates, preferably fluorobenzyl acrylate and fluorobenzyl methacrylate. Also suitable for use are fluoroalkyl-containing acrylates and methacrylates, preferably trifluoroethyl acrylate and tetrafluoropropyl methacrylate. Also suitable for use are amino-containing α,β-unsaturated carboxylic esters such as dimethylaminomethyl acrylate and diethylaminoethyl acrylate.

As copolymerizable monomers it is possible as well to use α,β-unsaturated dicarboxylic acids, preferably maleic acid, fumaric acid, crotonic acid, itaconic acid, citraconic acid and mesaconic acid.

It is also possible to use α,β-unsaturated dicarboxylic anhydrides, preferably maleic anhydride, itaconic anhydride, citraconic anhydride and mesaconic anhydride.

It is possible, furthermore, to use monoesters or diesters of α,β-unsaturated dicarboxylic acids. These α,β-unsaturated dicarboxylic monoesters or diesters may be, for example, alkyl, preferably $C_1$-$C_{10}$ alkyl, more particularly ethyl, n-propyl-, isopropyl, n-butyl, tert-butyl, n-pentyl or n-hexyl, alkoxyalkyl, preferably $C_2$-$C_{12}$ alkoxyalkyl, more preferably $C_3$-$C_8$ alkoxyalkyl, hydroxyalkyl, preferably $C_1$-$C_{12}$ hydroxyalkyl, more preferably $C_2$-$C_8$ hydroxyalkyl, cycloalkyl, preferably $C_5$-$C_{12}$ cycloalkyl, more preferably $C_6$-$C_{12}$ cycloalkyl, alkylcycloalkyl, preferably $C_6$-$C_{12}$ alkylcycloalkyl, more preferably $C_7$-$C_{10}$ alkylcycloalkyl, or aryl, preferably $C_6$-$C_{14}$ aryl, monoesters or diesters, where in the case of the diesters the esters in question may in each case also be identical or mixed esters.

Examples of α,β-unsaturated dicarboxylic acid monoesters encompass

- maleic acid monoalkyl esters, preferably monomethyl maleate, monoethyl maleate, monopropyl maleate and mono-n-butyl maleate;
- maleic acid monocycloalkyl esters, preferably monocyclopentyl maleate, monocyclohexyl maleate and monocycloheptyl maleate;
- maleic acid monoalkylcycloalkyl esters, preferably monomethylcyclopentyl maleate and monoethylcyclohexyl maleate;
- maleic acid monoaryl esters, preferably monophenyl maleate;
- maleic acid monobenzyl esters, preferably monobenzyl maleate;
- fumaric acid monoalkyl esters, preferably monomethyl fumarate, monoethyl fumarate, monopropyl fumarate and mono-n-butyl fumarate;
- fumaric acid monocycloalkyl esters, preferably monocyclopentyl fumarate, monocyclohexyl fumarate and monocycloheptyl fumarate;
- fumaric acid monoalkylcycloalkyl esters, preferably monomethylcyclopentyl fumarate and monoethylcyclohexyl fumarate;
- fumaric acid monoaryl esters, preferably monophenyl fumarate;
- fumaric acid monobenzyl esters, preferably monobenzyl fumarate;
- citraconic acid monoalkyl esters, preferably monomethyl citraconate, monoethyl citraconate, monopropyl citraconate and mono-n-butyl citraconate;
- citraconic acid monocycloalkyl esters, preferably monocyclopentyl citraconate, monocyclohexyl citraconate and monocycloheptyl citraconate;
- citraconic acid monoalkylcycloalkyl esters, preferably monomethylcyclopentyl citraconate and monoethylcyclohexyl citraconate;
- citraconic acid monoaryl esters, preferably monophenyl citraconate;
- citraconic acid monobenzyl esters, preferably monobenzyl citraconate;
- itaconic acid monoalkyl esters, preferably monomethyl itaconate, monoethyl itaconate, monopropyl itaconate and mono-n-butyl itaconate;
- itaconic acid monocycloalkyl esters, preferably monocyclopentyl itaconate, monocyclohexyl itaconate and monocycloheptyl itaconate;
- itaconic acid monoalkylcycloalkyl esters, preferably monomethylcyclopentyl itaconate and monoethylcyclohexyl itaconate;
- itaconic acid monoaryl esters, preferably monophenyl itaconate;
- itaconic acid monobenzyl esters, preferably monobenzyl itaconate;
- mesaconic acid monoalkyl esters, preferably monoethyl mesaconate.

As α,β-unsaturated dicarboxylic diesters it is possible to use the analogous diesters based on the aforementioned monoester groups, and the ester groups may also be chemically different groups.

The fractions of repeating units in the nitrile rubber which originate from the conjugated diene and from the α,β-unsaturated nitrile may vary within wide ranges. The fraction or sum of the conjugated dienes is typically in the range from 40% to 90% by weight, preferably in the range from 50% to 85% by weight, based on the overall polymer. The fraction or the sum of the α,β-unsaturated nitriles is typically 10% to 60% by weight, preferably 15% to 50% by weight, based on the overall polymer. The fractions of the monomers add up in each case to 100% by weight. Depending on the nature of the termonomer or termonomers, the additional termonomers may be present in amounts from 0% to 40% by weight, based on the overall polymer. In this case, corresponding fractions of the conjugated diene or dienes and/or of the α,β-unsaturated nitrile or nitriles are replaced by the fractions of the additional monomers, with the fractions of all the monomers adding up in each case to 100% by weight.

The unhydrogenated or partially hydrogenated nitrile rubbers used in accordance with the invention possess a Mooney viscosity (ML 1+4 at 100° C.) in the range from 10 to 120 Mooney units, preferably from 20 to 100 Mooney units. The Mooney viscosity is determined in accordance with ASTM Standard D 1646.

Where the invention uses unhydrogenated or partially hydrogenated nitrile rubbers having a Mooney viscosity (ML 1+4 at 100° C.) in the range from 30 to 70, preferably from 30 to 50, this then typically corresponds to a weight-average molecular weight Mw in the range from 150 000 to 500 000, preferably in the range from 170 000 to 400 000, and the polydispersity PDI=Mw/Mn, where Mw is the weight average and Mn the number average of the molecular weight, is in the range from 2.0 to 6.0, preferably in the range of 2.0-4.0.

Partially hydrogenated nitrile rubbers of this kind are well known to the skilled person and either are available commercially, as for example under the brand name Therban® from Lanxess Deutschland GmbH, or else can be prepared by methods familiar to the skilled person.

The preparation of partially hydrogenated nitrile rubbers is typically accomplished by emulsion polymerization followed by a hydrogenation, and is familiar to the skilled person and known from a large number of literature references and patents.

The hydrogenation can be accomplished using homogeneous or heterogeneous hydrogenation catalysts. The catalysts used are based typically on rhodium, ruthenium or titanium, although platinum, iridium, palladium, rhenium, ruthenium, osmium, cobalt or copper may also be used, either as the metal or else, preferably, in the form of metal compounds (see, for example, U.S. Pat. No. 3,700,637, DE-A-25 39 132, EP-A-0 134 023, DE-A-35 41 689, DE-A-35 40 918, EP-A-0 298 386, DE-A-35 29 252, DE-A-34 33 392, U.S. Pat. Nos. 4,464,515 and 4,503,196).

Suitable catalysts and solvents for a hydrogenation in homogeneous phase are described below and are also known from DE-A-25 39 132 and EP-A-0 471 250.

The selective hydrogenation may be achieved, for example, in the presence of a catalyst containing rhodium or ruthenium. Use may be made, for example, of a catalyst of the general formula $$(R^1{}_mB)_lMX_n.$$

in which M is ruthenium or rhodium, $R^1$ is identical or different at each occurrence and represents a $C_1$-$C_8$ alkyl group, a $C_4$-$C_8$ cycloalkyl group, a $C_6$-$C_{15}$ aryl group or a $C_7$-$C_{15}$ aralkyl group, B is phosphorus, arsenic, sulphur or a sulphoxide group S═O, X is hydrogen or an anion, preferably halogen and more preferably chlorine or bromine, 1 is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethylsulphoxide)rhodium(III) chloride and also tetrakis(triphenylphosphine)rhodium hyride of the formula $((C_6H_5)_3P)_4RhH$ and the corresponding compounds in which some or all of the triphenylphosphine has been replaced by tricyclohexylphosphine. The catalyst can be utilized in small quantities. A quantity in the range of 0.01-1% by weight, preferably in the range of 0.03-0.5% by weight and more preferably in the range of 0.1-0.3% by weight, based on the weight of the polymer, is suitable.

Typically it is useful to use the catalyst together with a co-catalyst which is a ligand of the formula $R^1{}_mB$, where $R^1$, m and B possess the definitions given above for the catalyst. Preferably, m is 3, B is phosphorus, and the radicals $R^1$ may be identical or different. The co-catalysts in question are preferably those with trialkyl, tricycloalkyl, triaryl, triaralkyl, diaryl-monoalkyl, diaryl-monocycloalkyl, dialkylmonoaryl, dialkyl-monocycloalkyl, dicycloalkyl-monoaryl or dicycloalkyl-monoaryl radicals.

Examples of co-catalysts are found in U.S. Pat. No. 4,631,315, for example. A preferred co-catalyst is triphenylphosphine. The co-catalyst is used preferably in amounts in a range of 0.3-5% by weight, preferably in the range of 0.5-4% by weight, based on the weight of the nitrile rubber to be hydrogenated. Preferably, moreover, the weight ratio of the rhodium-containing catalyst to the co-catalyst is in the range from 1:3 to 1:55, more preferably in the range from 1:5 to 1:45. Based on 100 parts by weight of the nitrile rubber to be hydrogenated, suitably 0.1 to 33 parts by weight of the co-catalyst, preferably 0.5 to 20 and very preferably 1 to 5 parts by weight, more particularly more than 2 but less than 5 parts by weight, of co-catalyst are used, based on 100 parts by weight of the nitrile rubber to be hydrogenated.

The practical implementation of this hydrogenation is known to the skilled worker from U.S. Pat. No. 6,683,136. It is typically accomplished by causing hydrogen to act on the nitrile rubber to be hydrogenated, in a solvent such as toluene or monochlorobenzene, at a temperature in the range from 100 to 150° C. and under a pressure in the range from 50 to 150 bar for 2 to 10 hours.

The process of the invention produces functionalized nitrile rubbers of reduced molecular weight that hitherto have not been available by any of the known processes.

Therefore, the invention provides, furthermore, nitrile rubbers comprising repeating units which derive from at least one conjugated diene and at least one α,β-unsaturated nitrile, and also either end groups X or end groups Y and Z, where X is $OR^1$, in which $R^1$ is H, $C_1$-$C_{18}$ alkyl, $C_7$-$C_{24}$ aralkyl, phenyl, naphthyl or fluorenyl, O—$(CH_2$—$CH_2$—$O)_n$—$R^2$, in which $R^2$ is H, $C_1$-$C_{18}$ alkyl, $C_7$-$C_{24}$ aralkyl, phenyl, naphthyl or fluorenyl and n is 1 to 20, O—$(CH_2$—$CH(CH_5)$—$O)_n$—$R^3$, in which $R^3$ is H, $C_1$-$C_{18}$ alkyl, $C_7$-$C_{24}$ aralkyl, phenyl, naphthyl or fluorenyl and n is 1 to 20, O—C(═O)—$R^4$, in which $R^4$ is H, $C_1$-$C_{18}$, alkyl, $C_7$-$C_{24}$ aralkyl, phenyl, naphthyl or fluorenyl, $C_6$-$C_{18}$ aryl, which is substituted by at least one radical $OR^5$, in which $R^5$ is H, $C_1$-$C_{18}$ alkyl, $C_7$-$C_{24}$ aralkyl, phenyl, naphthyl or fluorenyl, or NH—C(═O)—$OR^6$, in which $R^5$ is H, $C_1$-$C_{18}$ alkyl, $C_7$-$C_{24}$ aralkyl, phenyl, naphthyl or fluorenyl, and Y and Z are identical or different and $OR^7$, in which $R^7$ is H, $C_1$-$C_{18}$ alkyl, $C_7$-$C_{24}$ aralkyl, phenyl, naphthyl or fluorenyl, O—$(CH_2$—$CH_2$—$O)_n$—$R^8$, in which $R^8$ is H, $C_1$-$C_{18}$ alkyl, $C_7$-$C_{24}$ aralkyl, phenyl, naphthyl or fluorenyl and n is 1 to 20, O—$(CH_2$—$CH(CH_3)$—$O)_n$—$R^9$, in which $R^9$ is H, $C_1$-$C_{18}$ alkyl, $C_7$-$C_{24}$ aralkyl, phenyl, naphthyl or fluorenyl and n is 1 to 20, O—C(═O)—$R^{10}$, in which $R^{10}$ is H, $C_1$-$C_{18}$ alkyl, $C_7$-$C_{24}$ aralkyl, phenyl, naphthyl or fluorenyl, $C_6$-$C_{18}$ aryl, which is substituted by at least one radical $OR^{11}$, in which $R^{11}$ is H, $C_1$-$C_{18}$ alkyl, $C_7$-$C_{24}$ aralkyl, phenyl, naphthyl or fluorenyl, or NH—C(═O)—$OR^{12}$, in which $R^{12}$ is H, $C_1$-$C_{18}$ alkyl, $C_7$-$C_{24}$ aralkyl, phenyl, naphthyl or fluorenyl.

For the preferred definitions of X, Y and Z and of the radicals contained therein, the definitions that apply are the same as those for the preferred meanings of X, Y and Z and of the radicals contained therein in the general formulae (I) and (II).

As regards the repeating units of the monomers present in these nitrile rubbers of the invention, and also concerning the optional partial hydrogenation of the C═C double bonds in the main polymer chain, the comments made above for the initial nitrile rubbers apply mutatis mutandis.

The functionalized nitrile rubbers of the invention possess a Mooney viscosity (ML 1+4 at 100° C.) in the range of 5-30, preferably in the range of 5-20. The weight-average molecular weight Mw is typically in the range of 10 000-160 000, preferably in the range of 10 000-130 000 and more preferably 10 000-125 000. The nitrile rubbers obtained further possess a polydispersity PDI=Mw/Mn, where Mn is the number-average molecular weight and Mw is the weight-average molecular weight, in the range 1.4-4.0, preferably in the range of 1.5-3.0.

Where desired, the functionalized nitrile rubbers of the invention, containing either end groups X or end groups Y and Z as defined above, can be subjected to a further hydrogenation.

Accordingly, the invention also provides fully hydrogenated nitrile rubbers which comprise repeating units deriving from at least one conjugated diene and at least one α,β-unsaturated nitrile, and also end groups X, Y or Z. For the definition of the end groups X, Y and Z, the comments already made for the optionally partially hydrogenated nitrile rubbers of the invention apply.

The invention further provides vulcanizable mixtures comprising (i) at least one functionalized nitrile rubber, which optionally may be partially or wholly hydrogenated, comprising either end groups X or end groups Y and Z in which X is $OR_1$, in which $R_1$ is H, $C_1$-$C_{18}$ alkyl, $C_7$-$C_{24}$ aralkyl, phenyl, naphthyl or fluorenyl, O—$(CH_2$—$CH_2$—$O)_n$—$R^2$, in which $R^2$ is H, $C_1$-$C_{18}$ alkyl, $C_7$-$C_{24}$ aralkyl, phenyl, naphthyl or fluorenyl and n is 1 to 20, O—$(CH_2$—$CH(CH_3)$—$O)_n$—$R^3$, in which $R^3$ is H, $C_1$-$C_{18}$ alkyl, $C_7$-$C_{24}$ aralkyl, phenyl, naphthyl or fluorenyl and n is 1 to 20, O—C(═O)—$R^4$, in which $R^4$ is H, $C_1$-$C_{18}$ alkyl, $C_7$-$C_{24}$ aralkyl, phenyl, naphthyl or fluorenyl, $C_6$-$C_{18}$ aryl, which is substituted by at least one radical $OR^5$, in which $R^5$ is H, $C_1$-$C_{18}$ alkyl, $C_7$-$C_{24}$ aralkyl, phenyl, naphthyl or fluorenyl, or NH—C(=O)—$OR^6$, in which $R^6$ is H, $C_1$-$C_{18}$ alkyl, $C_7$-$C_{24}$ aralkyl, phenyl, naphthyl or fluorenyl, and Y and Z are identical or different and $OR^7$, in which $R^7$ is H, $C_1$-$C_{18}$ alkyl, $C_7$-$C_{24}$ aralkyl, phenyl, naphthyl or fluorenyl, O—$(CH_2$—$CH_2$—$O)_n$—$R^8$, in which $R^8$ is H, $C_1$-$C_{18}$ alkyl, $C_7$-$C_{24}$ aralkyl, phenyl, naphthyl or fluorenyl and n is 1 to 20, O—$(CH_2$—$CH(CH_3)$—$O)_n$—$R^9$, in which $R^9$ is H, $C_1$-$C_{18}$ alkyl, $C_7$-$C_{24}$ aralkyl, phenyl, naphthyl or fluorenyl and n is 1 to 20, O—C(=O)—$R^{10}$, in which $R^{10}$ is H, $C_1$-$C_{18}$ alkyl, $C_7$-$C_{24}$ aralkyl, phenyl, naphthyl or fluorenyl, $C_6$-$C_{18}$ aryl, which is substituted by at least one radical $OR^{11}$, in which $R^{11}$ is H, $C_1$-$C_{18}$ alkyl, $C_7$-$C_{24}$ aralkyl, phenyl, naphthyl or fluorenyl, or NH—C(=O)—$OR^{12}$, in which $R^{12}$ is H, $C_1$-$C_{18}$ alkyl, $C_7$-$C_{24}$ aralkyl, phenyl, naphthyl or fluorenyl, and (ii) at least one crosslinker or crosslinking system.

For the preferred meanings of X, Y and Z and of the radicals contained therein, here as well, the same definitions apply as for the preferred meanings of X, Y and Z and of the radicals contained therein in the general formulae (I) and (II).

Additionally, the vulcanizable mixtures may further comprise one or more other customary additives.

These vulcanizable mixtures are typically prepared by mixing the functionalized nitrile rubber (i), which optionally may also be partly or wholly hydrogenated, with at least one crosslinking system (ii) and optionally with one or more further additives.

Suitable crosslinkers include, for example, peroxidic crosslinkers, such as bis(2,4-dichlorobenzyl) peroxide, dibenzoyl peroxide, bis(4-chlorobenzoyl) peroxide, 1,1-bis (t-butylperoxy)-3,3,5-trimethylcyclohexane, tert-butyl perbenzoate, 2,2-bis(t-butylperoxy)butene, 4,4-di-tert-butyl peroxynonylvalerate, dicumyl peroxide, 2,5-dimethyl-2,5-di (t-butylperoxy)hexane, tert-butyl cumyl peroxide, 1,3-bis(t-butylperoxyisopropyl)benzene, di-t-butyl peroxide and 2,5-dimethyl-2,5-di(t-butylperoxy)hex-3-yne.

It can be advantageous in addition to these peroxidic crosslinkers to use other additives as well that can be employed to help increase the crosslinking yield: suitable examples of such additives include triallyl isocyanurate, triallyl cyanurate, trimethylolpropane tri(meth)acrylate, triallyl trimellitate, ethylene glycol dimethacrylate, butanediol dimethacrylate, trimethylolpropane trimethacrylate, zinc acrylate, zinc diacrylate, zinc methacrylate, zinc dimethacrylate, 1,2-polybutadiene or N,N'-m-phenylenedimaleimide.

The total amount of the crosslinker or crosslinkers is typically in the range from 1 to 20 phr, preferably in the range from 1.5 to 15 phr and more preferably in the range from 2 to 10 phr, based on the optionally hydrogenated nitrile rubber.

As crosslinkers it is also possible to use sulphur in elemental, soluble or insoluble form, or sulphur donors.

Suitable sulphur donors include, for example, dimorpholyl disulphide (DTDM), 2-morpholino-dithiobenzothiazole (MBSS), caprolactam disulphide, dipentamethylenethiuram tetrasulphide (DPTT), and tetramethylthiuram disulphide (TMTD).

In the case of the sulphur vulcanization of the nitrile rubbers of the invention as well it is also possible to use other additives which can be employed to help increase the crosslinking yield. In principle, however, crosslinking may also take place with sulphur or sulphur donors alone.

Examples of suitable additives which can be employed to help increase the crosslinking yield include dithiocarbamates, thiurams, thiazoles, sulphenamides, xanthogenates, guanidine derivatives, dithiophospates, caprolactams and thiourea derivatives.

Dithiocarbamates which can be used include, for example, the following: ammonium dimethyldithiocarbamate, sodium diethyldithiocarbamate (SDEC), sodium dibutyldithiocarbamate (SDBC), zinc dimethyldithiocarbamate (ZDMC), zinc diethyldithiocarbamate (ZDEC), zinc dibutyldithiocarbamate (ZDBC), zinc ethylphenyldithiocarbamate (ZEPC), zinc dibenzyldithiocarbamate (ZBEC), zinc pentamethylenedithiocarbamate (Z5MC), tellurium diethyldithiocarbamate, nickel dibutyldithiocarbamate, nickel dimethyldithiocarbamate and zinc diisononyldithiocarbamate.

Thiurams which can be used include, for example, the following: tetramethylthiuram disulphide (TMTD), tetramethylthiuram monosulphide (TMTM), dimethyldiphenylthiuram disulphide, tetrabenzylthiuram disulphide, dipentamethylenethiuram tetrasulphide and tetraethylthiuram disulphide (TETD).

Thiazoles which can be used include, for example, the following: 2-mercaptobenzothiazole (MBT), dibenzothiazyl disulphide (MBTS), zinc mercaptobenzothiazole (ZMBT) and copper 2-mercaptobenzothiazole.

Sulphenamide derivatives which can be used include, for example, the following: N-cyclohexyl-2-benzothiazylsulphenamide (CBS), N-tert-butyl-2-benzothiazylsulphenamide (TBBS), N,N'-dicyclohexyl-2-benzothiazylsulphenamide (DCBS), 2-morpholinothiobenzothiazole (MBS), N-oxydiethylenethiocarbamyl-N-tert-butylsulphenamide and oxydiethylenethiocarbamyl-N-oxyethylenesulphenamide.

Xanthogenates which can be used include, for example, the following: sodium dibutylxanthogenate, zinc isopropyldibutylxanthogenate and zinc dibutylxanthogenate.

Guanidine derivatives which can be used include, for example, the following: diphenylguanidine (DPG), di-o-tolylguanidine (DOTG) and o-tolylbiguanidine (OTBG).

Dithiophosphates which can be used include, for example, the following: zinc di($C_2$-$C_{16}$)alkyldithiophosphates, copper di($C_2$-$C_{16}$)alkyldithiophosphates and dithiophosphoryl polysulphide.

As caprolactam it is possible, for example, to use dithiobiscaprolactam.

As thiourea derivatives it is possible, for example, to use N,N'-diphenylthiourea (DPTU), diethylthiourea (DETU) and ethylenethiourea (ETU).

Crosslinking is also possible with crosslinkers which contain at least two isocyanate groups—either in the form of at least two free isocyanate groups (—NCO) or else in the form of protected isocyanate groups, from which the —NCO groups are released in situ under the crosslinking conditions.

Likewise suitable as additives are, for example, the following: zinc diamine diisocyanate, hexamethylenetetramine, 1,3-bis(citraconimidomethyl)benzene and cyclic disulphanes.

Said additives and also the crosslinking agents can be used either individually or else in mixtures. Preference is given to using the following substances for the crosslinking of the nitrile rubbers: sulphur, 2-mercaptobenzothiazole, tetramethylthiuram disulphide, tetramethylthiuram monosulphide, zinc dibenzyldithiocarbamate, dipentamethylenethiuram tetrasulphide, zinc dialkyldithiophosphate, dimorpholyl disulphide, tellurium diethyldithiocarbamate, nickel dibutyldithiocarbamate, zinc dibutyldithiocarbamate, zinc dimethyldithiocarbamate and dithiobiscaprolactam.

The crosslinking agents and the abovementioned additives may be used in each case in amounts of about 0.05 to 10 phr, preferably 0.1 to 8 phr, more particularly 0.5 to 5 phr (individual metered addition, based in each case on the active substance) relative to the optionally hydrogenated nitrile rubber.

In the case of the inventive sulphur crosslinking it may also be sensible, in addition to the crosslinking agents and abovementioned additives, to use further organic and/or inorganic substances as well, examples being the following: zinc oxide, zinc carbonate, lead oxide, magnesium oxide, calcium oxide, saturated or unsaturated organic fatty acids and their zinc salts, polyalcohols, amino alcohols, e.g. triethanolamine, and also amines, e.g. dibutylamine, dicyclohexylamine, cyclohexylethylamine and polyetheramines.

Where the functionalized, optionally partially or wholly hydrogenated nitrile rubbers of the invention are rubbers with repeating units of one or more carboxyl-containing termonomers, crosslinking may also take place via the use of a polyamine crosslinker, preferably in the presence of a crosslinking accelerator. There is no restriction on the polyamine crosslinker provided that it is (1) a compound which contains either two or more amino groups (optionally also in salt form) or (2) a species which during the crosslinking reaction, in situ, forms a compound which forms two or more amino groups. Preference is given to using an aliphatic or aromatic hydrocarbon compound in which at least two hydrogen atoms are replaced either by amino groups or else by hydrazide structures (the latter being a structure "$-C(=O)NHNH_2$").

Examples of polyamine crosslinkers (ii) of this kind are as follows:

- Aliphatic polyamines, preferably hexamethylenediamine, hexamethylenediamine carbamate, tetramethylenepentamine, hexamethylenediamine-cinnamaldehyde adduct or hexamethylenediamine dibenzoate;
- Aromatic polyamines, preferably 2,2-bis(4-(4-aminophenoxy)phenyl)propane, 4,4'-methylenedianiline, m-phenylenediamine, p-phenylenediamine or 4,4'-methylenebis(o-chloroaniline;
- Compounds having at least two hydrazide structures, preferably isophthalic dihydrazide, adipic dihydrazide or sebacic dihydrazide.

Particularly preferred are hexamethylenediamine and hexamethylenediamine carbamate.

The amount of the polyamine crosslinker in the vulcanizable mixture is typically in the range from 0.2 to 20 parts by weight, preferably in the range from 1 to 15 parts by weight and more preferably in the range from 1.5 to 10 parts by weight, based on 100 parts by weight of the optionally hydrogenated nitrile rubber.

As crosslinking accelerators it is possible to use, in combination with the polyamine crosslinker, any that are known to the skilled person, preferably a basic crosslinking accelerator. Use may be made, for example, of tetramethylguanidine, tetraethylguanidine, diphenylguanidine, di-o-tolylguanidine (DOTG), o-tolylbiguanidine and di-o-tolylguanidine salt of dicathecolboric acid. Use may also be made of aldehyde-amine crosslinking accelerators such as, for example, n-butylaldehyde-aniline. Particularly preferred crosslinking accelerators used are at least one bicyclic or polycyclic aminic base. These are known to the skilled person. Particular suitability is possessed by 1,8-diazabicyclo[5.4.0]undec-7-ene (DBU), 1,5-diazabicyclo[4.3.0]-5-nonene (DBN), 1,4-diaza-bicyclo[2.2.2]octane (DABCO), 1,5,7-triazabicyclo[4.4.0]dec-5-ene (TBD), 7-methyl-1,5,7-triazabicyclo[4.4.0]dec-5-ene (MTBD).

The amount of the crosslinking accelerator in this case is typically in a range from 0.5 to 10 parts by weight, preferably 1 to 7.5 parts by weight, more particularly 2 to 5 parts by weight, based on 100 parts by weight of the optionally hydrogenated nitrile rubber.

The vulcanizable mixture based on the optionally hydrogenated nitrile rubber of the invention may in principle also comprise vulcanization onset retarders, which differ in the case of vulcanization with sulphur or with peroxides.

In the case of a vulcanization with sulphur, the following are used: cyclohexylthiophthalimide (CTP), N,N'-dinitrosopentamethylenetetramine (DNPT), phthalic anhydride (PTA) and diphenylnitrosamine. Cyclohexylthiophthalimide (CTP) is preferred.

In the case of a vulcanization with peroxides, the onset of vulcanization is retarded using compounds as specified in WO-A-97/01597 and U.S. Pat. No. 4,857,571. Preference is given to sterically hindered p-dialkylaminophenols, especially Ethanox 703 (Sartomer).

Aside from the addition of the crosslinker or crosslinkers, the optionally hydrogenated nitrile rubber of the invention may also be mixed with further customary rubber additives.

These additives include, for example, the typical substances that are well known to the skilled person, such as fillers, filler activators, vulcanization onset retarders, ozone protectants, ageing inhibitors, antioxidants, processing assistants, extender oils, plasticizers, reinforcing materials and mould release agents.

Examples of fillers which can be used include carbon black, silica, barium sulphate, titanium dioxide, zinc oxide, calcium oxide, calcium carbonate, magnesium oxide, aluminium oxide, iron oxide, aluminium hydroxide, magnesium hydroxide, aluminium silicates, diatomaceous earth, talc, kaolins, bentonites, carbon nanotubes, Teflon (the latter preferably in powder form), or silicates.

Filler activators include, in particular, organic silanes, such as, for example, vinyltrimethyloxysilane, vinyldimethoxymethylsilane, vinyltriethoxysilane, vinyltris(2-methoxyethoxy)silane, N-cyclohexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane or (octadecyl)methyldimethoxysilane. Further filler activators are, for example, surface-active substances such as triethanolamine and ethylene glycols having molecular weights of 74 to 10 000 g/mol. The amount of filler activators is typically 0 to 10 phr, based on the amount of the filler. Determining the appropriate amount of filler activator is familiar to the skilled person in dependence on the nature and amount of the filler.

Examples of ageing inhibitors which can be added to the vulcanizable mixtures are as follows: polymerized 2,2,4-trimethyl-1,2-dihydroquinoline (TMQ), 2-mercaptobenzimidazole (MBI), methyl-2-mercaptobenzimidazole (MMBI) or zinc methylmercaptobenzimidazole (ZMMBI).

Alternatively it is also possible to use the following, albeit less preferred, ageing inhibitors: aminic ageing inhibitors in the form, for example, of mixtures of diaryl-p-phenylenediamines (DTPD), octylated diphenylamine (ODPA), phenyl-$\alpha$-naphthylamine (PAN) and/or phenyl-$\beta$-naphthylamine (PBN). Preference is given to using those that are phenylenediamine-based. Examples of phenylenediamines are N-isopropyl-N'-phenyl-p-phenylenediamine, N-1,3-dimethylbutyl-N'-phenyl-p-phenylenediamine (6PPD), N-1,4-dimethylpentyl-N'-phenyl-p-phenylenediamine (7PPD) and N,N'-bis-1,4-(1,4-dimethylpentyl)-p-phenylenediamine (7PPD).

The ageing inhibitors are used typically in amounts of up to 10 parts by weight, preferably up to 5 parts by weight, more preferably 0.25 to 3 parts by weight, more particularly 0.4 to 1.5 parts by weight, based on 100 parts by weight of the sum of partially hydrogenated nitrile rubber and vinyl-containing silicone rubber.

Examples of mould release agents contemplated include the following: saturated and partially unsaturated fatty acids and oleic acids and their derivatives (fatty acid esters, fatty acid salts, fatty alcohols, fatty acid amides), which are used preferably as a mixture constituent, and also products which can be applied to the mould surface, such as, for example, products based on low molecular weight silicone compounds, products based on fluoropolymers and products based on phenolic resins.

The mould release agents are used typically in amounts of around 0 to 10 parts by weight, preferably 0.5 to 5 parts by weight, based on 100 parts by weight of the sum of partially hydrogenated nitrile rubber and vinyl-containing silicone rubber.

Also possible is reinforcement with strengtheners (fibres) of glass, in accordance with the teaching of U.S. Pat. No. 4,826,721, and also reinforcement using cords, woven fabrics, fibres of aliphatic and aromatic polyamides (Nylon®, Aramid@), polyesters and natural fibre products.

The invention further provides a process for producing vulcanizates based on at least one functionalized nitrile rubber of the invention, which is characterized in that the above-described vulcanizable mixture is crosslinked by an increase in temperature, preferably in a shaping process, more preferably using injection moulding.

The invention therefore also provides the vulcanizate, preferably in the form of a moulding, which is obtainable by the aforesaid vulcanization process. A feature of these vulcanizates is that they possess a particularly stable network whose formation is possible by virtue of the functional and vulcanization-active end groups in the nitrile rubber of the invention, since the number of free chain ends in the vulcanizate is reduced.

This vulcanization process can be used to produce a large number of mouldings, examples being seals, caps, hoses or membranes. More particularly it is possible to produce O-ring seals, flat seals, corrugated gaskets, sealing sleeves, sealing caps, dust protection caps, plug seals, thermal insulation hoses, oil cooler hoses, air intake hoses, servocontrol hoses or pump diaphragms.

The nitrile rubbers hydroxylated and/or amine-modified by the metathesis before/or after hydrolysis are suitable for isocyanate crosslinking, for example for the production of laminated glass sheets, for the seals on double or triple glazing, and for the fixing of powder mixtures for solid-state rockets or boosters.

The functionalized nitrile rubbers have a low glass transition temperature. Through coupling with hard units based on polyesters or polyamides, it is possible to obtain multiblock copolymers which can be used as thermoplastic elastomers. These thermoplastic elastomers can be used for producing seals of all kinds, such as axle sleeves, sealing caps and hoses.

On account of their low glass transition temperature, the functionalized nitrile rubbers are also suitable for impact modification of brittle thermoplastics and thermosets, particularly when the thermoplastics or thermosets are polar or have suitable functional groups which are able to react or interact physically with the functional groups of the nitrile rubber. Examples are the impact modification of polyamides (aromatic or aliphatic), polyesters such as polybutylene terephthalate (PBT) or polyethylene terephthalate (PET), polycarbonate (PC), polymethylene oxide (POM), polyethersulphones, polyetherketones, polybenzimidazole and polyphenylene sulphide.

Thermosets which can be elastified by means of the functionalized nitrile rubbers are PF resins, epoxy resins, melamine/formaldehyde resins and unsaturated polyester resins (UP resins). The elastified thermosets are suitable for producing brake linings and clutch linings (PF resins), for preparing adhesives (epoxy resins), for paint systems and coatings (UP resins) and for producing shaped articles such as boat hulls (UP resins) or blades for wind turbines (UP resins, PF resins).

The invention thus also provides block copolymers comprising one or more blocks based on the functionalized nitrile rubber.

EXAMPLES

In the examples which follow, the metathesis catalysts I, II and III set out in Table 1, the nitrile rubbers A, B, C and D specified in Table 2 and the olefins set out in Table 3 are used.

TABLE 1

Catalysts used

| Catalyst | Identification | Structural formula | Molar mass [g/mol] | Source |
| --- | --- | --- | --- | --- |
| I | Grubbs II catalyst | 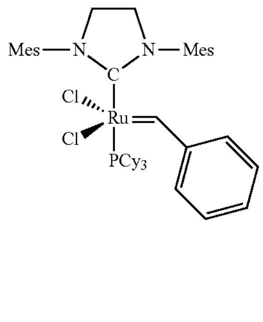 | 848.33 | From Materia/ Pasadena; U.S.A. |

TABLE 1-continued

Catalysts used

| Catalyst | Identification | Structural formula | Molar mass [g/mol] | Source |
|---|---|---|---|---|
| II | 2,6-Diisopropyl-phenylimidoneo-phylidenemolybdenum (VI) bis(t-butoxide) | 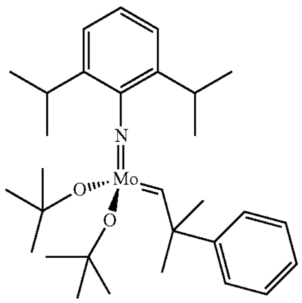 | 549.65 | ABCR |
| III | 2,6-Diisopropyl-phenylimidoneo-phylidenemolybdenum (VI) bis(hexafluoro-t-butoxide) | 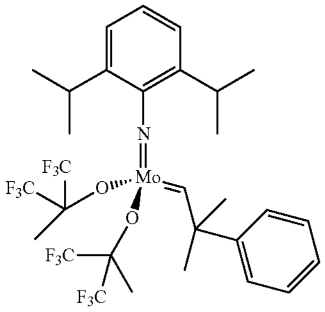 | 765.53 | ABCR |

TABLE 2

Nitrile rubbers used

| Rubber | Nitrile content [% by weight] | Degree of hydrogenation [%] | $MN_0$ [g/mol] | $MW_0$ [g/mol] | $PDI_0$ |
|---|---|---|---|---|---|
| A | 34 | 0 | 60 100 | 174 800 | 2.9 |
| B | 34 | 0 | 74 100 | 204 000 | 2.8 |
| C | 34 | 0 | 77 100 | 223 000 | 2.9 |
| D | 34 | 65.4 | 57 800 | 190 500 | 3.3 |

$MN_0$ Number-average molar mass before metathetic degradation
$MW_0$ Weight-average molar mass before metathetic degradation
$PDI_0$ Polydispersity index before degradation Tables 3a and 3b: Olefins Used Where the olefins used were not purchased, their preparation is described below.

TABLE 3a

Non-inventive olefins

| Chemical identification | Structural formula | Molar mass [g/mol] | Source |
|---|---|---|---|
| 1-Hexene |  | 84.16 | Sigma-Aldrich |
| 1-Octene | 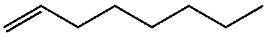 | 112.21 | Acros Organics |
| 1-Decene |  | 140.27 | Acros Organics |
| trans-4-Octene | 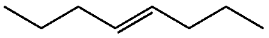 | 112.21 | Acros Organics |
| 5-Decene | $CH_3-(CH_2)_3-CH=CH-(CH_2)_3-CH_3$ | 140.27 | see synthesis instructions |

TABLE 3a-continued

| Non-inventive olefins | | | |
|---|---|---|---|
| Chemical identification | Structural formula | Molar mass [g/mol] | Source |
| Styrene | 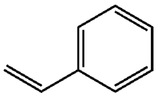 | 104.15 | Sigma-Aldrich |
| m-Nitrostyrene | 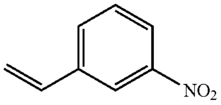 | 149.15 | ABCR |
| α-Methylstyrene | 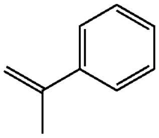 | 118.18 | Acros Organics |
| trans-Stilene | 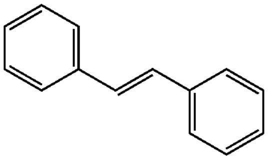 [SMILES: C(=C\c1ccccc1)/c1ccccc1] | 180.25 | Fluka |
| 1,1-Diphenylethylene | 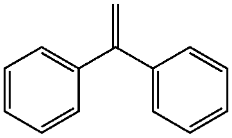 | 180.25 | Acros Organics |
| Allylamine | 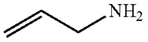 | 57.09 | Fluka |
| 1-Allyl-2,3,4,5,6-pentafluorobenzene | 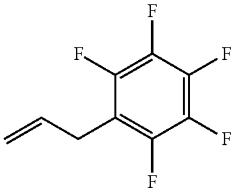 | 208.13 | Sigma-Aldrich |
| 3,3,4,4,5,5,6,6,6-Nonafluoro-1-hexene | 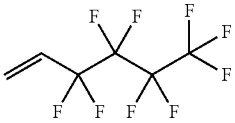 | 246.07 | Sigma-Aldrich |
| 4-Octene-1,8-diol | 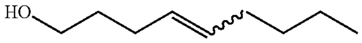 | 144.21 | see synthesis instructions |
| 3,10-Diisopropyl-2,11-dimethyl-6-dodecene-3,10-diol | 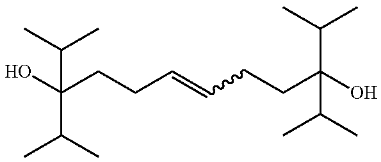 [SMILES: CC(C)C(O)(CCC=CCCC(O)(C(C)C)C(C)C)C(C)C] | 312.35 | see synthesis instructions |
| Diethyl fumarate | 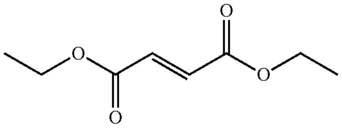 | 172.18 | see synthesis instructions |

TABLE 3b

| Inventive olefins | | | |
|---|---|---|---|
| Chemical identification | Structural formula | Molar mass [g/mol] | Source |
| Allyl alcohol | 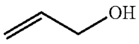 | 58.08 | Acros Organics |
| Allyl benzyl ether | 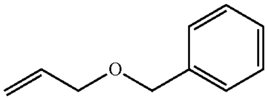 | 148.20 | Sigma-Aldrich |
| Allyl benzoate | 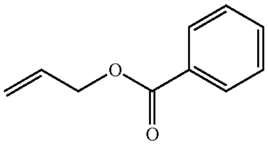 | 162.19 | see synthesis instructions |
| tert-Butyl N-allylcarbamate | 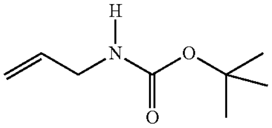 | 157.21 | Sigma-Aldrich |
| o-Allylphenol | 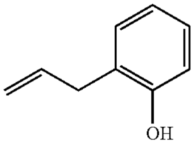 | 134.18 | Acros Organics |
| p-Allylphenol | 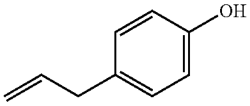 | 134.18 | see synthesis instructions |
| o-Allylanisole | 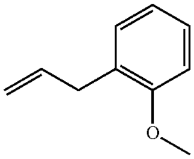 | 148.20 | see synthesis instructions |
| p-Allylanisole | 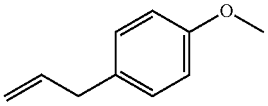 | 148.20 | Acros Organics |
| cis-2-Butene-1,4-diyl | 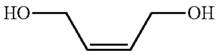 | 88.11 | Fluka |
| cis-2-Butene-1,4-diyl diacetate | 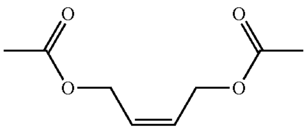 | 172.18 | see synthesis instructions |
| cis-2-Butene-1,4-diyl dibenzoate | 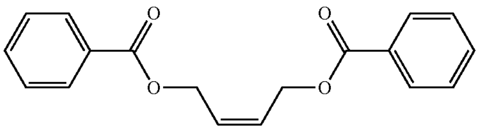 | 296.32 | see synthesis instructions |

TABLE 3b-continued

| Inventive olefins | | | |
|---|---|---|---|
| Chemical identification | Structural formula | Molar mass [g/mol] | Source |
| cis-1,4-Bisbenzyloxy-2-butene | 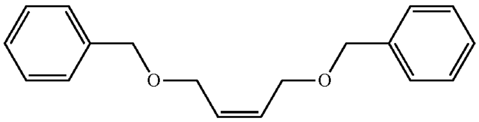 [SMILES: C(=C/COCc1ccccc1)/COCc1ccccc1] | 268.53 | Sigma-Aldrich |

A Preparation of Olefins not Purchased:

5-Decene:

Under Schlenk conditions, 5.0 g (59 mmol) of 1-hexene were first introduced into 20 ml of dry dichloromethane. The reaction was commenced by addition of 50 mg ($2.95*10^{-5}$ mol, 0.1 mol %) of Grubbs II catalyst in 5 ml of dichloromethane. The reaction mixture was subsequently stirred at 35° C. for 6 hours. The ethene formed was driven off by a continuous stream of inert gas. Following removal of the solvent under reduced pressure, the product, after distillation under reduced pressure (20 mbar, 58° C.), was obtained as a colourless liquid.

Yield: 2.4 g (17.8 mmol, 58%, of which 84% in trans-configuration).

4-Octene-1,8-diol:

Under Schlenk conditions, 2.0 g (23.5 mmol) of 4-pentene-1-ol were introduced into 10 ml of dry dichloromethane. The self-metathesis of 4-pentene-1-ol was commenced by addition of 20 mg ($2.35*10^{-5}$ mol, 0.1 mol %) of Grubbs II catalyst in 6 ml of dichloromethane. The reaction mixture was subsequently stirred at room temperature for 24 hours. The ethene formed was driven off by a continuous stream of inert gas. Following removal of the solvent under reduced pressure, the product, after column chromatography (silica gel, ethyl acetate), was obtained as a colourless oil.

Yield: 745 mg (5.17 mmol, 44%, of which 83% in trans-configuration).

3,10-Diisopropyl-2,11-dimethyl-6-dodecene-3,10-diol:

In a baked three-necked flask with reflux condenser, dropping funnel, inert gas inlet and pressure relief valve, 2.43 g (0.1 mol, 1 eq.) of magnesium turnings were introduced into 30 ml of dry diethyl ether. Thereafter, with gentle boiling of the solvent, a solution of 13.5 g (0.1 mol, 1 eq.) of 4-bromo-1-butene in 30 ml of diethyl ether was added dropwise and the reaction mixture was then heated under reflux for an hour. When the reaction mixture had cooled, a solution of 11.4 g (0.1 mol, 1 eq.) of 2,4-dimethyl-3-pentanone in 30 ml of diethyl ether was added dropwise and the mixture was heated under reflux for five hours. The reaction was then stopped by adding 100 ml of saturated ammonium chloride solution, the organic phase was separated off and the aqueous phase was extracted with twice 70 ml of diethyl ether. After two-fold washing of the ether phase with 100 ml of water and drying over $MgSO_4$, the drying agent was removed by filtration and the solvent was removed under reduced pressure. Subsequent vacuum distillation yielded 3-isopropyl-2-methyl-6-hepten-3-ol under a pressure of 16 mbar and a temperature of 90° C., as a colourless liquid.

Under Schlenk conditions, 2.0 g (11.7 mmol) of 3-isopropyl-2-methyl-6-hepten-3-ol were introduced into 6 ml of dry dichloromethane. The self-metathesis of 3-isopropyl-2-methyl-6-hepten-3-ol was commenced by addition of 100 mg (0.117 mmol, 1 mol %) of Grubbs II catalyst in 6 ml of dichloromethane. The reaction mixture was subsequently stirred at room temperature for 6 hours. The ethene formed was driven off by a continuous stream of inert gas. Following removal of the solvent under reduced pressure, the product, after column chromatography (silica gel, pentane/ethyl acetate=7/1), was obtained as a colourless oil.

Yield: 1.29 g (0.41 mmol, 71%, of which 80% in trans-configuration).

Diethyl fumarate:

In a 100 ml flask with water separator and reflux condenser, 11.6 g (0.1 mol, 1 eq.) of fumaric acid, 16.1 g (0.35 mol, 3.5 eq.) of ethanol and 1 g (5.3 mmol, 0.05 eq.) of toluenesulphonic acid were introduced into 30 ml of chloroform. This mixture was then heated under reflux until water was no longer separated off. This was followed by washing with twice 100 ml of one molar sodium hydroxide solution, and once with water. After drying over $MgSO_4$ and removal of the drying agent by filtration, the solvent was removed under reduced pressure, to give the product as a colourless liquid.

Yield: 16.8 g (97.6 mmol, 97%).

cis-2-Butene-1,4-diyl diacetate:

Under Schlenk conditions, in a Schlenk flask with dropping funnel and pressure relief valve, 17.2 g (0.1 mol, 1 eq.) of cis-2-butene-1,4-diol were introduced into 10 ml of pyridine. With ice-bath cooling, a solution of 30.6 g (0.3 mol, 3 eq.) of acetic anhydride in 20 ml of pyridine was added dropwise over the course of an hour. Following removal of the ice bath, the reaction solution was stirred at room temperature for 24 hours. Then 25 ml of dichloromethane were added, the organic phase was separated off, and washing took place with once 50 ml of two molar hydrochloric acid and with twice 80 ml of saturated sodium chloride solution. Drying over $MgSO_4$ was followed by removal of the drying agent by filtration, and by removal of the filtrate solvent under reduced pressure. Extraction gave the product as a colourless liquid.

Yield: 16.5 g (96 mmol, 96%).

cis-2-Butene-1,4-diyl dibenzoate:

Under Schlenk conditions, in a Schlenk flask with dropping funnel and pressure relief valve, 4.5 g (51 mmol, 1 eq.) of cis-2-butene-1,4-diol were introduced into 5 ml of pyridine. With ice-bath cooling, a solution of 24.5 g (0.11 mol, 2.1 eq.) of benzoic anhydride in 20 ml of pyridine was added dropwise over the course of an hour. Following removal of the ice bath, the reaction solution was stirred at room temperature for 24 hours. Then 25 ml of dichloromethane were added, the organic phase was separated off, and washing took place with once 50 ml of two molar hydrochloric acid and with twice 80 ml of saturated sodium chloride solution. Drying over $MgSO_4$ was followed by removal of the drying agent by filtration, and by removal of the filtrate solvent under reduced pressure. Subsequent column chromatography (aluminium oxide, pentane/ethyl acetate=1/1) gave the product in the form of a pale yellow solid with a sweet odour.

Yield: 12.9 g (0.43 mmol, 85%).

Allyl benzoate:

Under Schlenk conditions, in a Schlenk flask with dropping funnel and pressure relief valve, 2 g (34.4 mmol, 1 eq.) of allyl alcohol were introduced into 5 ml of pyridine. With ice-bath cooling, a solution of 8.6 g (37.9 mmol, 1.1 eq.) of benzoic anhydride in 10 ml of pyridine was added dropwise over the course of an hour. Following removal of the ice bath, the reaction solution was stirred at room temperature for 24 hours. Then 25 ml of dichloromethane were added, the organic phase was separated off, and washing took place with once 50 ml of two molar hydrochloric acid and with twice 80 ml of saturated sodium chloride solution. Drying over $MgSO_4$ was followed by removal of the drying agent by filtration, and by removal of the filtrate solvent under reduced pressure. Subsequent column chromatography (silica gel, pentane/ethyl acetate=12/1) gave the product as a colourless liquid.

Yield: 2.99 g (18.4 mmol, 54%).

p-Allylphenol:

In a baked Schlenk flask with dropping funnel and pressure relief valve, 2.96 g (20 mmol, 1 eq.) of p-allylanisole were introduced into 80 ml of dry dichloromethane. Next, after cooling of the batch to −70° C., 20 ml of a one molar solution of boron tribromide in heptane (5 g, 20 mmol, 1 eq. $BBr_3$) were added dropwise. Following warming to 15° C., over the course of two hours, the reaction was stopped by addition of 50 ml of ice-water. The organic phase was separated off and washed with twice 50 ml of 5% strength sodium hydroxide solution. The aqueous phase was extracted with three times 50 ml of diethyl ether. The combined organic phases were then dried over $MgSO_4$ and, following removal of the drying agent by filtration, the solvent was removed under reduced pressure. Subsequent column chromatography (silica gel, dichloromethane) gave the product as a light brown oil.

Yield: 1.45 g (10.8 mmol, 54%).

o-Allylanisole:

In a three-necked flask with reflux condenser, internal thermometer and dropping funnel, 4.0 g (29.8 mmol, 1 eq.) of o-allylphenol were introduced. Following addition of 2.13 g (38 mmol, 1.3 eq.) of potassium hydroxide in the form of a 10% strength by weight solution in water, the solution turned a blue-green colour. With cooling in a water bath, 3.76 g (29.8 mmol, 1 eq.) of dimethyl sulphate were slowly added dropwise, the temperature never rising above 40° C. This was followed by stirring at 90° C. for an hour and, after the reaction mixture had been cooled, the organic phase was separated off. The aqueous phase was extracted with three times 40 ml of diethyl ether, and the combined organic phases were washed with two times 70 ml of one molar sodium hydroxide solution, and with twice 70 ml of water. After drying over $MgSO_4$ and after removal of the drying agent by filtration, the solvent was removed under reduced pressure. Subsequent column chromatography (silica gel, pentane/dichloromethane=2/1) gave the product as a colourless liquid.

Yield: 3.55 g (23.9 mmol, 80%).

B Implementation of the Metathesis Reactions

All of the metathesis reactions were carried out in solution using chlorobenzene (from Sigma-Aldrich), called "MCB" below. Before being used, the MCB was distilled and inertized by passage of argon at room temperature. Over a period of 12 hours, the nitrile rubber or partially hydrogenated nitrile rubber (Table 2) was dissolved in MCB at room temperature with stirring. The rubber-containing solution was admixed with the additions (without dilutions) noted in the tables below, and stirred for 30 minutes for homogenization. The metathesis catalysts (see Table 1) were each dissolved in 6 ml of inertized MCB under argon, the addition of the catalyst solutions to the NBR solutions taking place immediately after the preparation of the catalyst solutions. All of the reaction batches were designed such that the rubber concentration following addition of catalyst was 12% by weight. In the case of the experiments with $2.38*10^{-4}$ mol olefin/g rubber, 40 g of rubber were used. When using $7.14*10^{-4}$, $1.43*10^{-3}$ and $2.86*10^{-3}$ mol olefin/g rubber, 10 g of rubber were used. The metathesis reactions were carried out at 23° C., using the amounts of ingredients specified in Tables 4-6. After a reaction time of 7 hours in each case, 3 g of the reaction solution were withdrawn, and reaction was stopped by addition of 0.2 ml of ethyl vinyl ether and subsequent 30-minute stirring at room temperature.

For the GPC analysis, 0.2 ml of the nitrile rubber solutions stopped with ethyl vinyl ether was removed and diluted with 3 ml of N,N'-dimethylacetamide (from Acros Organics, admixed with 5 g/l LiBr). Before the GPC analysis was carried out, the solutions were each filtered using a 0.2 μm syringe filter made of Teflon (Chromafil PTFE 0.2 μm; from Macherey-Nagel). Following this, GPC analysis took place using an instrument from Waters, equipped with a Waters 717 Autosampler, a PSS Gram preliminary column, a PSS Gram-30 Å 8×300 mm column and two PSS Gram-1000 Å 8×300 mm columns, from Polymer Standards Service, and with a Waters 410 RI detector and Cirrus Software Multi Version 3.0. The columns were calibrated with linear polymethyl methacrylate with molar masses of 600 to $1.64*10^6$ g/mol, from Polymer Standards Service. Analysis was carried out at a flow rate of 1.0 ml/min at 80° C. using N,N'-dimethylacetamide (with 5 g/l LiBr) as eluent.

C Results of Experimentation

C1 Determination of Amounts of Functional Groups in the Rubber

To determine the amounts of functional groups in the rubber, 750 mg of the stopped sample were diluted with 3 ml of chloroform (HPLC grade, with 7.5 mmol/1 amylene as stabilizer) and filtered using a 0.2 μm syringe filter made of Teflon (Chromafil PTFE 0.2 μm; from Macherey-Nagel). The polymeric fraction was then separated from low molecular mass constituents by means of gel permeation chromatography (instrument from Waters, equipped with a Waters 717 Autosampler, a preliminary column: 1× PLgel preliminary column, 1× times PLgel 5 μm MIXED-C 300×7.5 mm column, 1× times PLgel 5 μm MIXED-C 600×7.5 mm column from Polymer Laboratories and a Waters 410 RI detector). The solvent of the polymeric fraction was removed under reduced pressure and then a $^1H$-NMR spectrum was recorded. The number of functional groups per polymer chain was determined from the integral of the functional group and the integral of the proton adjacent to the nitrile group, in accordance with the following equation:

$$N(X) = \frac{I(X) \cdot \%\ (ACN) \cdot MN_e}{I(ACN) \cdot p(X) \cdot M(ACN)}$$

N(X) number of functional groups per polymer chain

I(X) integral of the functional group

% (ACN) nitrile content of the polymer $MN_e$ number-average molar mass after metathetic degradation p(X) number of protons leading to the integral I(X)

M(ACN) molar mass of acrylonitrile (53.06 g/mol)

I(ACN) integral of the backbone proton on the same carbon atom as the CN group

C2 Results of Experiment

The results from three experimental series are summarized in Tables 4, 5 and 6.

Table 4 shows the non-inventive comparative experiments of the 1st experimental series, which were carried out with constant catalyst use ($5.89*10^{-7}$ mol per g rubber) and olefin use ($2.38*10^{-4}$ mol per g rubber), with determination of the final molar masses achievable under these conditions.

Apparent from Table 4 for the 1st experimental series is that low final molar masses are achieved with a ratio ($Mw_e/Mw_0$)<55% only when using the Grubbs (II) catalyst (I) in combination with non-functionalized 1-olefins known from the prior art, such as 1-hexene, 1-octene and 1-decene, or with non-functionalized olefins having an internal double bond such as trans-4-octene. In this way, however, functionalized nitrile rubbers are not obtained. The use of the molybdenum-containing catalysts (II) and (III) in the presence of 1-hexene gives achievable final molar masses that are only slightly below 100% of the initial molar mass, meaning that there is virtually no metathetic degradation. When using the olefins 5-decene, styrene, m-nitrostyrene, α-methylstyrene, trans-stilbene, 1,1-diphenylethylene, 4-octene-1,8-diol, 3,10-diisopropyl-2,11-dimethyl-6-dodecene-3,10-diol, diethyl fumaric, allylamine, 1-allyl-2,3,4,5,6-pentafluorobenzene and 3,3,4,4,5,5,6,6,6-nonafluoro-1-hexene stated in Table 4, $Mw_e/Mw_0$ is markedly above 55%.

Table 5 shows the inventive experiments of the 2nd experimental series, likewise carried out with constant catalyst use ($5.89*10^{-7}$ mol per g rubber) and olefin use ($2.38*10^{-4}$ mol per g rubber), with determination of the final molar masses achievable under these conditions.

From Table 5 it is apparent for the 2nd experimental series that when using all of the functionalized olefins of the invention, low final molar masses result, with an $MW_e/MW_0$ ratio <55%.

Table 6 shows the inventive examples of the 3rd experimental series, which were carried out using different amounts of catalyst and olefin. It is shown that when using the functionalized olefins of the invention, starting both from unhydrogenated nitrile rubber and from partially hydrogenated nitrile rubber, the metathesis produces nitrile rubbers of relatively low molecular weight M, with 0.7 to 3.3 functional groups per molecule.

TABLE 4

1st experimental series (comparative experiments)

| Experiment No. | Catalyst Type | Catalyst Amount [mol/g NBR] | NBR | Olefin Type | Olefin Amount [mol/g NBR] | $\left[\frac{Mw_e}{Mw_o}\right] \times 100$ [%] |
|---|---|---|---|---|---|---|
| 1.01 | I | $5.89 * 10^{-7}$ | C | 1-Hexene | $2.38 * 10^{-4}$ | 28 |
| 1.02 | II | $5.89 * 10^{-7}$ | C | 1-Hexene | $2.38 * 10^{-4}$ | 95 |
| 1.03 | III | $5.89 * 10^{-7}$ | C | 1-Hexene | $2.38 * 10^{-4}$ | 94 |
| 1.04 | I | $5.89 * 10^{-7}$ | A | 1-Octene | $2.38 * 10^{-4}$ | 19 |
| 1.05 | I | $5.89 * 10^{-7}$ | A | 1-Decene | $2.38 * 10^{-4}$ | 22 |
| 1.06 | I | $5.89 * 10^{-7}$ | C | trans-4-Octene | $2.38 * 10^{-4}$ | 52 |
| 1.07 | I | $5.89 * 10^{-7}$ | C | 5-Decene | $2.38 * 10^{-4}$ | 60 |
| 1.08 | I | $5.89 * 10^{-7}$ | C | Styrene | $2.38 * 10^{-4}$ | 57 |
| 1.09 | I | $5.89 * 10^{-7}$ | C | m-Nitrostyrene | $2.38 * 10^{-4}$ | 67 |
| 1.10 | I | $5.89 * 10^{-7}$ | A | α-Methylstyrene | $2.38 * 10^{-4}$ | 67 |
| 1.11 | I | $5.89 * 10^{-7}$ | A | trans-Stilbene | $2.38 * 10^{-4}$ | 75 |
| 1.12 | I | $5.89 * 10^{-7}$ | A | 1,1-Diphenylethylene | $2.38 * 10^{-4}$ | 66 |
| 1.13 | I | $5.89 * 10^{-7}$ | C | 5-Octene-1,8-diol | $2.38 * 10^{-4}$ | 58 |
| 1.14 | I | $5.89 * 10^{-7}$ | C | 3,10-Diisopropyl-2,11-dimethyl-6-dodecene-3,10-diol | $2.38 * 10^{-4}$ | 61 |
| 1.15 | I | $5.89 * 10^{-7}$ | B | Diethyl fumarate | $2.38 * 10^{-4}$ | 59 |
| 1.16 | I | $5.89 * 10^{-7}$ | C | Allylamine | $2.38 * 10^{-4}$ | 92 |
| 1.17 | I | $5.89 * 10^{-7}$ | B | 1-Allyl-2,3,4,5,6-pentafluorobenzene | $2.38 * 10^{-4}$ | 65 |
| 1.18 | I | $5.89 * 10^{-7}$ | B | 3,3,4,4,5,5,6,6,6-Nonafluoro-1-hexene | $2.38 * 10^{-4}$ | 88 |

TABLE 5

2nd experimental series (inventive experiments)

| No. | Catalyst Type | Catalyst Amount [mol/g NBR] | NBR | Olefin Type | Olefin Amount [mol/g NBR] | $\left[\frac{Mw_e}{Mw_o}\right] \times 100$ [%] |
|---|---|---|---|---|---|---|
| 2.01 | I | $5.89 * 10^{-7}$ | C | Allyl alcohol | $2.38 * 10^{-4}$ | 54 |
| 2.02 | I | $5.89 * 10^{-7}$ | C | Allyl benzyl ether | $2.38 * 10^{-4}$ | 44 |
| 2.03 | I | $5.89 * 10^{-7}$ | C | Allyl benzoate | $2.38 * 10^{-4}$ | 49 |
| 2.04 | I | $5.89 * 10^{-7}$ | C | t-Butyl N-allylcarbamate | $2.38 * 10^{-4}$ | 44 |

TABLE 5-continued

| 2nd experimental series (inventive experiments) | | | | | | | |
|---|---|---|---|---|---|---|---|
| | Catalyst | | | Olefin | | | |
| No. | Type | Amount [mol/g NBR] | NBR | Type | Amount [mol/g NBR] | $\left[\frac{Mw_e}{Mw_o}\right] \times 100$ [%] |
| 2.05 | I | $5.89 * 10^{-7}$ | B | o-Allylphenol | $2.38 * 10^{-4}$ | 45 |
| 2.06 | I | $5.89 * 10^{-7}$ | B | p-Allylphenol | $2.38 * 10^{-4}$ | 47 |
| 2.07 | I | $5.89 * 10^{-7}$ | B | o-Allylanisole | $2.38 * 10^{-4}$ | 38 |
| 2.08 | I | $5.89 * 10^{-7}$ | B | p-Allylanisole | $2.38 * 10^{-4}$ | 33 |
| 2.09 | I | $5.89 * 10^{-7}$ | B | cis-2-Butene-1,4-diol | $2.38 * 10^{-4}$ | 51 |
| 2.10 | I | $5.89 * 10^{-7}$ | B | cis-1,4-Bisbenzyloxy-2-butene | $2.38 * 10^{-4}$ | 46 |
| 2.11 | I | $5.89 * 10^{-7}$ | B | cis-2-Butene-1,4-diyl dibenzoate | $2.38 * 10^{-4}$ | 47 |
| 2.12 | I | $5.89 * 10^{-7}$ | B | cis-2-Butene-1,4-diyl diacetate | $2.38 * 10^{-4}$ | 47 |

TABLE 6

| 3rd experimental series (inventive experiments) | | | | | | | | |
|---|---|---|---|---|---|---|---|---|
| | Metathesis catalyst | | | | Olefin | | | |
| No. | Type | Amount [mol/g NBR] | Addition (based on catalyst) | NBR | Type | Amount [mol/g NBR] | $\left[\frac{Mw_e}{Mw_o}\right] \times 100$ [%] | Number of functional groups per NBR chain |
| 3.01 | I | $1.77 * 10^{-6}$ | — | C | allyl benzyl ether | $7.14 * 10^{-4}$ | 14 | 1.2 |
| 3.02 | I | $1.77 * 10^{-6}$ | — | C | allyl benzoate | $7.14 * 10^{-4}$ | 20 | 1.1 |
| 3.03 | I | $1.77 * 10^{-6}$ | — | C | t-butyl N-alltlcarb-amate | $7.14 * 10^{-4}$ | 14 | 1.4 |
| 3.04 | I | $1.77 * 10^{-6}$ | — | C | p-allylanisole | $7.14 * 10^{-4}$ | 7 | 1.5 |
| 3.05 | I | $1.77 * 10^{-6}$ | — | C | cis-2-butene-1,4-diyl dibenzoate | $7.14 * 10^{-4}$ | 24 | 1.9 |
| 3.06 | I | $5.89 * 10^{-7}$ | — | C | cis-2-butene 1,4-diyl dibenzoate | $1.43 * 10^{-3}$ | 44 | 2.2 |
| 3.07 | I | $3.53 * 10^{-6}$ | — | C | cis-2-butene-1,4-diyl dibenzoate | $2.38 * 10^{-4}$ | 21 | 1.8 |
| 3.08 | I | $3.53 * 10^{-6}$ | — | C | cis-2-butene-1,4-diyl dibenzoate | $1.43 * 10^{-3}$ | 13 | 3.3 |
| 3.09 | I | $5.89 * 10^{-7}$ | 100 eq. $Ti(OiPr)_4$ | C | cis-2-butene-1,4-diyl dibenzoate | $2.38 * 10^{-4}$ | 21 | 1.2 |
| 3.10 | I | $5.89 * 10^{-7}$ | 100 eq. $Ti(OiPr)_4$ | C | cis-1,4-bisbenzyloxy-2-butene | $2.38 * 10^{-4}$ | 32 | 0.7 |
| 3.11 | I | $7.06 * 10^{-6}$ | — | D | cis-1,4-bisbenzyloxy-2-butene | $2.86 * 10^{-3}$ | 15 | 1.9 |

What is claimed is:

1. A process for preparing functionalized nitrile rubbers comprising end groups X, or Y and Z as set forth below, the process comprising contacting a nitrile rubber with a metathesis catalyst, which is a complex catalyst based on a metal from transition group 6 or 8 of the Periodic Table which has at least one ligand attached carbenically to the metal, in the presence of at least one compound of the general formula (I) or (II), $$H_2C{=}CH{-}CH_2{-}X \quad (I)$$

$$Y{-}CH_2{-}CH{=}CH{-}CH_2{-}Z \quad (II)$$

where

X is $OR^1$, in which $R^1$ is H, $C_1$-$C_{18}$ alkyl, $C_7$-$C_{24}$ aralkyl, phenyl, naphthyl or fluorenyl, $O{-}(CH_2{-}CH_2{-}O)_n{-}R^2$, in which $R^2$ is H, $C_1$-$C_{18}$ alkyl, $C_7$-$C_{24}$ aralkyl, phenyl, naphthyl or fluorenyl and n is 1 to 20, $O{-}(CH_2{-}CH(CH_3){-}O)_n{-}R^3$, in which $R^3$ is H, $C_1$-$C_{18}$ alkyl, $C_7$-$C_{24}$ aralkyl, phenyl, naphthyl or fluorenyl and n is 1 to 20, $O{-}C({=}O){-}R^4$, in which $R^4$ is H, $C_1$-$C_{18}$ alkyl, $C_7$-$C_{24}$ aralkyl, phenyl, naphthyl or fluorenyl, $C_6$-$C_{18}$ aryl, which is substituted by at least one radical $OR^5$, in which $R^5$ is H, $C_1$-$C_{18}$ alkyl, $C_7$-$C_{24}$ aralkyl, phenyl, naphthyl or fluorenyl, or NH—C(═O)—$OR^6$, in which $R^6$ is H, $C_1$-$C_{18}$ alkyl, $C_7$-$C_{24}$ aralkyl, phenyl, naphthyl or fluorenyl, and Y and Z are identical or different and $OR^7$, in which $R^7$ is H, $C_1$-$C_{18}$ alkyl, $C_7$-$C_{24}$ aralkyl, phenyl, naphthyl or fluorenyl, O—($CH_2$—$CH_2$—O)$_n$—$R^8$, in which $R^8$ is H, $C_1$-$C_{18}$ alkyl, $C_7$-$C_{24}$ aralkyl, phenyl, naphthyl or fluorenyl and n is 1 to 20, O—($CH_2$—CH($CH_3$)—O)$_n$—$R^9$, in which $R^9$ is H, $C_1$-$C_{18}$ alkyl, $C_7$-$C_{24}$ aralkyl, phenyl, naphthyl or fluorenyl and n is 1 to 20, O—C(═O)—$R^{10}$, in which $R^{10}$ is H, $C_1$-$C_{18}$ alkyl, $C_7$-$C_{24}$ aralkyl, phenyl, naphthyl or fluorenyl, $C_6$-$C_{18}$ aryl, which is substituted by at least one radical $OR^{11}$, in which $R^{11}$ is H, $C_1$-$C_{18}$ alkyl, $C_7$-$C_{24}$ aralkyl, phenyl, naphthyl or fluorenyl, or NH—C(═O)—$OR^{12}$, in which $R^{12}$ is H, $C_1$-$C_{18}$ alkyl, $C_7$-$C_{24}$ aralkyl, phenyl, naphthyl or fluorenyl.

2. The process according to claim 1, wherein the metathesis catalyst is:

(i) a catalyst of the general formula (A), (A)

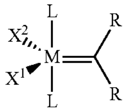

in which

M is osmium or ruthenium, $X^1$ and $X^2$ are identical or different and represent two ligands, L represents identical or different ligands, R is identical or different at each occurrence and represents hydrogen, alkyl, cycloalkyl, alkenyl, alkynyl, aryl, carboxylate, alkoxy, alkenyloxy, alkynyloxy, aryloxy, alkoxycarbonyl, alkoxycarbonyl, alkylamino, alkylthio, arylthio, alkylsulphonyl, or alkylsulphinyl, it being possible for all of these radicals to be substituted in each case optionally by one or more alkyl, halogen, alkoxy, aryl or heteroaryl radicals, or alternatively both radicals R are bridged, with incorporation of the common C atom to which they are attached, to form a cyclic group, which may be aliphatic or aromatic in nature, is optionally substituted and may contain one or more heteroatoms, (ii) a catalyst of the general formula (A1), (A1)

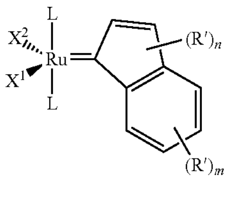

in which $X^1$, $X^2$ and L can have the same general definitions as in the general formula (A), n is 0, 1 or 2, m is 0, 1, 2, 3 or 4, and R' is identical or different at each occurrence and denotes alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radicals, all of which may be substituted in each case by one or more alkyl, halogen, alkoxy, aryl or heteroaryl radicals, (iii) a catalyst of the general formula (B), (B)

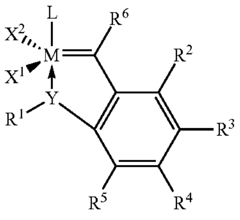

in which

M is ruthenium or osmium, $X^1$ and $X^2$ are identical or different ligands,

Y is oxygen (O), sulphur (S), a radical N—$R^1$ or a radical P—$R^1$, where $R^1$ possesses the definitions stated below, $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, which may all be substituted in each case optionally by one or more alkyl, halogen, alkoxy, aryl or heteroaryl radicals, $R^2$, $R^3$, $R^4$ and $R^5$ are identical or different and represent hydrogen or organic or inorganic radicals, $R^6$ is H or an alkyl, alkenyl, alkynyl or aryl radical, and L is a ligand which possesses the same definitions as stated for the formula (A), (iv) a catalyst of the general formula (B1), (B1)

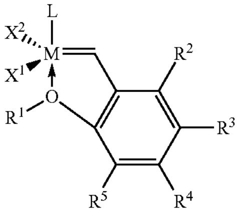

in which

M, L, $X^1$, $X^2$, $R^1$, $R^2$, $R^3$, $R^4$ and $R^5$ can possess the definitions stated for the general formula (B), (v) a catalyst of the general formula (B2), (B2)

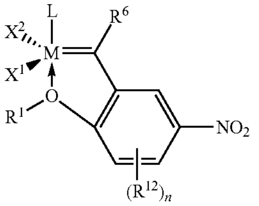

in which

M, L, $X^1$, $X^2$, $R^1$ and $R^6$ have the general definitions for the formula (B), $R^{12}$ is identical or different at each occurrence and possesses the definitions stated for the radicals $R^2$, $R^3$, $R^4$ and $R^5$ in the formula (B), with the exception of hydrogen, and n is 0, 1, 2 or 3, (vi) a catalyst of the general formula (B3), (B3)

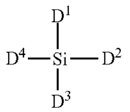

in which $D^1$, $D^2$, $D^3$ and $D^4$ each have a structure of the general formula (XVIII) shown below, which is attached via the methylene group shown on the right to the silicon of the formula (B3), (XVIII)

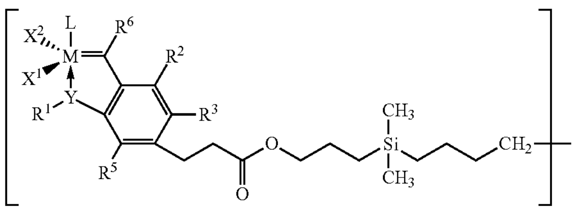

in which

M, L, $X^1$, $X^2$, $R^1$, $R^2$, $R^3$, $R^5$ and $R^6$ may possess the definitions stated for the general formula (B), (vii) a catalyst of the general formula (B4), in which the symbol ● stands for a support, (B4)

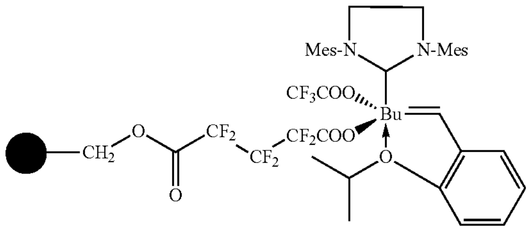

(viii) a catalyst of the general formula (C), (C)

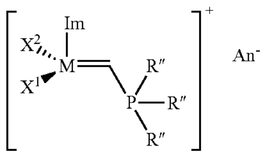

in which

M is ruthenium or osmium, $X^1$ and $X^2$ are identical or different and represent anionic ligands, R" is identical or different at each occurrence and represents organic radicals, Im represents an optionally substituted imidazolidine radical, and An represents an anion, (ix) a catalyst of the general formula (D), (D)

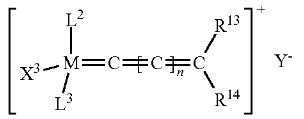

in which

M is ruthenium or osmium, $R^{13}$ and $R^{14}$ independently of one another are hydrogen, $C_1$-$C_{20}$ alkyl, $C_2$ -$C_{20}$ alkenyl, $C_2$-$C_{20}$ alkynyl, $C_6$-$C_{24}$ aryl, $C_1$-$C_{20}$ carboxylate, $C_1$-$C_{20}$ alkoxy, $C_2C_{20}$ alkenyloxy, $C_2$-$C_{20}$ alkynyloxy, $C_6$-$C_{24}$ aryloxy, $C_2$-$C_{20}$ alkoxycarbonyl, $C_1$-$C_{20}$ alkylthio, $C_1$-$C_{20}$ akylsulphonyl or $C_1$-$C_{20}$ alkylsulphinyl, $X^3$ is an anionic ligand, $L^2$ is a neutral π-bonded ligand, irrespective of whether it is monocyclic or polycyclic, $L^3$ is a ligand from the group of the phosphines, sulphonated phosphines, fluorinated phosphines, functionalized phosphines having up to three aminoalkyl, ammonioalkyl, alkoxyalkyl, alkoxycarbonylalkyl, hydrocarbonylalkyl, hydroxyalkyl or ketoalkyl groups, phosphites, phosphinites, phosphonites, phosphinamines, arsines, stibines, ethers, amines, amides, imines, sulphoxides, thioethers and pyridines, $Y^-$ is a non-coordinating anion, and n is 0, 1, 2, 3, 4 or 5, (x) a catalyst of the general formula (E), (E)

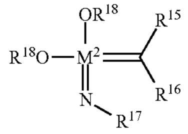

in which $M^2$ is molybdenum, $R^{15}$ and $R^{16}$ are identical or different and are hydrogen, $C_1$-$C_{20}$ alkyl, $C_2$-$C_{20}$ alkenyl, $C_2$-$C_{20}$ alkynyl, $C_6$-$C_{24}$ aryl, $C_1$-$C_{20}$ carboxylate, $C_1$-$C_{20}$ alkoxy, $C_2$-$C_{20}$ alkenyloxy, $C_2$-$C_{20}$ alkynyloxy, $C_6$-$C_{24}$ aryloxy, $C_2$-$C_{20}$ alkoxycarbonyl, $C_1$-$C_{20}$ alkylthio, $C_1$-$C_{20}$ alkylsulphonyl or $C_1$-$C_{20}$ alkylsulphinyl, $R^{17}$ and $R^{18}$ are identical or different and represent a substituted or a halogen-substituted $C_1$-$C_{20}$ alkyl, $C_6$-$C_{24}$ aryl or $C_6$-$C_{30}$ aralkyl radical or silicone-containing analogues thereof, (xi) a catalyst of the general formula (F), (F)

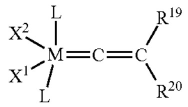

in which

M is ruthenium or osmium, $X^1$ and $X^2$ are identical or different and represent anionic ligands, which may adopt all of the definitions of $X^1$ and $X^2$ stated in the general formulae (A) and (B), L represents identical or different ligands, which may adopt all of the definitions of L stated in the general formulae (A) and (B), $R^{19}$ and $R^{20}$ are identical or different and are hydrogen or substituted or unsubstituted alkyl, (xii) a catalyst of the general formulae (G), (H) or (K), (G)

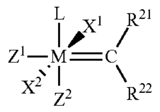

(H)

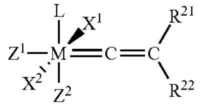

(K)

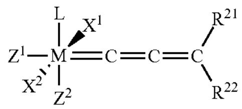

in which

M is osmium or ruthenium, $X^1$ and $X^2$ are identical or different and represent two ligands, L represents a ligand, $Z^1$ and $Z^2$ are identical or different and represent neutral electron donors, $R^{21}$ and $R^{22}$ independently of one another are hydrogen, alkyl, cycloalkyl, alkenyl, alkynyl, aryl, carboxylate, alkoxy, alkenyloxy, alkynyloxy, aryloxy, alkoxycarbonyl, alkylamino, alkylthio, alkylsulphonyl or alkylsulphinyl, which in each case are substituted by one or more radicals selected from alkyl, halogen, alkoxy, aryl or heteroaryl, (xiii) a catalyst (N) containing the general structural element (N1), (N1)

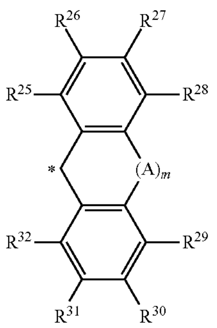

where the carbon atom labelled with a "*" is attached via one or more double bonds to the parent catalyst structure, and in which $R^{25}$-$R^{32}$ are identical or different and are hydrogen, halogen, hydroxyl, aldehyde, keto, thiol, $CF_3$, nitro, nitroso, cyano, thiocyano, isocyanato, carbodiimide, carbamate, thiocarbamate, dithiocarbamate, amino, amido, imino, silyl, sulphonate ($—SO_3^-$), $—OSO_3^-$, $—PO_3^-$ or $OPO_3^-$ or are alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl, alkylsulphinyl dialkylamino, alkylsilyl or alkoxysilyl, it being possible for all of these radicals to be substituted in each case optionally by one or more alkyl, halogen, alkoxy, aryl or heteroaryl radicals, or alternatively in each case two directly adjacent radicals from the group of $R^{25}$-$R^{32}$ form by bridging, with inclusion of the ring carbon atoms to which they are attached, a cyclic group, or alternatively $R^8$ is optionally bridged with another ligand of the ruthenium- or osmium-carbene complex catalyst, m is 0 or 1 and A is oxygen, sulphur, $C(R^{33}R^{34})$, $N—R^{35}$, $—C(R^{36})=C(R^{37})—$, $—C(R^{36})(R^{38})—C(R^{37})(R^{39})—$, in which $R^{33}$-$R^{39}$ are identical or different and may each possess the same definitions as the radicals $R^{25}$-$R^{32}$.

3. The process according to claim 2, wherein the metathesis catalyst is:

a catalyst of the formula (IV) or (V), where Cy is cyclohexyl, (IV)

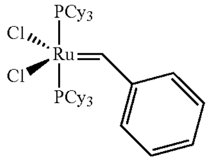

(V)

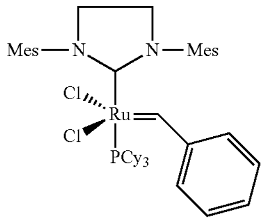

a catalyst of the formula (VI), where Mes in each case is 2,4,6-trimethylphenyl and Ph is phenyl, (VI)

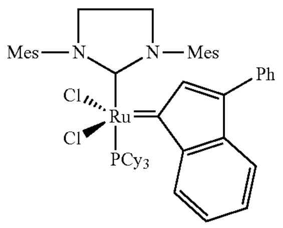

a catalyst of the general formula (B1), where

M represents ruthenium, $X^1$ and $X^2$ simultaneously are halogen, more particularly simultaneously are chlorine, $R^1$ is a straight-chain or branched $C_1$-$C_{12}$ alkyl radical, $R^2$, $R^3$, $R^4$ and $R^5$ possess the general definitions stated for the general formula (B), and L possesses the general definitions stated for the general formula (B), and preferably represents an optionally substituted imidazolidine radical of the formula (IIa) or (IIb), (IIa)

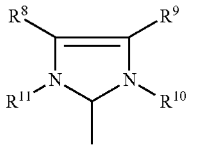

(IIb)

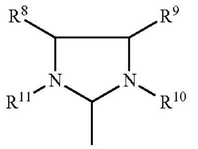

in which $R^8$, $R^9$, $R^{10}$ and $R^{11}$ are identical or different and are hydrogen, straight-chain or branched $C_1$-$C_{30}$ alkyl, $C_3$-$C_{20}$ cycloalkyl, $C_2$-$C_{20}$ alkenyl, $C_2$-$C_{20}$ alkynyl, $C_6$-$C_{24}$ aryl, $C_1$ $C_{20}$ carboxylate, $C_1$-$C_{20}$ alkoxy, $C_2$ -$C_{20}$ alkenyloxy, $C_2$-$C_{20}$ alkynyloxy, $C_6$-$C_{24}$ aryloxy, $C_2$ -$C_{20}$ alkoxycarbonyl, $C_1$-$C_{20}$ alkylthio, $C_6$-$C_{24}$ arylthio, $C_1$-$C_{20}$-alkylsulphonyl, $C_1$-$C_{20}$ alkylsulphonate, $C_6$-$C_{24}$ arylaulohonate or $C_1$-$C_{20}$ alkylsulphinyl, it being possible for the aforementioned radicals to be substituted in each case by one or more substituents, and these aforementioned substituents as we may be substituted in turn by one or more radicals selected from the group of halogen, $C_1$-$C_5$ alkyl, $C_1$-$C_5$ alkoxy and phenyl, or a catalyst of the formula (VII), where Mes in each case is 2,4,6-trimethylphenyl, (VII)

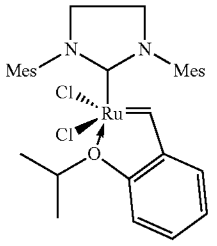

a catalyst of the formulae (VIII), (IX), (X), (XI), (XII), (XIII), (XIV) or (XV), where Mes in each case is 2,4,6-trimethylphenyl, (VIII)

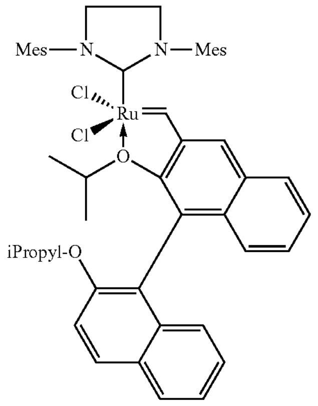

(IX)

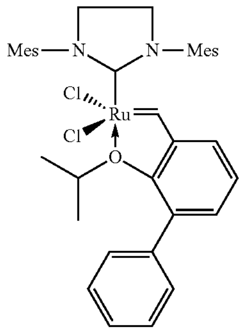

(X)

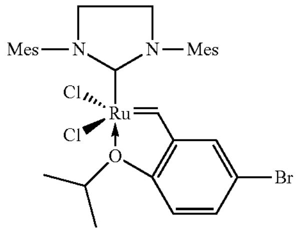

(XI)

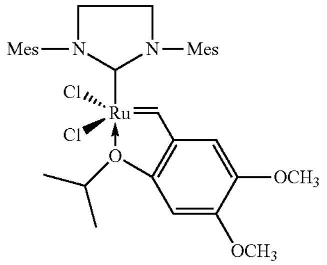

(XII)

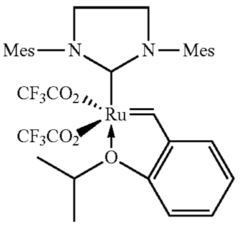

-continued (XIII)

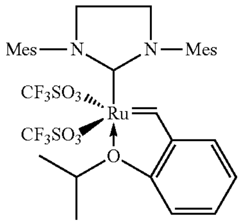

(XIV)

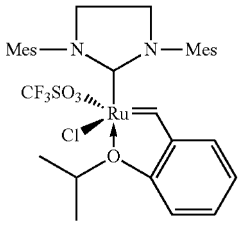

(XV)

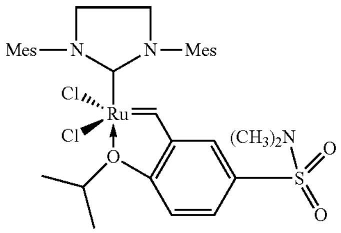

a catalyst of the general formula (B2), where

M represents ruthenium, $X^1$ and $X^2$ simultaneously are halogen, more particularly simultaneously are chlorine, $R^1$ is a straight-chain or branched $C_1$-$C_{12}$ alkyl radical, $R^{12}$ possesses the definitions stated for the general formula (B2), n is 0, 1, 2 or 3, $R^6$ is hydrogen and L possesses the definitions stated for the general formula (B), and preferably represents an optionally substituted imidazolidine radical of the formula (IIa) or (IIb), a catalyst of the formula (XVI) or (XVII), where Mes in each case is 2,4,6-trimethylphenyl, (XVI)

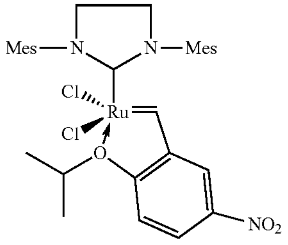

-continued (XVII)

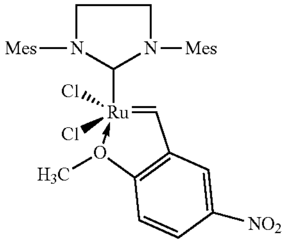

a catalyst of the general formulae (G), (H) and (K), in which

M is ruthenium, $X^1$ and $X^2$ both represent halogen, more particularly chlorine, $R^1$ and $R^2$ are identical or different and represent five- or six-membered monocyclic groups having 1 to 4, heteroatoms, or bicyclic or polycyclic structures comprising 2, 3, 4 or 5 such five- or six-membered monocyclic groups, it being possible for all groups stated above in each case to be substituted by one or more alkyl, cycloalkyl, alkoxy, halogen, aryl, or heteroaryl, radicals, $R^{21}$ and $R^{22}$ are identical or different and represent $C_1$-$C_{30}$ alkyl, $C_3$-$C_{20}$ cycloalkyl, $C_2$-$C_{20}$ alkenyl, $C_2$-$C_{20}$ alkynyl, $C_6$-$C_{24}$ aryl, $C_1$-$C_{20}$ carbmiate, $C_1$-$C_{20}$ alkoxy, $C_2$-$C_{20}$ alkenyloxy, $C_2$-$C_{20}$ alkynyloxy, $C_6$-$C_{24}$ aryloxy, $C_2$-$C_{20}$ alkoxycarbonyl, $C_1$-$C_{30}$ alkylamino, $C_1$-$C_{30}$ alkylthio, $C_6$-$C_{24}$ arylthio, $C_1$-$C_{20}$ alkylsulphonyl, $C_1$-$C_{20}$ alkylsulphinyl, and L possesses a structure of the general formula (IIa) or (IIb) already described above, more particularly of the formulae (IIIa) to (IIIf), a catalyst of the structure (XIX), (XIX)

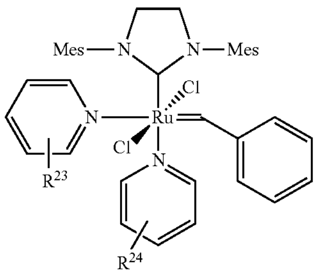

in which $R^{23}$ and $R^{24}$ are identical or different and are halogen, straight-chain or branched $C_1$-$C_{20}$ alkyl, $C_1$-$C_{20}$ heteroalkyl, $C_1$-$C_{10}$ haloalkyl, $C_1$-$C_{10}$ alkoxy, $C_6$-$C_{24}$ aryl, formyl, nitro, nitrogen heterocycles, carboxyl, alkylcarbonyl, halocarbonyl, carbamoyl, thiocarbamoyl, carbamido, thioformyl, amino, dialkylamino, trialkylsilyl and trialkoxysilyl, a catalyst of the formula (XIXa) or (XIXb), where $R^{23}$ and $R^{24}$ possess the same definitions as indicated in the formula (XIX), (XIXa)
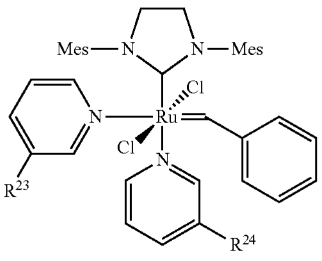
(XIXb)
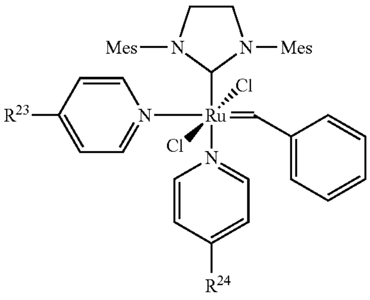
a catalyst of the formulae (XX)-(XXXI), where Mes is 2,4,6-trimethylphenyl,
(XX)
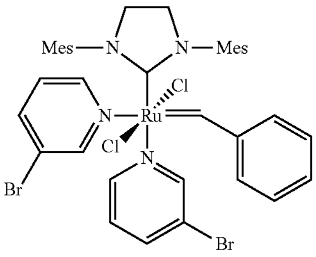
(XXI)
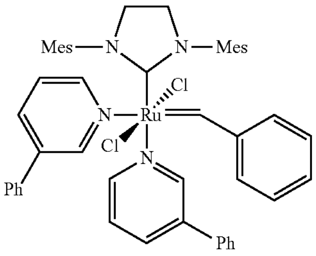
(XXII)
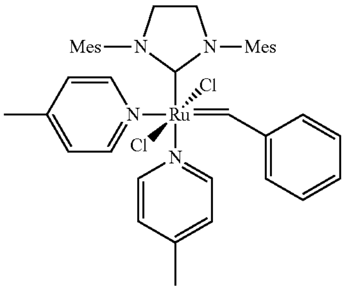
-continued
(XXIII)
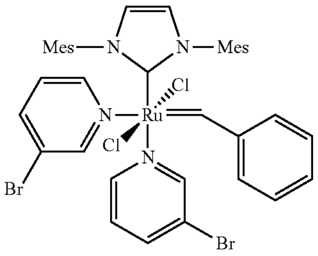
(XXIV)
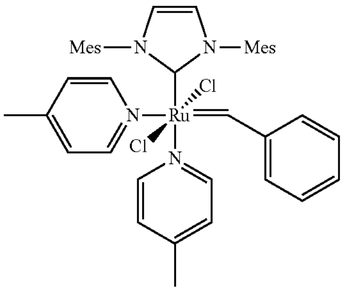
(XXV)
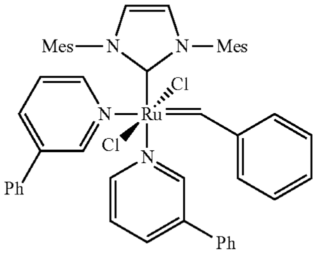
(XXVI)
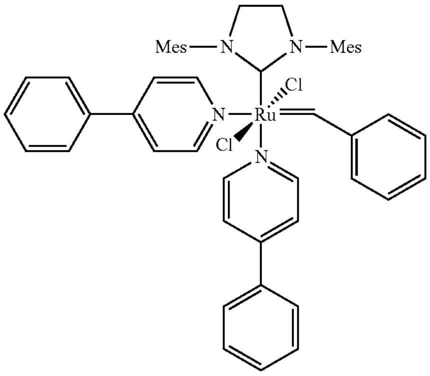
(XXVII)
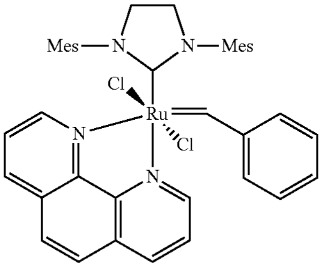

-continued (XXVIII)

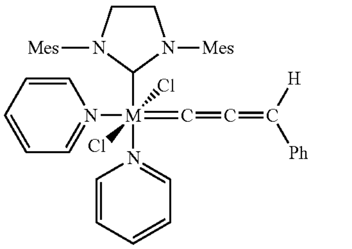

(XXIX)

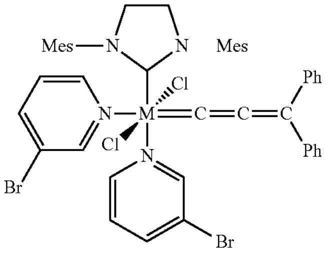

(XXX)

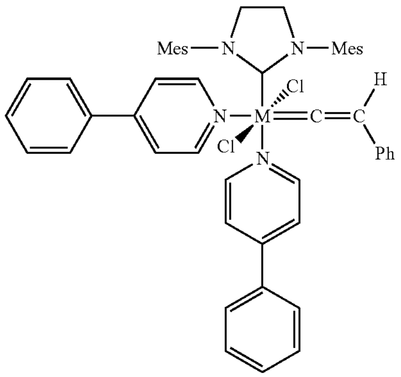

(XXXI)

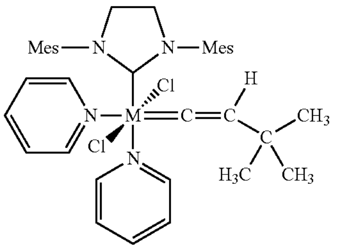

a catalyst of the formulae (N2a) and (N2b), (N2a)

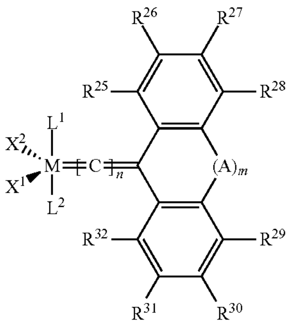

-continued (N2b)

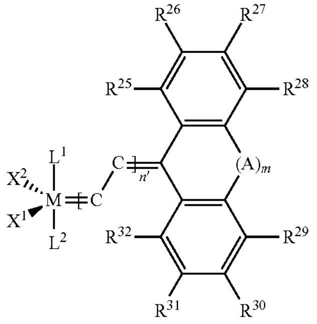

in which

M is ruthenium or osmium, $X^1$ and $X^2$ are identical or different and represent two ligands, $L^1$ and $L^2$ represent identical or different ligands, where $L^2$ alternatively may also be bridged with the radical $R^8$, n is 0, 1, 2 or 3, n' is 1 or 2, and $R^{25}$-$R^{32}$, m and A possess the same definitions as in the general formula (N1), a catalyst of the formulae (N13a) or (N13b)

(N13a)

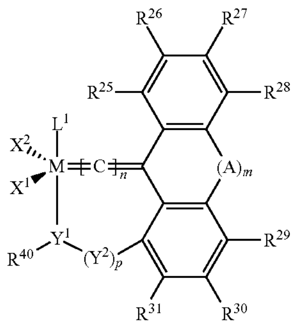

(N13b)

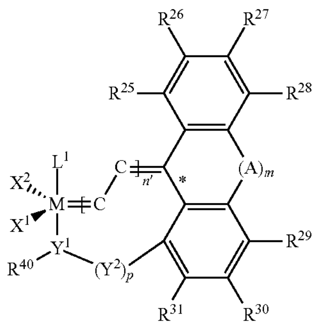

in which $Y^1$ is oxygen, sulphur, a radical N—$R^{41}$ or a radical P—$R^{41}$, where $R^{41}$ possesses the definitions identified below, $R^{40}$ and $R^{41}$ are identical or different and represent an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, which may all in each case be optionally substituted by one more alkyl, halogen, aikoxy, aryl or heteroaryl radicals, p is 0 or 1 and
$Y^2$ if p is 1, is $-(CH_2)_r-$ with r=1, 2 or 3, $-C(=O)-CH_2-$, $-C(=O)-$, $-N=CH-$, $-N(H)-C(=O)-$ or else alternatively the entire structural unit "$-Y^1(R^{40})-(Y^2)_p-$" is ($-N(R^{40})=CH-CH_2-$), ($-N(R^{40},R^{41})=CH-CH_2-$), and
where M, $X^1$, $X^2$, $L^1$, $R^{25}$-$R^{32}$, A, m and n possess the same definitions as in the general formulae (IIa) and (IIb), or
a catalyst of the following structures
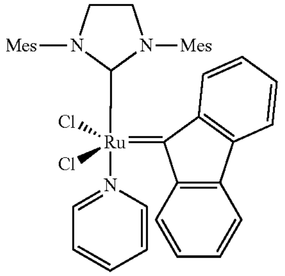
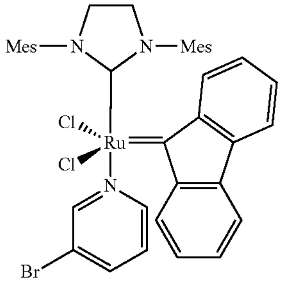
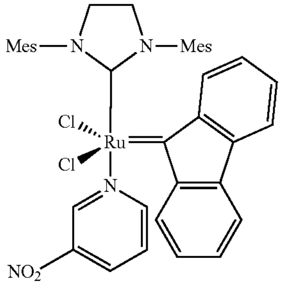
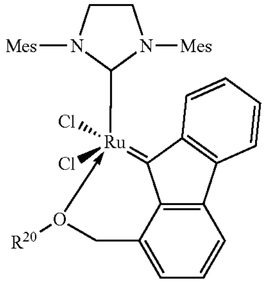
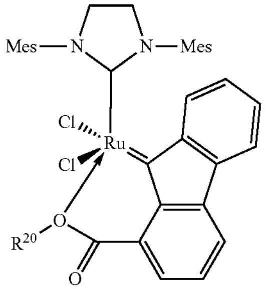
-continued
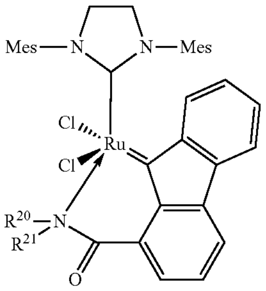
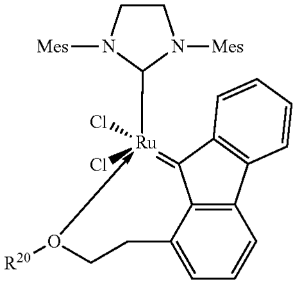
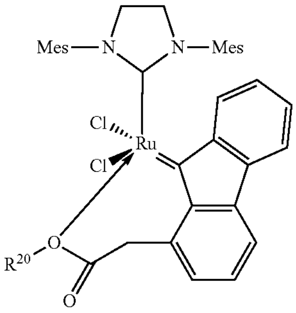
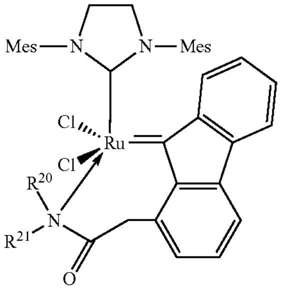
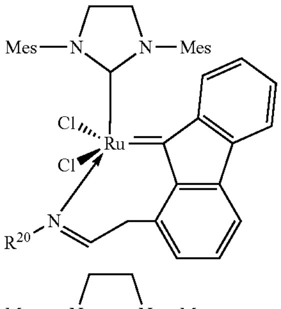
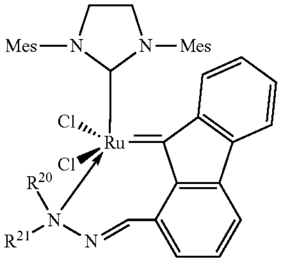

-continued

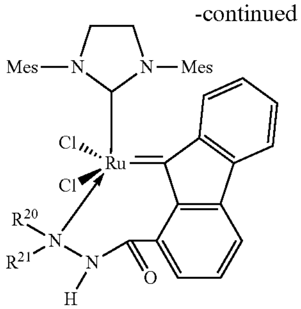

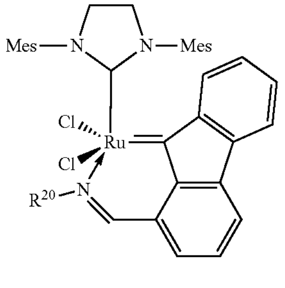

.

4. The process according to claim 2 or 3, wherein the functionalized olefin is of the general formula (I) or (II), wherein X is $OR^1$, in which $R^1$ is H, $C_1$-$C_{12}$ alkyl, $C_7$-$C_{18}$ aralkyl, phenyl, naphthyl or fluorenyl, $O—(CH_2—CH_2—O)_n—R^2$, in which $R^2$ is H, $C_1$-$C_{12}$ alkyl, $C_7$-$C_{18}$ aralkyl, phenyl, naphthyl or fluorenyl, and n is 1 to 20, $O—(CH_2—CH(CH_3)—O)_n—R^3$, in which $R^3$ is H, $C_1$-$C_{12}$ alkyl, $C_7$-$C_{18}$ aralkyl, phenyl, naphthyl or fluorenyl and n is 1 to 20, $O—C(═O)—R^4$, in which $R^4$ is H, $C_1$-$C_{12}$ alkyl, $C_7$-$C_{18}$ aralkyl, phenyl, naphthyl or fluorenyl, $C_6$-$C_{12}$ aryl, which is substituted by at least one radical $OR^5$, in which $R^5$ is H, $C_1C_{12}$ alkyl, $C_7C_{18}$ aralkyl, phenyl, naphthyl or fluorenyl, or $NH—C(═O)—OR^6$, in which $R^6$ is H, $C_1$-$C_{18}$ alkyl, $C_7$-$C_{24}$ aralkyl, phenyl, naphthyl or fluorenyl and Y and Z are identical or different and are $OR^7$, in which $R^7$ is H, $C_1$-$C_{12}$ alkyl, $C_7$-$C_{18}$ aralkyl, phenyl, naphthyl or fluorenyl, $O—(CH_2—CH_2—O)_n—R^8$, in which $R^8$ is H, $C_1$-$C_{12}$ alkyl, $C_7$-$C_{18}$ aralkyl, phenyl, naphthyl or fluorenyl and n is 1 to 20, $O—(CH_2—CH(CH_3)—O)_n—R^9$, in which $R^9$ is H, $C_1$-$C_{12}$ alkyl, $C_7$-$C_{18}$ aralkyl, phenyl, naphthyl or fluorenyl and n is 1 to 20, $O—C(═O)—R^{10}$, in which $R^{10}$ is H, $C_1$-$C_{12}$ alkyl, $C_7$-$C_{18}$ aralkyl, phenyl, naphthyl or fluorenyl $C_6$-$C_{12}$ aryl, which is substituted by at least one radical $OR^{11}$, in which $R^{11}$ is H, $C_1$-$C_{12}$ alkyl, $C_7$-$C_{18}$ aralkyl, phenyl, naphthyl or fluorenyl, or $NH—C(═O)—OR^{12}$, in which $R^{12}$ is H, $C_1$-$C_{12}$ alkyl, $C_7$-$C_{18}$ aralkyl, phenyl, naphthyl or fluorenyl.

5. The process according to claim 2 or 3, wherein the functionalized olefin is tert-butyl N-allylcarbamate, p-allylanisole, o-allylanisole, p-allylphenol, o-allyphenol, allylbenzoate, allylbenzyl ether, cis-1,4-bisbenzoyloxy-2-butene, cis-2-butene-1,4-diyl dibenzoate, cis-2-butene-1,4-diyl diacetate or mixtures thereof.

6. The process according to claim 2 or 3, wherein the compound of the general formula (I) or (II) is used in an amount of $8*10^{-6}$ mol to $8*10^{-3}$ mol, based on 1 g of nitrile rubber.

7. The process according to claim 2 or 3, wherein the metathesis catalyst is used in an amount of $4*10^{-8}$ mol to $4*10^{-5}$ mol, based on 1 g of nitrile rubber.

8. The process according to claim 2 or 3, wherein the metathesis catalyst is used, relative to the functionalized olefin of the general formula (I) or (II), in a molar ratio of ($5*10^{-6}$ to 5):1.

9. The process according to claim 2 or 3, wherein the nitrile rubber comprises repeating units which derive from at least one conjugated diene and at least one α,β-unsaturated nitrile and the C═C double bonds from the copolymerized diene monomers are present in either unhydrogenated or partly hydrogenated form.

10. Functionalized nitrile rubbers comprising repeating units which derive from at least one conjugated diene and at least one α,β-unsaturated nitrile, and also either end groups X or end groups Y and Z, where X is $OR^1$, in which $R^1$ is H, $C_1$-$C_{18}$ alkyl, $C_7$-$C_{24}$ aralkyl, phenyl, naphthyl or fluorenyl, $O—(CH_2—CH_2—O)_n—R^2$, in which $R^2$ is H, $C_1$-$C_{18}$ alkyl, $C_7$-$C_{24}$ aralkyl, phenyl, naphthyl or fluorenyl and n is 1 to 20, $O—(CH_2—CH(CH_3)—O)_n—R^3$, in which $R^3$ is H, $C_1$-$C_{18}$ alkyl, $C_7$-$C_{24}$ aralkyl, phenyl, naphthyl or fluorenyl and n is 1 to 20, $O—C(═O)—R^4$, in which $R^4$ is H, $C_1$-$C_{18}$ alkyl, $C_7$-$C_{24}$ aralkyl, phenyl, naphthyl or fluorenyl, $C_6$-$C_{18}$ aryl, which is substituted by at least one radical $OR^5$, in which $R^5$ is H, $C_1$-$C_{18}$ alkyl, $C_7$-$C_{24}$ aralkyl, phenyl, naphthyl or fluorenyl, or $NH—C(═O)—OR^6$, in which $R^6$ is H, $C_1$-$C_{18}$ alkyl, $C_7$-$C_{24}$ aralkyl, phenyl, naphthyl or fluorenyl, and Y and Z are identical or different and $OR^7$, in which $R^7$ is H, $C_1$-$C_{18}$ alkyl, $C_7$-$C_{24}$ aralkyl, phenyl, naphthyl or fluorenyl, $O—(CH_2—CH_2—O)_n—R^8$, in which $R^8$ is H, $C_1$-$C_{18}$ alkyl, $C_7$-$C_{24}$ aralkyl, phenyl, naphthyl or fluorenyl and n is 1 to 20, $O—(CH_2—CH(CH_3)—O)_n—R^9$, in which $R^9$ is H, $C_1$-$C_{18}$ alkyl, $C_7$-$C_{24}$ aralkyl, phenyl, naphthyl or fluorenyl and n is 1 to 20, $O—C(═O)—R^{10}$, in which $R^{10}$ is H, $C_1$-$C_{18}$ alkyl, $C_7$-$C_{24}$ aralkyl, phenyl, naphthyl or fluorenyl, $C_6$-$C_{18}$ aryl, which is substituted by at least one radical $OR^{11}$, in which $R^{11}$ is H, $C_1$-$C_{18}$ alkyl, $C_7$-$C_{24}$ aralkyl, phenyl, naphthyl or fluorenyl, or $NH—C(═O)—OR^{12}$, in which $R^{12}$ is H, $C_1$-$C_{18}$ alkyl, $C_7$-$C_{24}$ aralkyl, phenyl, naphthyl or fluorenyl, where the C═C double bonds from the copolymerized diene monomers are optionally present in either partially or fully hydrogenated form.

11. The functionalized nitrile rubbers according to claim 10, wherein the functionalized rubbers have a Mooney viscosity (ML 1+4 at 100° C.) of 5-30, and a polydispersity PDI=Mw/Mn, where Mn represents the number average of the molecular weight and Mw the weight average of the molecular weight, of 1.4-4.0.

12. Vulcanizable mixtures comprising:

(i) at least one functionalized nitrite rubber according to claim 10 or 11, (ii) at least one crosslinker or crosslinking system, and optionally (iii) one or more further rubber additives.

13. A process for producing vulcanizates, the process comprising crosslinking the vulcanizable mixture according to claim 12 by temperature increase.

14. Vulcanizates based on a functionalized nitrile rubber according to claim 10 or 11.

15. Block copolymers comprising one or more blocks based on the functionalized nitrile rubber according to claim 10 or 11.

16. The functionalized nitrile rubbers according to claim 10, wherein the functionalized rubbers have a Mooney viscosity (ML 1+4 at 100° C.) of 5-20, and a polydispersity PDI=Mw/Mn, where Mn represents the number average of the molecular weight and Mw the weight average of the molecular weight, of 1.5-3.0.

17. The process according to claim 13, wherein the crosslinking is done in a shaping process comprising injection moulding.

* * * * *